(12) United States Patent
Bechtel et al.

(10) Patent No.: US 9,009,601 B2
(45) Date of Patent: Apr. 14, 2015

(54) SYSTEM FOR MANAGING A COLLABORATIVE ENVIRONMENT

(75) Inventors: Michael E. Bechtel, Naperville, IL (US); Brian J. Leslie, Chicago, IL (US); Brian H. Richards, Chicago, IL (US); Erin E. Hsu, Sunnyvale, CA (US)

(73) Assignee: Accenture Global Services Limited (IE)

( * ) Notice: Subject to any disclaimer, the term of this patent is extended or adjusted under 35 U.S.C. 154(b) by 646 days.

(21) Appl. No.: 12/491,321

(22) Filed: Jun. 25, 2009

(65) Prior Publication Data
US 2009/0282346 A1 Nov. 12, 2009

Related U.S. Application Data

(63) Continuation-in-part of application No. 12/036,012, filed on Feb. 22, 2008.

(51) Int. Cl.
*G06F 3/00* (2006.01)
*G06Q 10/10* (2012.01)

(52) U.S. Cl.
CPC ..................................... *G06Q 10/10* (2013.01)

(58) Field of Classification Search
USPC .................. 715/751; 709/204, 207
See application file for complete search history.

(56) References Cited

U.S. PATENT DOCUMENTS

| | | | |
|---|---|---|---|
| 5,251,294 A | 10/1993 | Abelow | |
| 5,628,009 A | 5/1997 | Kikuta et al. | |
| 5,812,773 A | 9/1998 | Norin | |
| 5,835,085 A | 11/1998 | Eick et al. | |
| 5,878,214 A | 3/1999 | Gilliam et al. | |
| 6,484,190 B1 | 11/2002 | Cordes et al. | |
| 6,681,369 B2 | 1/2004 | Meunier et al. | |
| 7,181,438 B1 | 2/2007 | Szabo | |
| 7,219,307 B2 | 5/2007 | Senay | |
| 7,296,023 B2 | 11/2007 | Geyer et al. | |

(Continued)

FOREIGN PATENT DOCUMENTS

| | | |
|---|---|---|
| EP | 1 286 276 A1 | 2/2003 |
| EP | 1286276 A1 | 2/2003 |
| WO | WO 2004/097627 A2 | 11/2004 |

OTHER PUBLICATIONS

Vbulletin (Distance), Advanced Report Post Management System, (Mar. 8, 2007) http://web.archive.org/web/20071019022335/http://www.vbulletin.org/forum/showthread.php?t=137031.*

(Continued)

*Primary Examiner* — Amy Ng
*Assistant Examiner* — Di Xiao
(74) *Attorney, Agent, or Firm* — Brinks Gilson & Lione

(57) ABSTRACT

A system is described for managing a collaborative environment. The system may include a memory, an interface, and a processor. The memory may store items provided by users in a collaborative environment. Each item may be related to at least one other item. The processor may identify the collaborative environment and may receive a request from a user to flag an item in the collaborative environment. The request may include a reason for flagging the item and a description of the reason. The processor may determine a priority level of a plurality of priority levels for handling the item based at least on the reason. Each priority level may be associated with an action to be performed on the item. The processor may perform the action associated with the determined priority level.

22 Claims, 30 Drawing Sheets

(56) References Cited

U.S. PATENT DOCUMENTS

| | | | |
|---|---|---|---|
| 7,305,419 B1 | 12/2007 | Cosby et al. | |
| 7,356,772 B2 | 4/2008 | Brownholtz et al. | |
| 7,458,019 B2 | 11/2008 | Gumz et al. | |
| 7,519,562 B1* | 4/2009 | Vander Mey et al. | 705/500 |
| 7,548,873 B2 | 6/2009 | Veeningen et al. | |
| 7,565,534 B2 | 7/2009 | Starbuck et al. | |
| 7,657,404 B2 | 2/2010 | Thurner et al. | |
| 7,788,237 B2 | 8/2010 | Voronov et al. | |
| 7,793,219 B1 | 9/2010 | Stratton et al. | |
| 7,822,848 B2 | 10/2010 | Muller et al. | |
| 7,853,880 B2 | 12/2010 | Porter | |
| 7,899,694 B1 | 3/2011 | Marshall et al. | |
| 7,953,720 B1 | 5/2011 | Rohde et al. | |
| 8,060,817 B2 | 11/2011 | Goldberg et al. | |
| 8,065,193 B2 | 11/2011 | Bullock | |
| 8,151,200 B2 | 4/2012 | Roger et al. | |
| 2001/0033296 A1 | 10/2001 | Fullerton et al. | |
| 2002/0023271 A1 | 2/2002 | Augenbraun et al. | |
| 2002/0075320 A1 | 6/2002 | Kurapati | |
| 2003/0101197 A1 | 5/2003 | Sorensen et al. | |
| 2003/0167443 A1 | 9/2003 | Meunier et al. | |
| 2003/0172025 A1 | 9/2003 | Gallina | |
| 2003/0216962 A1* | 11/2003 | Heller et al. | 705/14 |
| 2005/0060222 A1 | 3/2005 | White | |
| 2005/0114781 A1 | 5/2005 | Brownholtz et al. | |
| 2005/0149622 A1* | 7/2005 | Kirkland et al. | 709/207 |
| 2005/0159932 A1 | 7/2005 | Thurner | |
| 2005/0165859 A1 | 7/2005 | Geyer et al. | |
| 2005/0177388 A1 | 8/2005 | Moskowitz et al. | |
| 2005/0228983 A1 | 10/2005 | Starbuck et al. | |
| 2006/0026502 A1 | 2/2006 | Dutta | |
| 2006/0026509 A1 | 2/2006 | Porter | |
| 2006/0053382 A1 | 3/2006 | Gardner et al. | |
| 2006/0101324 A1 | 5/2006 | Goldberg et al. | |
| 2006/0121434 A1 | 6/2006 | Azar | |
| 2006/0136510 A1 | 6/2006 | Voronov et al. | |
| 2007/0011204 A1 | 1/2007 | Sorensen et al. | |
| 2007/0078670 A1 | 4/2007 | Dave et al. | |
| 2007/0143281 A1 | 6/2007 | Smirin et al. | |
| 2007/0226296 A1 | 9/2007 | Lowrance et al. | |
| 2007/0245380 A1 | 10/2007 | Dommer et al. | |
| 2007/0256033 A1* | 11/2007 | Hiler | 715/860 |
| 2007/0288416 A1 | 12/2007 | Ferguson et al. | |
| 2008/0120339 A1 | 5/2008 | Guan et al. | |
| 2008/0133671 A1 | 6/2008 | Kalaboukis | |
| 2008/0172407 A1 | 7/2008 | Sacks | |
| 2008/0189724 A1 | 8/2008 | Tien et al. | |
| 2008/0208898 A1 | 8/2008 | Salo et al. | |
| 2008/0222279 A1 | 9/2008 | Cioffi et al. | |
| 2008/0228827 A1* | 9/2008 | Perlman | 707/200 |
| 2008/0243807 A1 | 10/2008 | Gaucas et al. | |
| 2008/0270949 A1 | 10/2008 | Liang | |
| 2009/0037414 A1 | 2/2009 | Olivier et al. | |
| 2009/0132651 A1 | 5/2009 | Roger et al. | |
| 2009/0271708 A1 | 10/2009 | Peters et al. | |

OTHER PUBLICATIONS

RCGroups, Warning Types (Oct. 13, 2007). http://web.archive.org/web/20071013080645/http://www.rcgroups.com/forums/wlist.php.*

PhpBB EXreaction (hereinafter PhpBB), Soft Delete (Sep. 2007) http://startrekguide.com/community/viewtopic.php?f=84&t=3409.*

United States Patent and Trademark non-final Office Action dated Apr. 22, 2013 for co-pending U.S. Appl. No. 12/489,824.

First Examiner's Report from the Canadian Patent Office for Canadian Patent Application No. 2,652,734 dated Mar. 7, 2012.

United States Patent and Trademark non-final Office Action dated Feb. 17, 2012 for co-pending U.S. Appl. No. 12/707,464.

United States Patent and Trademark non-final Office Action dated Oct. 6, 2011 for co-pending U.S. Appl. No. 12/474,468.

United States Patent and Trademark non-final Office Action dated Apr. 5, 2012 for co-pending U.S. Appl. No. 12/489,824.

United States Patent and Trademark non-final Office Action dated Apr. 12, 2012 for co-pending U.S. Appl. No. 12/474,457.

* cited by examiner

SYSTEM FOR MANAGING A COLLABORATIVE ENVIRONMENT

CROSS-REFERENCE TO RELATED APPLICATIONS

This application is a continuation-in-part of U.S. patent application Ser. No. 12/036,012, filed on Feb. 22, 2008, which is incorporated by reference herein.

TECHNICAL FIELD

The present description relates generally to a system and method, generally referred to as a system, for managing a collaborative environment, and more particularly, but not exclusively, to moderating user activity and providing meaningful user feedback in a collaborative innovation system in order to increase the effectiveness of the collaborative innovation.

BACKGROUND

Collaborative software may allow users to cooperatively build off an initial item or topic. The topic may continually evolve as additional users provide insight to the topic; however, the collaborative software may only be capable of displaying linear revisions of the topic. For example, a collaborative software system may provide users with an interface for creating and expanding articles on topics. The interface may provide users with the most recent version of the article, and may allow the users to post modifications to the most recent version of the article. However, in some instances there may be topics where there is not one clear answer to a given question. There may be competing, and equally valid, opinions to what the content of such an article should contain. The effectiveness of the collaborative environment may depend on the proper management of the users and the content in the collaborative environment.

SUMMARY

A system for managing a collaborative environment may include a memory, an interface, and a processor. The memory may be connected to the processor and the interface and may store a plurality of items provided by a plurality of users in a collaborative environment. Each item may be related to at least one other item of the plurality of items. The processor may identify the collaborative environment and may receive a request to flag an item of the plurality of items. The request may also include a reason for flagging the item and a description of the reason for flagging the item. The processor may determine a priority level of a plurality of priority levels for handling the item based at least on the reason. Each priority level may be associated with an action to be performed on the item. The processor may perform the determined action associated with the determined priority level for handling the item.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 9A is a screenshot of an alternative administrator interface in the system of FIG. 1, or other systems for managing a collaborative environment.

FIG. 9B is a screenshot of an alternative administrator interface showing the flagged items tab in the system of FIG. 1, or other systems for managing a collaborative environment.

DETAILED DESCRIPTION

Figure 1:
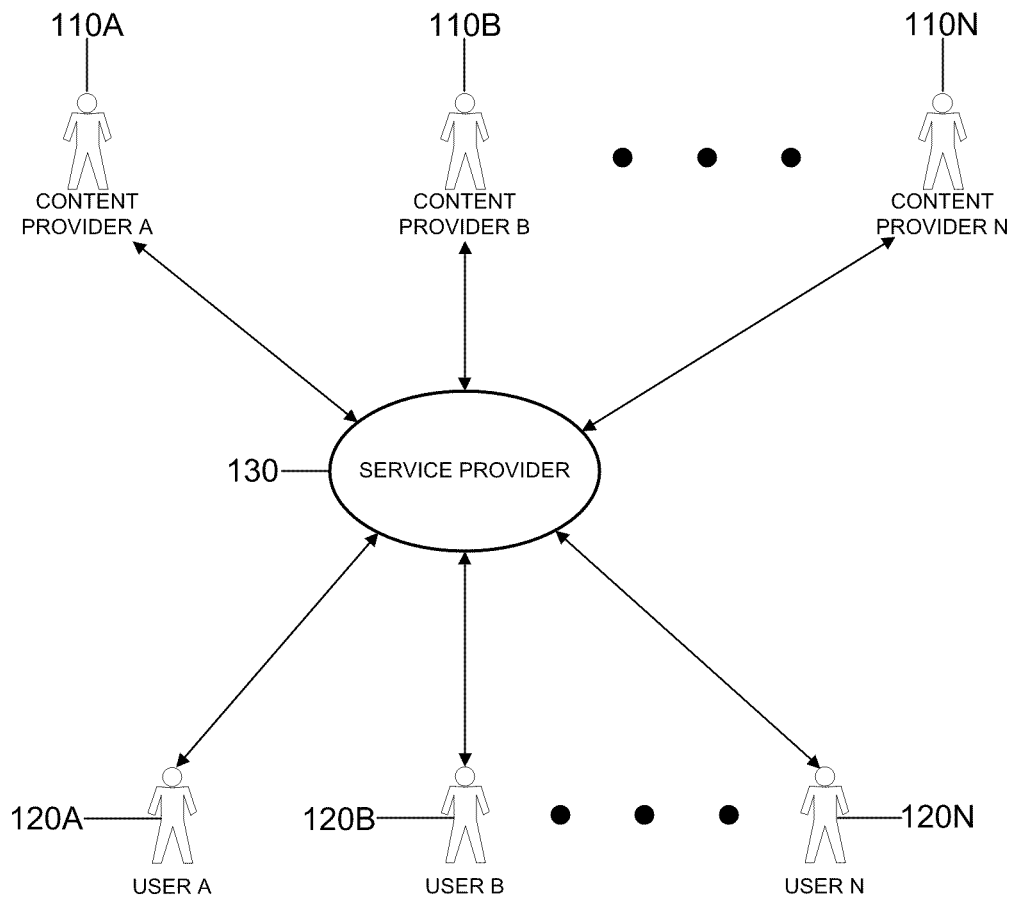
FIG. 1 is a block diagram of an overview of a system for managing a collaborative environment.

A system and method, generally referred to as a system, may relate to managing a collaborative environment, and more particularly, but not exclusively, to moderating user activity and providing meaningful user feedback in a collaborative innovation system in order to increase the effectiveness of the collaborative innovation. The principles described herein may be embodied in many different forms.

The system may allow an organization to effectively moderate user activity in a collaborative environment. The system may allow a user of the collaborative environment to identify items submitted to the collaborative environment which the user believes should be reviewed by an administrator. The system may allow the user to provide a reason describing why the item should be reviewed by an administrator. The system may determine a priority level associated with reviewing the item based one or more factors, such as the content of the item, the reason provided by the user, and/or the outcome of prior reviews initiated by the user. The system may perform an action, or a set of actions, based on the priority level determined for reviewing the item. For example, if the system determines the highest priority level should be associated with reviewing the item, the actions may include temporarily removing the item from the collaborative environment and notifying an administrator that the item should be immediately reviewed. Alternatively, if the system determines the lowest priority level should be associated with reviewing the item, the action may include adding the item to a list of items which is periodically provided to an administrator for review. By determining a priority level associated with reviewing each item, and performing an action based on the determined priority level, the system allows an administrator to prioritize reviews and effectively moderate user activity across the entire collaborative environment.

The system may allow an organization to effectively provide feedback to users of a collaborative innovation system. The system may provide a content provider with a graphical display of items. The items may have been submitted by users in response to an initial item submitted by the content provider. The items may be displayed in the graphical display such that an item which was an innovation of a previous item is linked to the previous item. The system may allow the content provider to select an item from the graphical display and set a status of the item. The status may indicate whether an item is valued, or approved, by the content provider. Alternatively the status may indicate whether the item has been reviewed, or is being reviewed, by the content provider. The status may be communicated to the user who provided the item, such as by an email or text message notification. The system may also allow the content provider to apply the status to all items which were innovated from the selected item, and/or items from which the selected item was innovated. In this case, the system may communicate the status to each user who provided an item which was innovated from the selected item and/or items from which the selected item was innovated. The system may keep the users actively engaged in the collaborative innovation by providing the users with regular feedback on the items they provide.

FIG. 1 provides an overview of a system 100 for managing a collaborative environment. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more content providers 110A-N, such as stakeholders or decision making personnel of an organization, a service provider 130, such as a collaborative innovation interface provider, and one or more users 120A-N, such as employees of the organization, administrators of the system 100, or other parties authorized to use the service. The service provider 130 may provide an interface for collaborative innovation. Collaborative innovation may be the process of building and refining items, such as ideas, in a collaborative environment. The users 120A-N may provide items, such as ideas, refinements of provided items, rating of provided items, or generally any data that may assist the collaborative innovation process. The content providers 110A-N may provide initial items, or seed ideas, to begin the collaborative process and may review the results of the collaborative innovation process. Alternatively or in addition one or more of the users 120A-N may be authorized to provide initial items. One or more of the users 120A-N and/or the content providers 110A-N may be system administrators, also referred to as administrators.

In operation, the service provider 130 may provide the content providers 110A-N with an interface for identifying an initial item. The initial item may be a question whose answer is of value to one of the content providers 110A-N, such as the content provider A 110A. For example, an initial question may be "what activities would you like the social committee to sponsor?" Alternatively or in addition the initial item may be a statement of opinion or fact. The service provider 130 may provide the content provider A 110A with an interface for identifying which users 120A-N the initial item should be displayed to and/or which users 120A-N should be allowed to enhance the item or rate enhancements to the item. An enhancement of an initial item may be referred to as a response, revision, primary response, an item innovated from an initial item, or an item enhanced from an initial item. In the case of a primary response, an enhancement of a primary response may be referred to as a secondary response, and so on. The system 100 may allow the content provider A 110A to select one or more users 120A-N, or a group of users 120A-N.

Once an initial question has been created the service provider 130 may send a notification to the one or more users 120A-N that a new question is available, such as by emailing the users 120A-N. The service provider 130 may provide an interface displaying the initial items in the system 100 to the users 120A-N. The interface may allow the users 120A-N to filter the initial items based on one or more characteristics of the items. The users 120A-N may use the interface to select an initial item. The interface for viewing and filtering initial items may be discussed in more detail in FIGS. 4 and 4A below. If a user A 120A selects an initial item, the service provider 130 may provide the user A 120A with an interface displaying detailed information regarding the initial item. The interface displaying detailed initial item information is discussed in more detail in FIG. 5 below.

The service provider 130 may provide the users 120A-N with an interface for creating enhancements to the items and an interface for commenting on and rating items. The interface may display all of the items innovated from the initial item to the users 120A-N and may allow the users 120A-N to select and rate an item. In the system 100, the display of all the items innovated from the initial item may be referred to as the collaborative innovation view. The initial item and the items innovated from the initial item may be represented in the collaborative innovation view as a graphical hierarchical structure. The graphical hierarchical structure may allow the users 120A-N to easily navigate, and rate, the items. The interface may further allow the users 120A-N to search and sort the items, based on one or more item characteristics, such as the title of the item. In the system 100, an item which enhances an original item or another item may be referred to as a grape item, grape idea, or simply a grape. The interface for enhancing and rating items is discussed in more detail in FIGS. 6 and 6A-E below.

The service provider 130 may provide the users 120A-N with an interface for flagging items which the users 120A-N believe should be reviewed by an administrator. The interface may include a list of reasons for flagging the item. For example, the list of reasons may include an offensive item, a confidential item, an item that should be moved, or a duplicate or redundant item. The users 120A-N may select the reason that best describes why the item has been flagged. The users 120A-N may also provide a description relating to why the item has been flagged. The interface for submitting an item for review is discussed in more detail in FIG. 11 below. The users 120A-N may submit the item for review and the service provider 130 may process the request for review and may perform an action based on the request for review, such as communicating the item to an administrator. The steps of receiving a request to flag an item and processing the request are discussed in more detail in FIG. 12 below.

Once the period of time allocated to collaborating on an initial item has expired, the service provider 130 may notify the content provider A 110A that the collaborative innovation process has completed. The service provider 130 may provide the content provider A 110A and/or the users 120A-N with an interface for viewing the results of the collaborative innovation process. The results may be displayed as an ordered list of items generated by the users 120A-N during the innovation process. The items may be ordered based on the ratings the items received from the users 120A-N. The service provider 130 may provide the content provider A 110A with an interface for filtering the results based on one or more characteristics of the users 120A-N who rated the items. In the system 100 the items receiving the highest ratings may be referred to as wine items, wine ideas, or simply wine. The interface for viewing collaborative innovation results is discussed in more detail in FIGS. 7 and 7A below.

The service provider 130 may provide the users 120A-N with an interface for viewing a summary of their activity with the service provider 130. The summary may include one or more graphs displaying the activity of the users 120A-N, such as a pie graph, a bar graph, or generally any graph capable of reporting the activity of the users 120A-N. The interface may also allow the users 120A-N to view or modify their user profile. The interface for providing user activity data is discussed in more detail in FIGS. 8 and 8A below.

The service provider 130 may provide an administrator interface to authorized content providers 110A-N and or users 120A-N, such as the content provider A 110A. The administrator interface may allow the content provider A 110A to add and/or remove users 120A-N and set the permissions of users 120A-N. The permissions may include creating initial items, creating follow-up items, rating items, viewing items, or generally any permission that may be set in the system 100. The administrator interface is discussed in more detail in FIG. 9 and FIGS. 9A-B below.

The service provider 130 may provide an administrator with an interface for viewing items which have been flagged by the users 120A-N for review. The interface may display a list of items which were flagged for review. The list may include the reason why each item was flagged for review, the user A 120A who flagged the item for review, and the date the user A 120A flagged the item for review. The administrator interface for reviewing items flagged for review is discussed in more detail in FIG. 9B below. The administrator may select an item and review the description provided by the user A 120A who flagged the item for review. If the administrator determines that the flag was appropriate, the administrator may remove the item from the collaborative environment. If the administrator determines that the flag was unnecessary, the administrator may clear the flag from the item. The service provider 130 may store data describing the user A 120A and the outcome of the administrator review. The service provider 130 may use the outcome of prior administrator reviews initiated by the user A 120A in determining actions to perform when the user A 120A flags an item, as discussed in more detail in FIG. 12 below. The steps of reviewing items flagged for review are discussed in more detail in FIG. 13 below.

The service provider 130 may also provide a content provider A 110A, or an administrator, with an interface for setting the status of one or more items provided by a user A 120A. The status of the item may indicate whether the content provider A 110A intends to implement the item, or idea, provided by the user A 120A. For example, a content provider A 110A may set the status of an item to an under review status, a deferred status, an approved status, or an implemented status. The content provider A 110A may also provide a description relating to the status set for the item. Alternatively or in addition the service provider 130 may allow the content provider A 110A set the status of the selected item and all items related to the selected items. In this case, the status and description identified by the content provider A 110A may be applied to all items related to the selected item. The interface for setting the status of an item is discussed in more detail in FIGS. 6D-E below. The service provider 130 may communicate the status set by the content provider A 110A for an item, and/or the description, to the user A 120A who provided the item. If the status is being applied to multiple items, the service provider 130 may communicate the status to each user who provided each item the status is being set for. The steps of setting a status of an item and communicating the status to the user who provided the item are discussed in more detail in FIG. 14 below.

Figure 2:
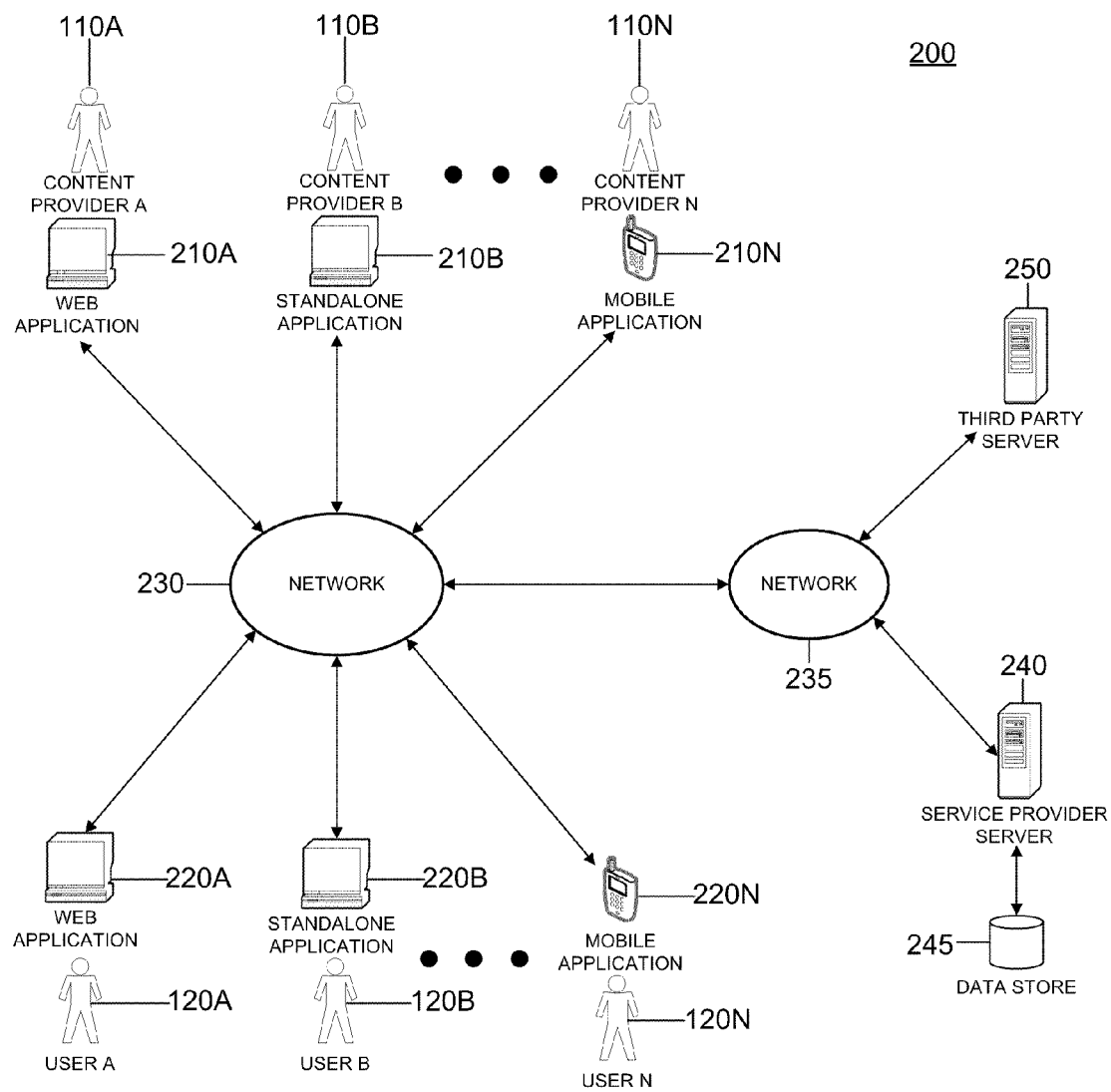
FIG. 2 is a block diagram of a network environment implementing the system of FIG. 1 or other systems for managing a collaborative environment.

FIG. 2 provides a simplified view of a network environment 200 implementing the system of FIG. 1 or other systems for managing a collaborative environment. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more web applications, standalone applications and mobile applications 210A-N, which may be client applications of the content providers 110A-N. The system 200 may also include one or more web applications, standalone applications, mobile applications 220A-N, which may be client applications of the users 120A-N. The web applications, standalone applications and mobile applications 210A-N, 220A-N may collectively be referred to as client applications 210A-N, 220A-N. The system 200 may also include a network 230, a network 235, the service provider server 240, a data store 245, and a third party server 250.

Some or all of the service provider server 240, and third-party server 250 may be in communication with each other by way of network 235. The third-party server 250 and service provider server 240 may each represent multiple linked computing devices. Multiple distinct third party servers, such as the third-party server 250, may be included in the network environment 200. A portion or all of the third-party server 250 may be a part of the service provider server 240.

The data store 245 may be operative to store data, such as user information, data relating to items, or ratings of items of the users 120A-N. The data store 245 may include one or more relational databases or other data stores that may be managed using various known database management techniques, such as, for example, SQL and object-based techniques. Alternatively or in addition the data store 245 may be implemented using one or more of the magnetic, optical, solid state or tape drives. The data store 245 may be in communication with the service provider server 240. Alternatively or in addition the data store 245 may be in communication with the service provider server 240 through the network 235.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The content providers 110A-N may use a web application 210A, standalone application 210B, or a mobile application 210N, or any combination thereof, to communicate to the service provider server 240, such as via the networks 230, 235. Similarly, the users 120A-N may use a web application 220A, a standalone application 220B, or a mobile application 220N to communicate to the service provider server 240, via the networks 230, 235.

The service provider server 240 may provide user interfaces to the content providers 110A-N via the networks 230, 235, through the web applications, standalone applications or mobile applications 210A-N. The service provider server 240 may also provide user interfaces to the users 120A-N via the networks 230, 235, through the web applications, standalone applications or mobile applications 220A-N. The user interfaces may be designed using ADOBE FLEX. The user interfaces may be initially downloaded when the applications 210A-N, 220A-N first communicate with the service provider server 240. The client applications 210A-N, 220A-N may download all of the code necessary to implement the user interfaces, but none of the actual data. The data may be downloaded from the service provider server 240 as needed.

The user interface may be developed using the singleton development pattern, utilizing the model locator found within the cairngorm framework. Within the singleton pattern there may be several data structures each with a corresponding data access object. The data structures may be structured to receive the information from the service provider server 240.

The web applications, standalone applications and mobile applications 210A-N, 220A-N may run on a device connected to the network 230 in any configuration that supports data transfer. This may include a data connection to the network 230 that may be wired or wireless. Any of the web applications, standalone applications and mobile applications 210A-N, 220A-N may individually be referred to as a client application. The web applications 210A, 220A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B, 220B may run on a machine that may have a processor, memory, a display, a user interface and a communication interface. The processor may be operatively connected to the memory, display and the interfaces and may perform tasks at the request of the standalone applications 210B, 220B or the underlying operating system. The memory may be capable of storing data. The display may be operatively connected to the memory and the processor and may be capable of displaying information to the content provider B 110B or the user B 120B. The user interface may be operatively connected to the memory, the processor, and the display and may be capable of interacting with a user B 120B or a content provider B 110B. The communication interface may be operatively connected to the memory, and the processor, and may be capable of communicating through the networks 230, 235 with the service provider server 240, and the third party server 250. The standalone applications 210B, 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX, and PHP, amongst others.

The mobile applications 210N, 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a data store, such as the data store 245, a database server, and a middleware server. The application server may be a dynamic HTML server, such as using ASP, JSP, PHP, or other technologies. The service provider server 240 may co-exist on one machine or may be running in a distributed configuration on one or more machines. The service provider server 240 may collectively be referred to as the server. The service provider server 240 may implement a server side Wiki engine, such as ATLASSIAN CONFLUENCE. The service provider server 240 may receive requests from the users 120A-N and the content providers 110A-N and may provide data to the users 120A-N and the content providers 110A-N based on their requests. The service provider server 240 may communicate with the client applications 210A-N, 220A-N using extensible markup language (XML) messages.

The third party server 250 may include one or more of the following: an application server, a data source, such as a database server, and a middleware server. The third party server may implement any third party application that may be used in a collaborative innovation system, such as a user verification system. The third party server 250 may co-exist on one machine or may be running in a distributed configuration on one or more machines. The third party server 250 may receive requests from the users 120A-N and the content providers 110A-N and may provide data to the users 120A-N and the content providers 110A-N based on their requests.

Figure 19:
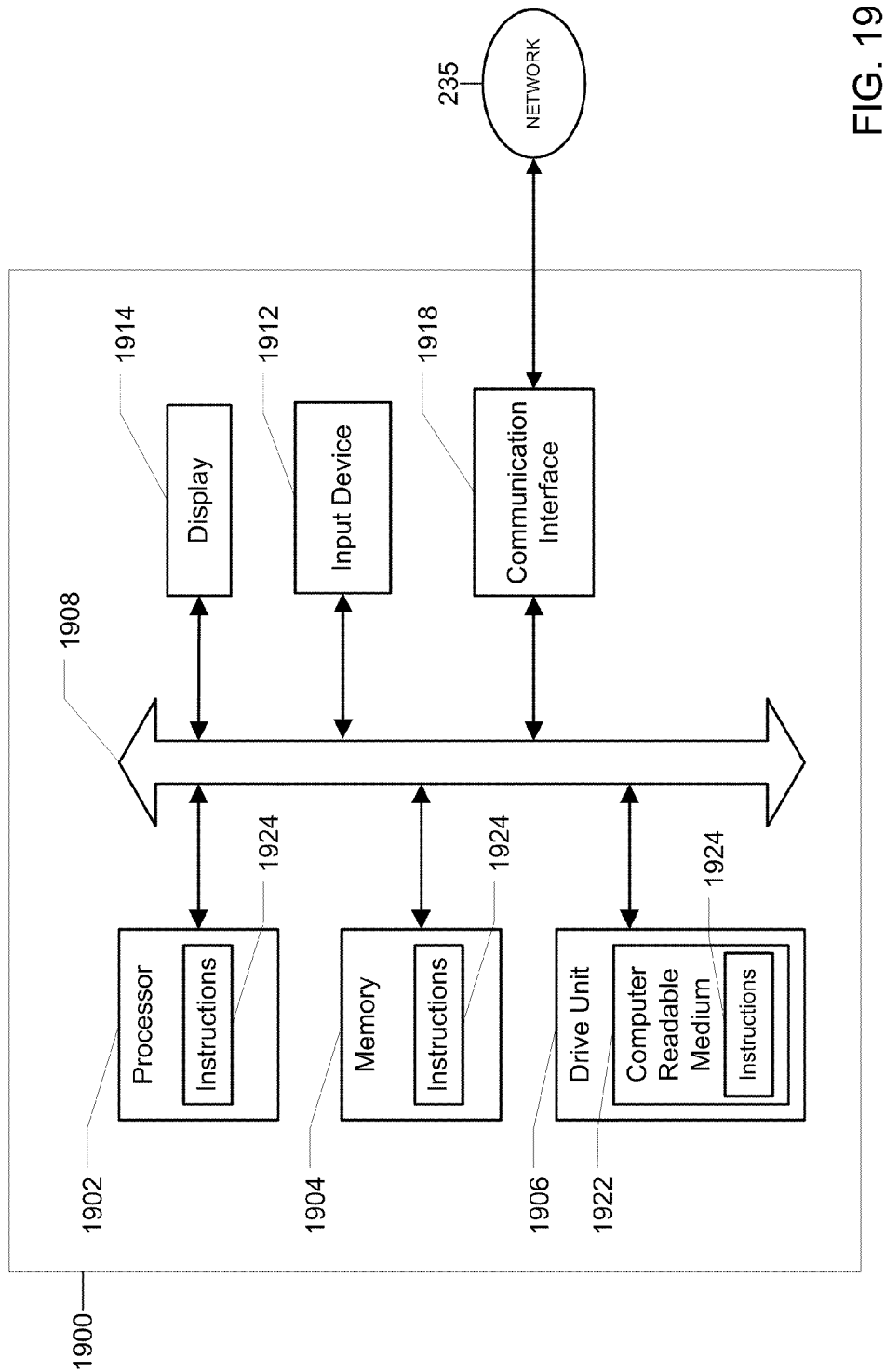
FIG. 19 is an illustration of a computer system that may be used in the systems of FIG. 2, or other systems for managing a collaborative environment.

The service provider server 240 and the third party server 250 may be one or more computing devices of various kinds, such as the computing device in FIG. 19. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 210A, 210A may employ HTTP to request information, such as a web page, from a web server, which may be a process executing on the service provider server 240 or the third-party server 250.

There may be several configurations of database servers, such as the data store 245, application servers, and middleware servers included in the service provider server 240, or the third party server 250. Database servers may include MICROSOFT SQL SERVER®, ORACLE®, IBM DB2® or any other database software, relational or otherwise. The application server may be APACHE TOMCAT®, MICROSOFT IIS®, ADOBE COLDFUSION®, or any other application server that supports communication protocols. The middleware server may be any middleware that connects software components or applications.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation the client applications 210A-N, 220A-N may make requests back to the service provider server 240. The service provider server 240 may access the data store 245 and retrieve information in accordance with the request. The information may be formatted as XML and communicated to the client applications 210A-N, 220A-N. The client applications 210A-N, 220A-N may display the XML appropriately to the users 120A-N, and/or the content providers 110A-N.

Figure 3:
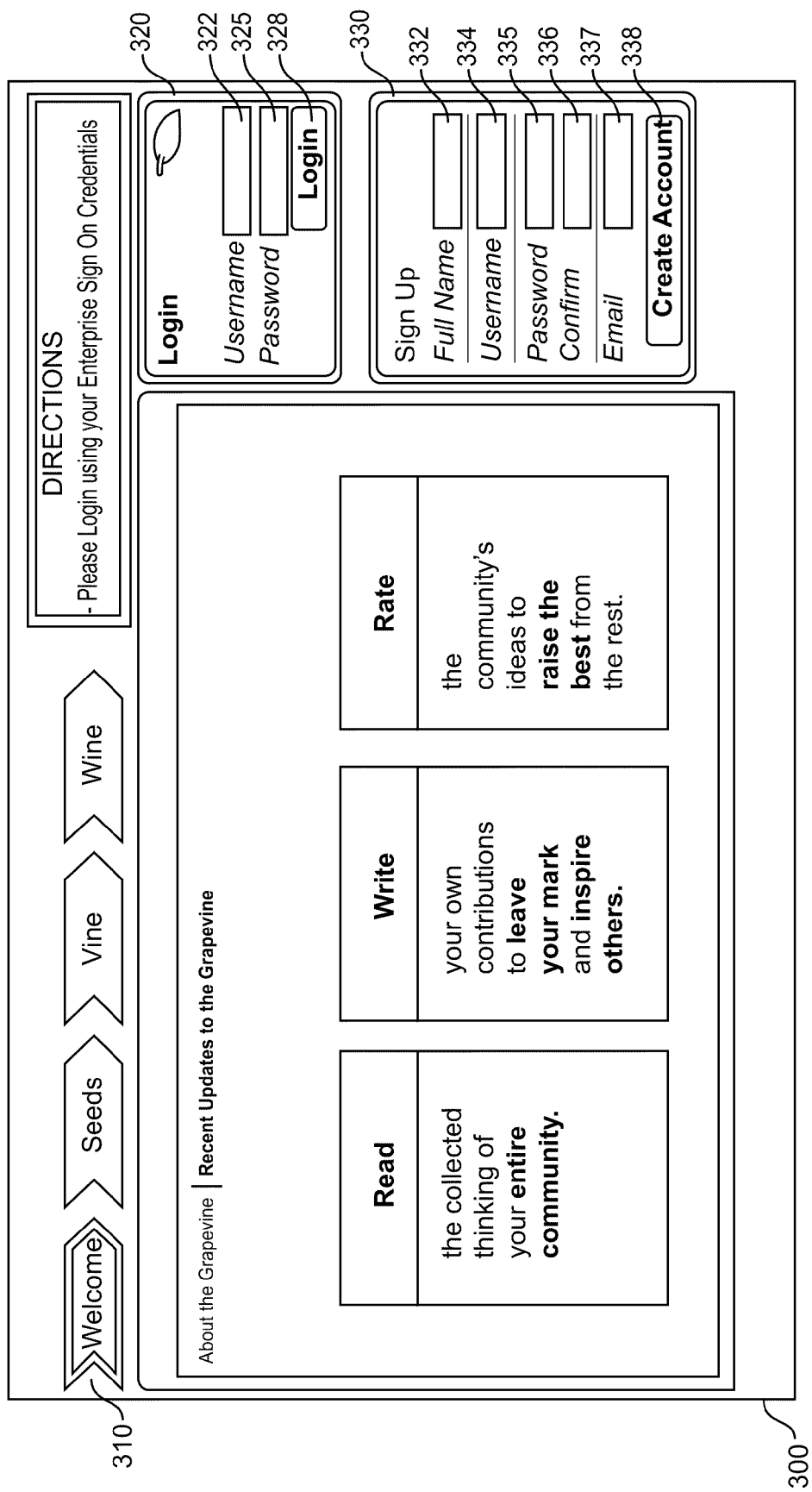
FIG. 3 is a screenshot of a user login interface in the system of FIG. 1, or other systems for managing a collaborative environment.

FIG. 3 is a screenshot of a user login interface 300 in the system of FIG. 1, or other systems for managing a collaborative environment. The system 100 may display the user login interface 300 to the user A 120A when the user A 120A first interacts with the system 100. The user A 120A may use the user login interface 300 to log into the system 100, or create a new account to access the system 100.

The user login interface 300 may include a navigation bar 310, a login subsection 320, and a sign up subsection 330. The login subsection 320 may include a username field 322, a password field 325, and a login button 328. The sign up subsection 330 may include a full name field 332, a username field 334, a password field 335, a confirm password field 336, an email field 337, and a create account button 338.

In operation the user A 120A may enter their username in the username field 322 and their password in the password field 325. The user A 120A may then click on the login button 328 to login into the system 100. If the user A 120A does not already have an account the user A 120A may fill in the fields in the sign up subsection 330, and click on the create account button 338, to create a new account. The user A 120A may be granted immediate access to the system 100, or an administrator and/or one of the content providers 110A-N may need to approve of the user A 120A before the user A 120A is granted access to the system. In this instance the system 100 may notify the user A 120A when they have been granted access, such as an email notification. The navigation bar 310 displays the current screen the user A 120A is viewing. Alternatively or in addition there may be multiple user login interfaces 300. In this instance the system 100 may display a different user login interface 300 depending upon whether the user A 120A is an internal user of an organization or is a client of the organization.

Figure 3A:
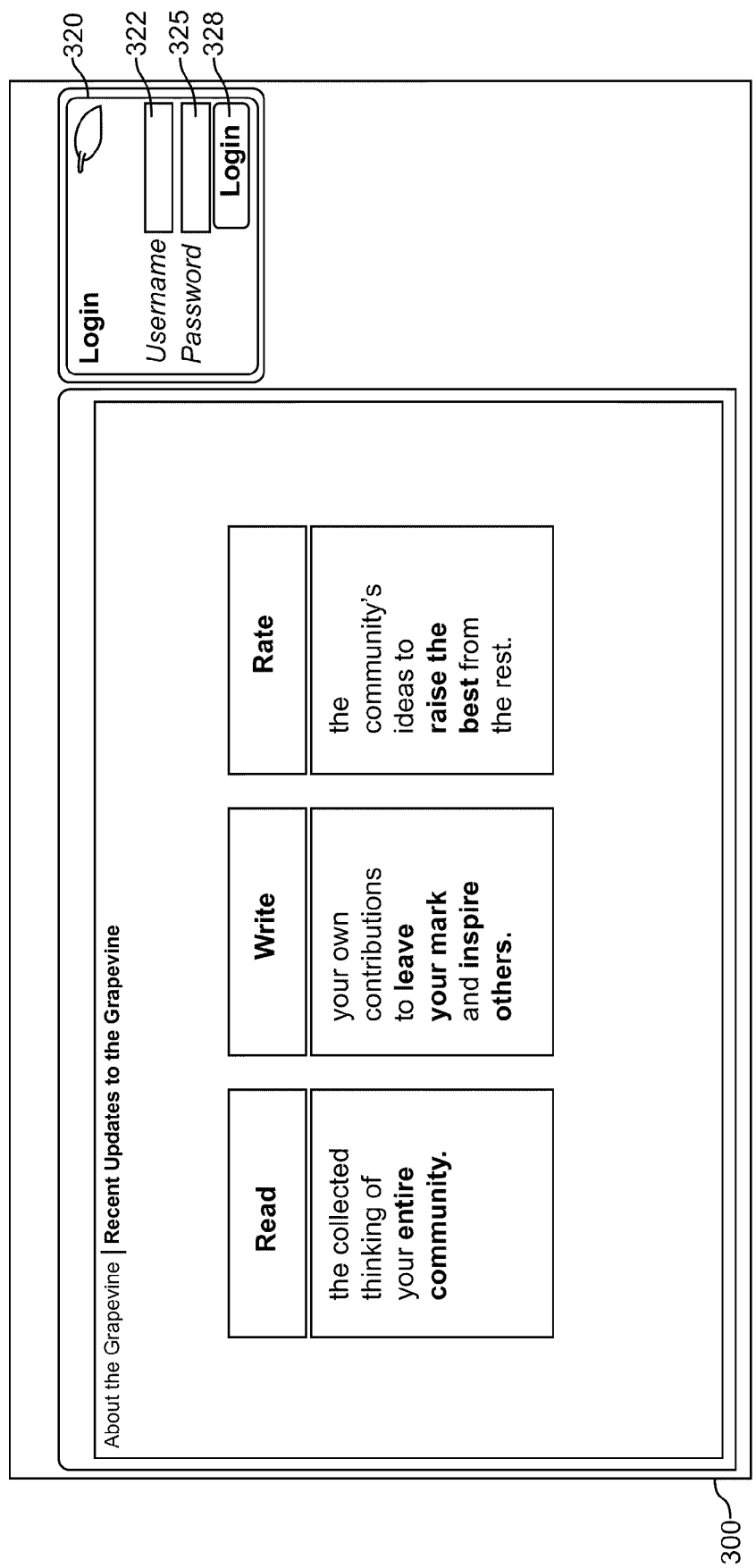
FIG. 3A is a screenshot of an alternative user login interface in the system of FIG. 1, or other systems for managing a collaborative environment.

FIG. 3A is a screenshot of an alternative user login interface 300 in the system of FIG. 1, or other systems for managing a collaborative environment. The system 100 may display the alternative user login interface 300 to the user A 120A when the user A 120A first interacts with the system 100. The user A 120A may use the alternative user login interface 300 to log into the system 100.

The alternative user login interface 300 may include a login subsection 320. The login subsection 320 may include a username field 322, a password field 325, and a login button 328. In operation the user A 120A may enter their username in the username field 322 and their password in the password field 325. The user A 120A may then click on the login button 328 to login into the system 100.

Figure 4:
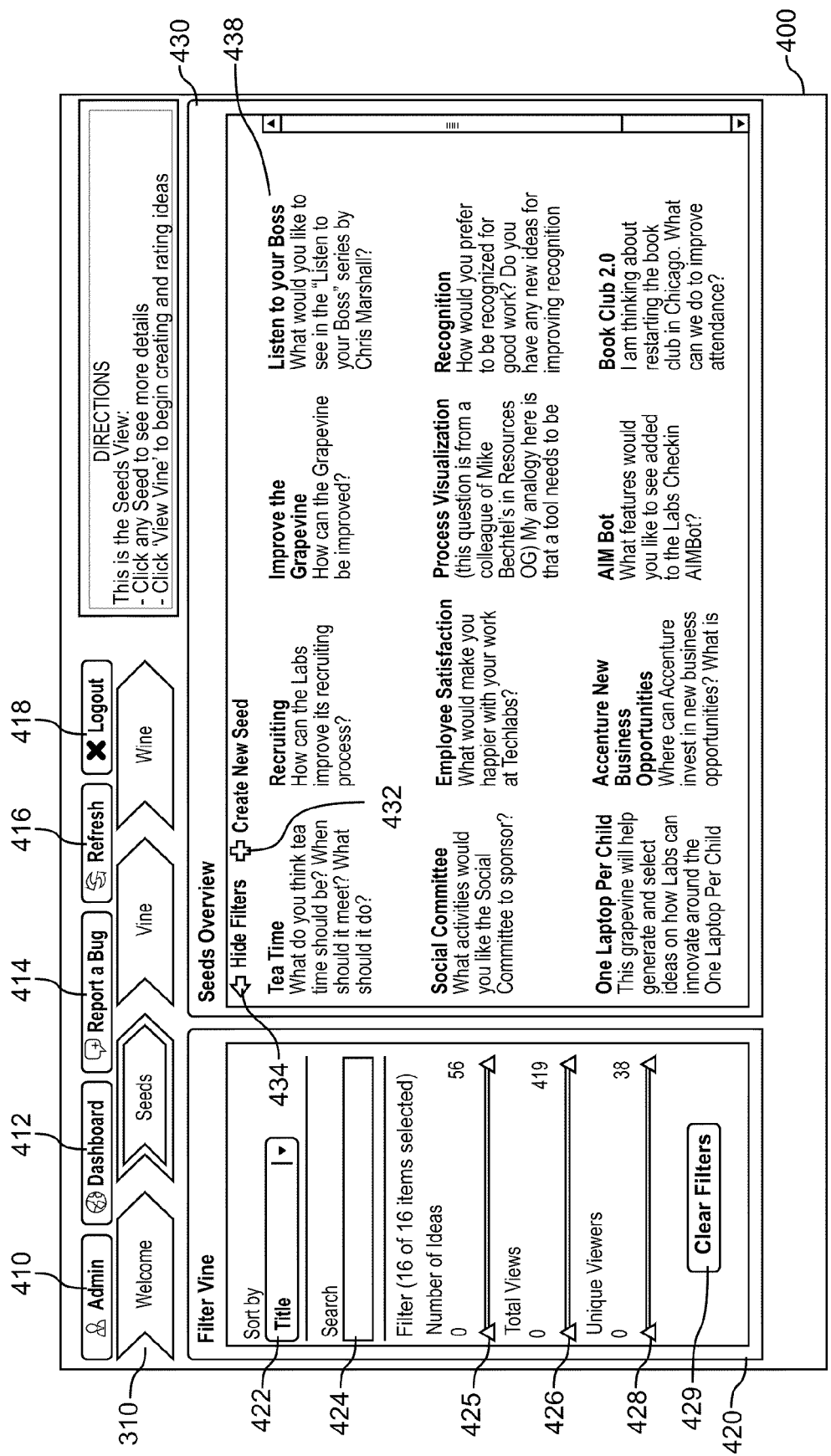
FIG. 4 is a screenshot of an initial item selection interface in the system of FIG. 1, or other systems for managing a collaborative environment.

FIG. 4 is a screenshot of an initial item selection interface 400 in the system of FIG. 1, or other systems for managing a collaborative environment. The system 100 may display the initial item selection interface 400 to the user A 120A after the user A 120A logs into the system 100. The user A 120A may use the initial item selection interface 400 to search, filter, and select one or more of the initial items.

The initial item selection interface 400 may include a navigation bar 310, an admin button 410, a dashboard button 412, a report a bug button 414, a search button 416, a logout button 418, a filter subsection 420 and an initial item subsection 430. The filter subsection 420 may include a sort by selector 422, a search field 424, a number of items filter 425, a total views filter 426, a unique viewers filter 428 and a clear filters button 429. The initial item subsection 430 may include a create new initial item button 432, a hide filters button 434, and initial items 438.

In operation, the user A 120A may click on the admin button 410 to view the admin interface. The user A 120A may need certain permissions to access the admin interface. The admin interface is discussed in more detail in FIGS. 9 and 9A-B below. The user A 120A may click on the dashboard button 412 to view the dashboard interface. The dashboard interface is described in more detail in FIGS. 8 and 8A below. The user A 120A may click on the refresh button 416 to refresh the data displayed in the initial item selection interface 400. The user A 120A may click on the logout button 418 to log out of the system 100.

The user A 120A may use the filter subsection 420 to sort and/or filter the initial items 438. The sort by selector 422 may be used to sort by one or more characteristics of the initial items 438, such as the title, creator, creation date, and number of grape items of the initial items 438. The search field 424 may be used to search the initial items 438. The filters 425, 426, 428, may be used to filter the initial items 438. The clear filters button 429 may be used to reset the filters 425, 426, 428.

The user A 120A may view one or more initial items 438 in the initial item subsection 430. The user A 120A may hide the filter subsection 420 by clicking on the hide filters button 434. The user A 120A may create a new initial item by clicking on the create new initial item button 432. The user A 120A may be required to have certain permissions in order to create a new initial item. The user A 120A may click on one of the initial items 438 to view detailed information about the initial item. The detailed information screen is discussed in more detail in FIG. 5 below.

Alternatively or in addition the initial item selection interface 400 may allow a user A 120A to flag an initial item for potential removal by an administrator. The administrator may review the initial item and determine whether to remove the initial item. There may be two types of initial item creation modes, a crowd controlled mode, where any of the users 120A-N can create an initial item, and a managed mode, where only administrator users can create an initial item.

Figure 4A:
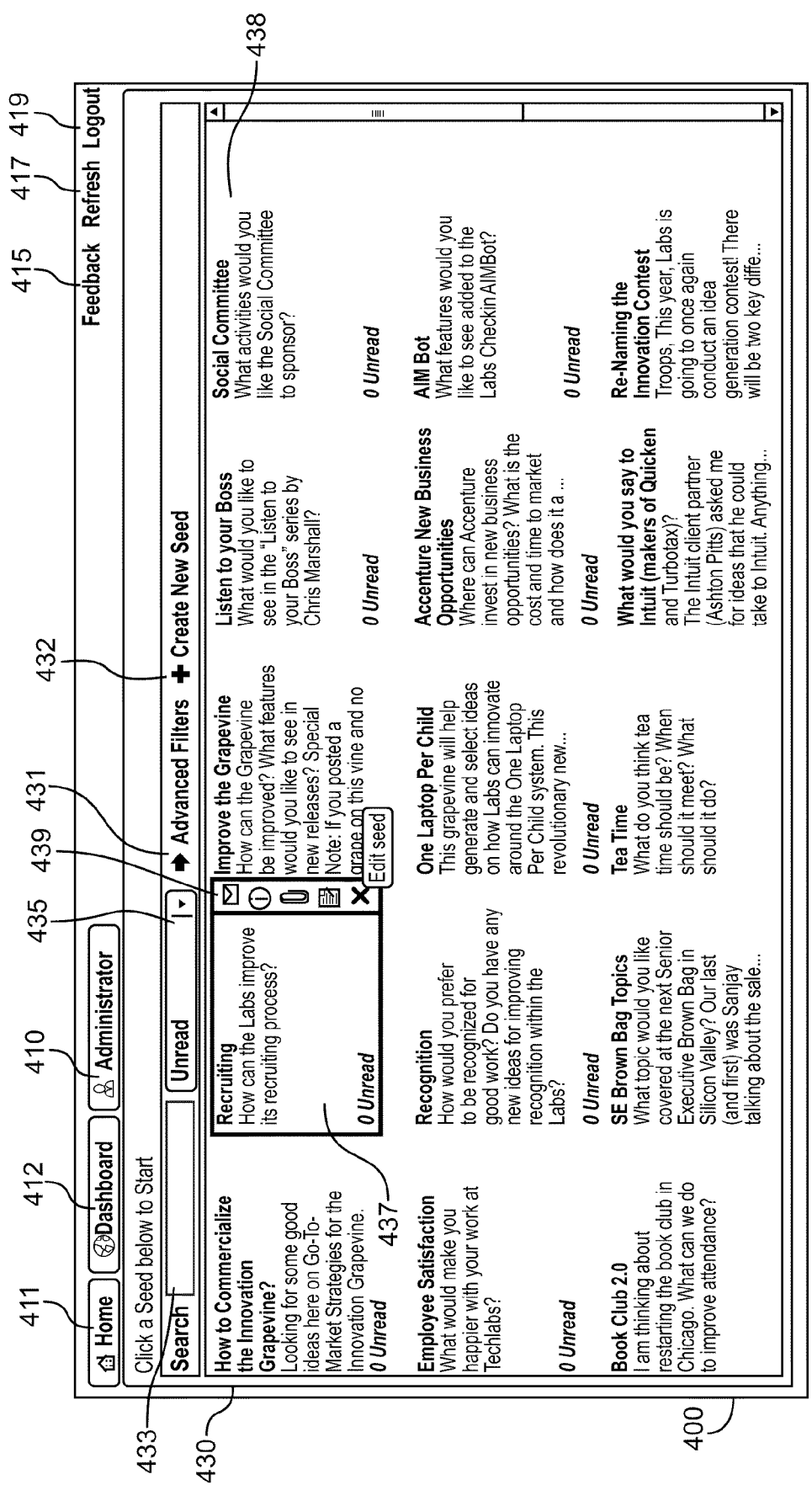
FIG. 4A is a screenshot of an alternative initial item selection interface in the system of FIG. 1, or other systems for managing a collaborative environment.

FIG. 4A is a screenshot of an alternative initial item selection interface 400 in the system of FIG. 1, or other systems for managing a collaborative environment. The system 100 may display the alternative initial item selection interface 400 to the user A 120A after the user A 120A logs into the system 100. The user A 120A may use the alternative initial item selection interface 400 to search, filter, and select one or more of the initial items.

The initial item selection interface 400 may include an admin button 410, a dashboard button 412, a home button 411, a feedback link 415, a refresh link 417, a logout link 419, and an initial item subsection 430. The initial item subsection 430 may include an advanced filters button 431, a create new initial item button 432, a search field 433, a search dropdown box 435, a selected initial item 437, an initial item action buttons 439, and initial items 438.

In operation, the user A 120A may click on the admin button 410 to view the admin interface. The user A 120A may need certain permissions to access the admin interface. The admin interface is described in more detail in FIGS. 9 and 9A-B below. The user A 120A may click on the dashboard button 412 to view the dashboard interface. The dashboard interface is described in more detail in FIGS. 8 and 8A below. The user A 120A may click on the refresh link 417 to refresh the data displayed in the initial item selection interface 400. The user A 120A may click on the logout button 418 to log out of the system 100. The user A 120A may click on the feedback link 415 to provide feedback on the system 100, such as to an administrator. The home button 411 may return the user to the user login interface 300. Alternatively or in addition the user A 120A may specify any screen or interface in the system 100 as a home screen. When the user A 120A clicks on the home button 411 the user A 120A may be displayed the specified home screen.

The user A 120A may view one or more initial items 438 in the initial item subsection 430. The user A 120A may view advanced filters, such as the filters in the filter subsection 420, by clicking on the advanced filters button 431. The user A 120A may create a new initial item by clicking on the create new initial item button 432. The user A 120A may be required to have certain permissions in order to create a new initial item. The user A 120A may click on one of the initial items 438 to select an initial item and/or view detailed information about the initial item. The detailed information screen is discussed in more detail in FIG. 5 below.

The selected item 437 may be an item selected by the user A 120A. When the user A 120A selects an item the user A 120A may use the selected item action buttons 439 to perform actions on the selected item 437. The actions may include emailing the item, receiving additional information on the item, attaching an item, such as a file, to the item, editing the item and deleting the item. If the user A 120A selects to edit the selected item 437 the user A 120A may be taken to the detailed information screen of FIG. 5.

The user A 120A may use the search field 433 to search for initial items. The user A 120A may use the search dropdown box 435 to filter the items searched, such as by only searching the unread items.

Figure 5:
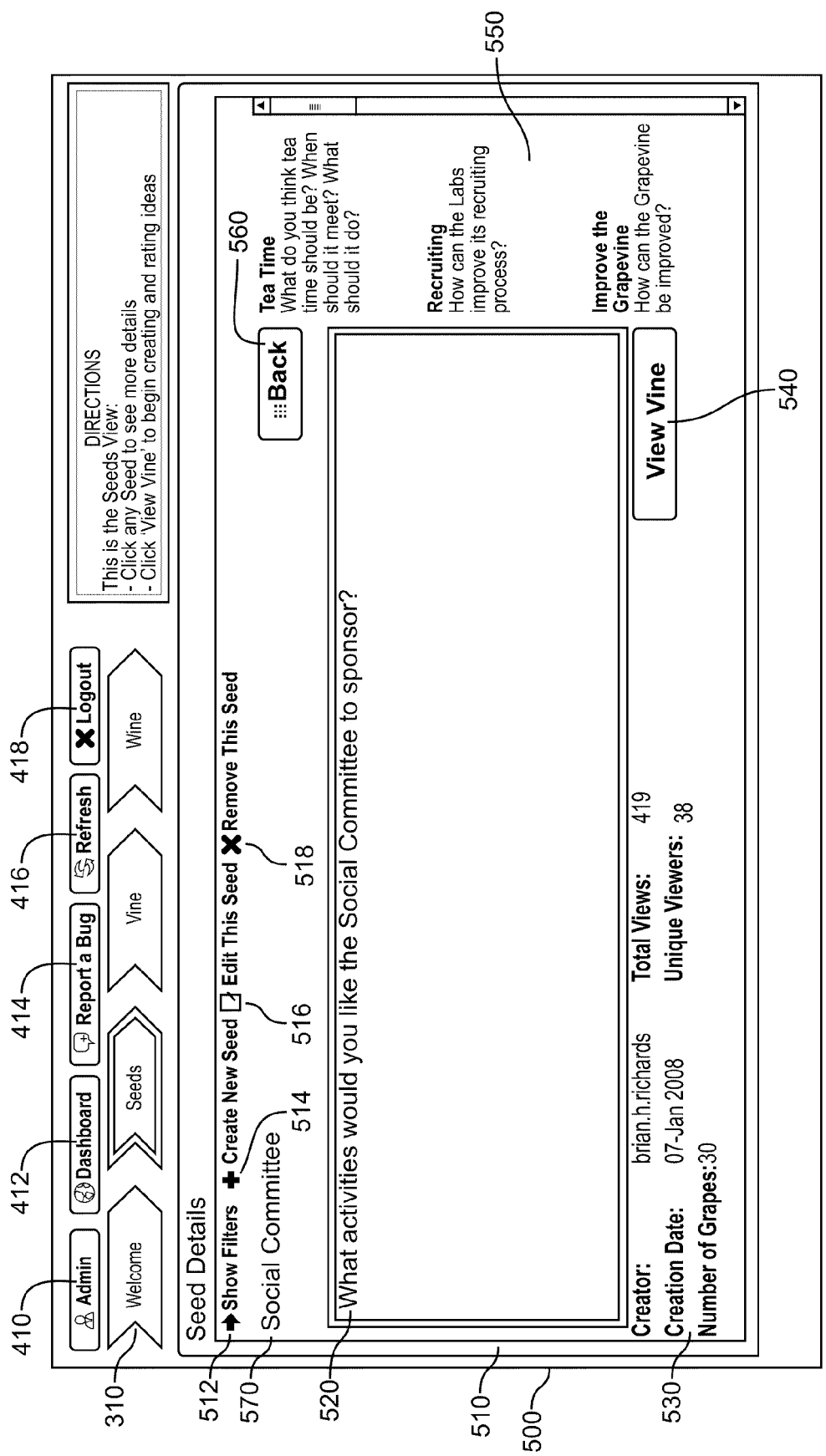
FIG. 5 is a screenshot of an initial item details screen in the system of FIG. 1, or other systems for managing a collaborative environment.

FIG. 5 is a screenshot of an initial item details screen 500 in the system of FIG. 1, or other systems for managing a collaborative environment. The system 100 may display the initial items details screen 500 to the user A 120A when the user A 120A clicks on one of the initial items 438 in the initial item subsection 430 of the initial item selection interface 400 in FIG. 4. The user A 120A may use the initial item details screen 500 to view detailed information regarding the selected initial item.

The initial item details screen 500 may include a navigation bar 310, an admin button 410, a dashboard button 412, a report a bug button 414, a refresh button 416, a logout button 418, an initial item details subsection 510, an initial item 520, an initial item information subsection 530, a view vine button 540, an additional initial items subsection 550, a back button 560, and an initial item title 570. The initial item details subsection 510 may include a show filters button 512, a create new initial item button 514, an edit this initial item button 516, and a remove this initial item button 518.

In operation the user A 120A may view detailed information about the initial item in the initial item information subsection 530. The detailed information may include the creator of the initial item, the creation date of the initial item, the number of grape items innovated from the initial item, the total number of views of the initial item and the number of unique viewers of the initial item. The user A 120A may use the show filters button 512 to view the current filter settings. The user A 120A may use the create new initial item button 514 to create a new initial item. The initial item may be edited with the edit this initial item button 516 and removed with the remove this initial item button 518. The system 100 may require that the user A 120A have the appropriate permissions in order to add, edit, or delete an initial item. The user A 120A may view the details of another initial item by clicking on an initial item in the additional initial items subsection 550. The user A 120A may click on the back button 560 to return to the initial item selection interface 400 as discussed in FIG. 4. The user A 120A may click on the view vine button 540 to view the items innovated from the initial item in the initial item collaborative innovation interface 600 discussed in more detail in FIGS. 6 and 6A-E below.

Figure 6:
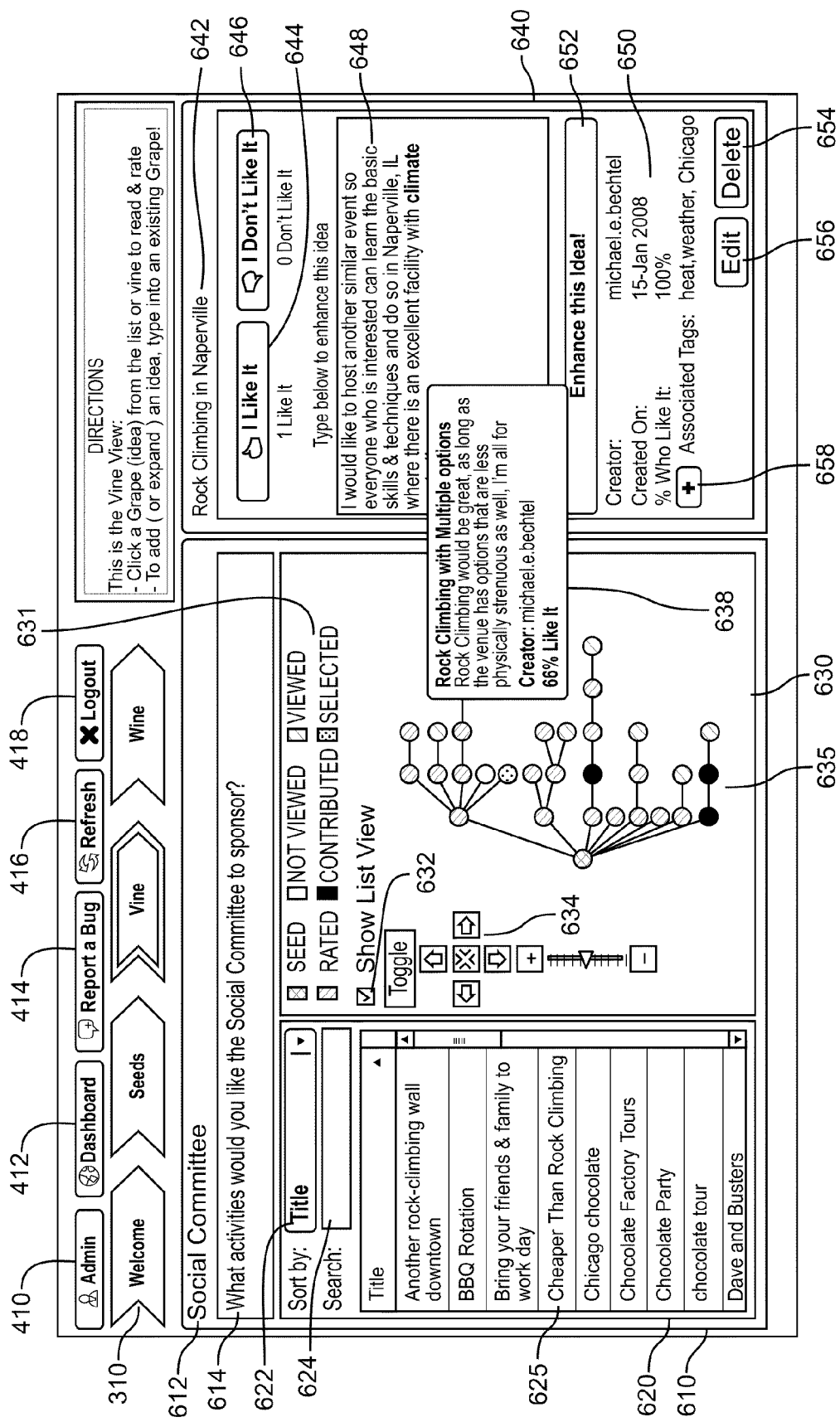
FIG. 6 is a screenshot of an initial item collaborative innovation interface in the system of FIG. 1, or other systems for managing a collaborative environment.

FIG. 6 is a screenshot of an initial item collaborative innovation interface 600 in the system of FIG. 1, or other systems for managing a collaborative environment. The system 100 may display the initial item collaborative innovation interface 600 to the user A 120A when the user A 120A clicks on the view vine button 540 in the initial item details screen 500, as discussed in FIG. 5. The user A 120A may use the initial item collaborative innovation interface 600 to view, add, and rate items that have been innovated from the initial item. The initial item collaborative innovation interface 600 may display a graphical representation of the items, such as in the form of a hierarchical structure or a horizontal tree-like structure.

The initial item collaborative innovation interface 600 may include a navigation bar 310, an admin button 410, a dashboard button 412, a report a bug button 414, a refresh button 416, a logout button 418, an item display section 610 and an item display subsection 640. The item display section 610 may include an item title 612, an initial item 614, an item selector subsection 620 and a collaborative display subsection 630. The item selector subsection 620 may include a sort by selector 622, a search field 624, and an item list 625. The collaborative display subsection 630 may include a legend display 631, a show list view checkbox 632, a display modifier 634, a graphical representation 635, and an item detail display 638. The item display subsection 640 may include an item title field 642, a like button 644, a don't like button 646, an item enhancement field 648, an enhance button 652, an item information display 650, an add tag button 658, an edit button 656, and a delete button 654.

In operation, the user A 120A may view the graphical representation 635 of the items innovated from an initial item in the collaborative display subsection 630. The graphical representation 635 may provide a visual depiction of the collaborative innovation process by representing each item as a shape, such as a circle. The user A 120A may modify the data that is displayed in the graphical representation 635 by using the item selector subsection 620. The user may view items in the item list 625 and may change the items displayed in the item list by using the sort by selector 622 and the search field 624.

The user A 120A may scroll and zoom in and zoom out of the graphical representation 635 using the display modifier 634. The graphical representation 635 may include one or more shapes representing the items, such as circles. The user A 120A may click on one of the shapes to view detailed information regarding the item represented by the shape in the item detail display 638. Alternatively or in addition the information in the item detail display 638 may be automatically displayed when the user A 120A uses a pointing interface, such as a mouse, to hover over a shape in the graphical representation 635. The user A 120A may be able to easily move around the graphical representation 635 at any zoom level. The user A 120A may zoom in and zoom out using the + and − buttons, or by using a mouse wheel. The legend display 631 may color code the shapes representing the items based on whether the user A 120A has contributed, viewed, selected, or rated the item.

The user A 120A may use the item display subsection 640 to view, rate or modify the item represented by the selected shape. The user A 120A may click on the like it button 644 if they like the item represented by the selected shape, or click on the don't like it button 646 if they don't like the item represented by the selected shape. The user A 120A may create an item innovated from the item represented by the selected shape by clicking on the enhance button 652 and entering the item in the item enhancement field 648. The item added by the user A 120A may appear in the graphical representation 635 as a shape connected to the selected shape via a line. The user A 120A may view details of the item represented by the selected shape in the item information display 650. The user A 120A may add a tag to the item represented by the selected shape by clicking on the add tag button 658. The user A 120A may tag an item with any searchable keywords. The user A 120A may edit the item represented by the selected shape by clicking on the edit button 656 and may delete the item represented by the selected shape by clicking on the delete button 654.

Figure 6A:
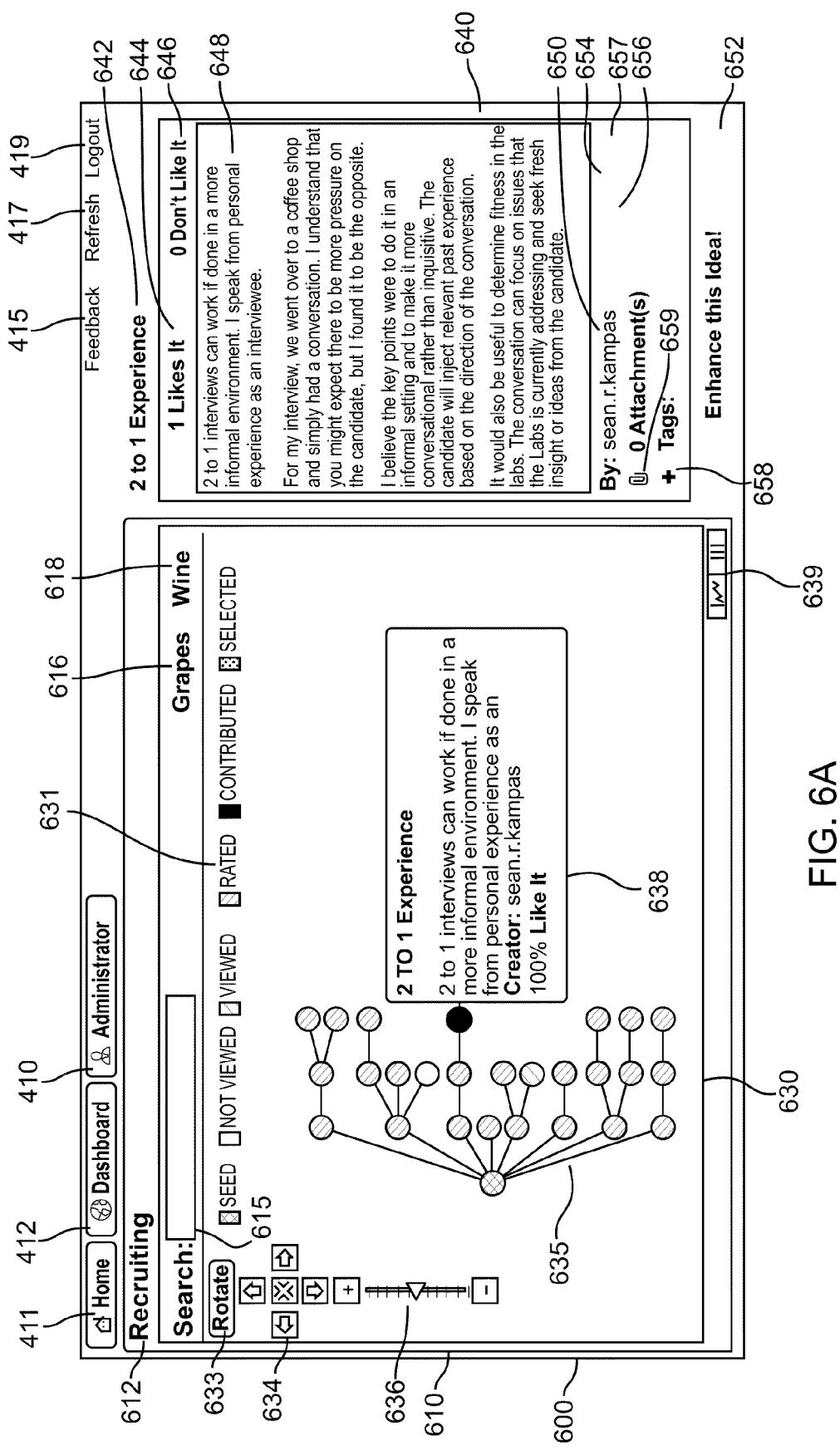
FIG. 6A is a screenshot of an alternative initial item collaborative innovation interface in the system of FIG. 1, or other systems for managing a collaborative environment.

FIG. 6A is a screenshot of an alternative initial item collaborative innovation interface 600 in the system of FIG. 1, or other systems for managing a collaborative environment. The system 100 may display the alternative initial item collaborative innovation interface 600 to the user A 120A when the user A 120A clicks on the view vine button 540 in the initial item details screen 500, as discussed in FIG. 5. The user A 120A may use the alternative initial item collaborative innovation interface 600 to view, add, and rate items that have been innovated from the initial item. The alternative initial item collaborative innovation interface 600 may display a graphical representation of the items, such as in the form of a hierarchical structure.

The alternative initial item collaborative innovation interface 600 may include an admin button 410, a home button 411, a dashboard button 412, a feedback link 415, a refresh link 417, a logout link 419, an item display section 610 and an item display subsection 640. The item display section 610 may include an initial item title 612, a search field 615, a grapes button 616, a wine button 618, and a collaborative display subsection 630. The collaborative display subsection 630 may include a legend display 631, a display modifier 634, a rotate button 633, a zoom bar 636, a graphical representation 635, an item detail display 638, and a list/graph toggle button 639. The item display subsection 640 may include an item title field 642, a like button 644, a don't like button 646, an item enhancement field 648, an enhance button 652, an item information display 650, an add tag button 658, an edit button 656, an add attachment button 659, an email button 657, and a delete button 654.

Figure 6B:
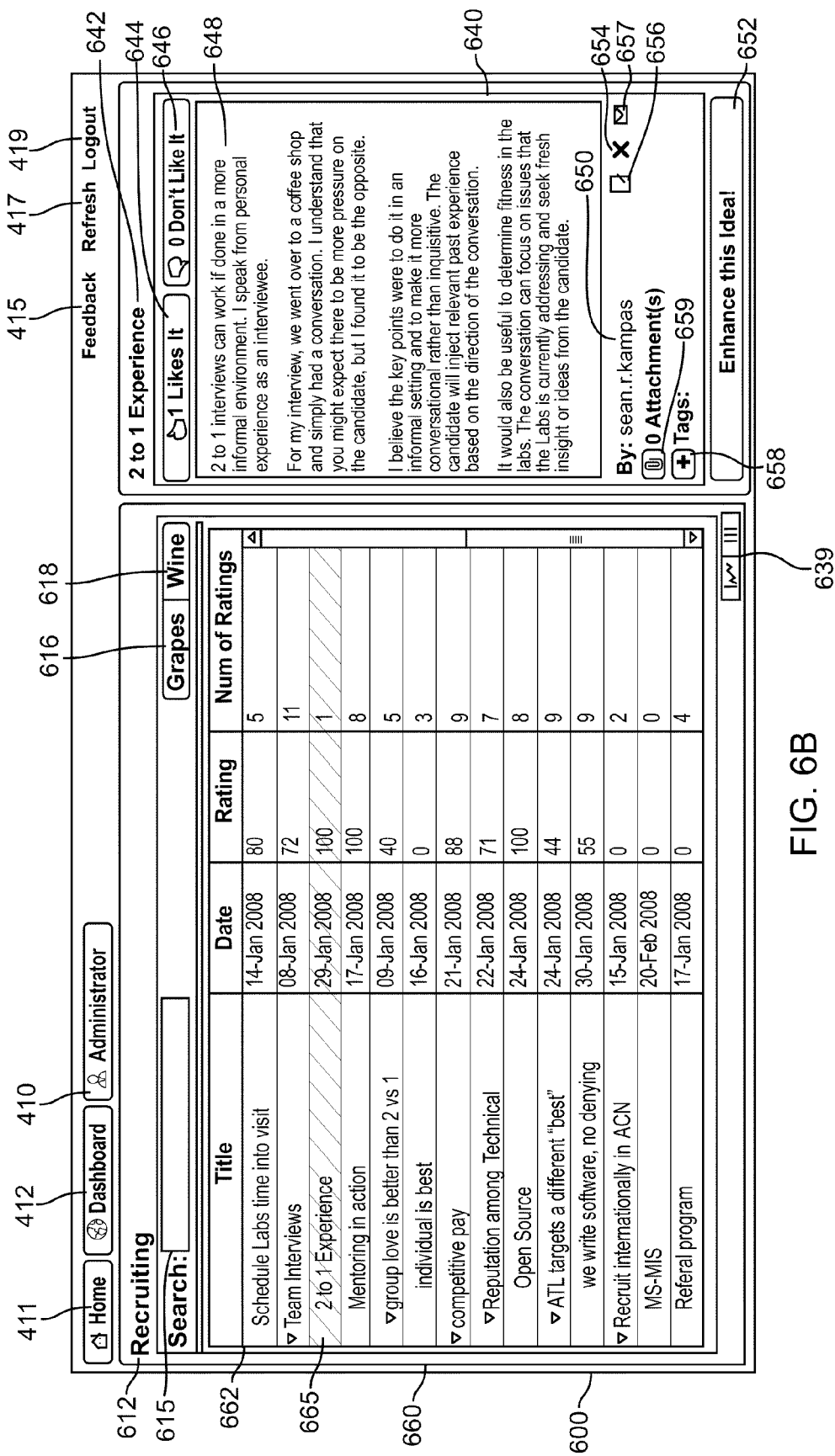
FIG. 6B is a screenshot of an outline representation of the items in an alternative initial item collaborative innovation interface in the system of FIG. 1, or other systems for managing a collaborative environment.

In operation, the user A 120A may view the graphical representation 635 of the items innovated from the initial item identified in the initial item title 612 in the collaborative display subsection 630. The graphical representation 635 may provide a visual depiction of the collaborative innovation process by representing each item as a shape, such as a circle. The user A 120A may toggle between the graphical representation of the items and an outline representation of the items using the list/graph toggle button 639. FIG. 6B describes the outline representation of the items, also referred to as a list view of the items, in more detail.

The user A 120A may move around the graphical representation 635 using the display modifier 634. The user A 120A may zoom in and out of the graphical representation 635 using the zoom bar 636. The user A 120A may rotate the graphical representation 635 using the rotate button 633. The graphical representation 635 may include one or more shapes representing the items, such as circles. The user A 120A may click on one of the shapes to view detailed information regarding the item represented by the shape in the item detail display 638. Alternatively or in addition the information in the item detail display 638 may be automatically displayed when the user A 120A uses a pointing interface, such as a mouse, to hover over a shape in the graphical representation 635. The legend display 631 may color code the shapes representing the items based on whether the user A 120A has contributed, viewed, selected, or rated the item.

The user A 120A may use the item display subsection 640 to view, rate or modify the item represented by the selected shape. The user A 120A may click on the like it button 644 if they like the item represented by the selected shape, or click on the don't like it button 646 if they don't like the item represented by the selected shape. The user A 120A may create an item innovated from the item represented by the selected shape by clicking on the enhance button 652 and entering the item in the item enhancement field 648. The item added by the user A 120A may appear in the graphical representation 635 as a shape connected to the selected shape via a line. The user A 120A may view details of the item represented by the selected shape in the item information display 650. The user A 120A may add a tag to the item represented by the selected shape by clicking on the add tag button 658. The user A 120A may tag an item with any searchable keywords. The user A 120A may add an attachment to the item represented by the selected shape by clicking on the attachment button 659. The user A 120A may email the item represented by the selected shape by clicking on the email button 657. The user A 120A may edit the item represented by the selected shape by clicking on the edit button 656 and may delete the item represented by the selected shape by clicking on the delete button 654.

The user A 120A may search through the items by using the search field 615. The user A 120A may toggle whether the only the best items are searched or whether all the items are searched by using the grapes button 616 and the wine button 618. If the user A 120A clicks on the wine button 618 the search may be limited to the best items. If the user A 120A clicks on the grapes button 616, the search may be expanded to all the items. FIG. 6A may use the term "grape" to refer to each of the items innovated from the initial item, the term "vine" to refer to all of the items innovated from the initial item, and the term "wine" to refer to the best items innovated from the initial item.

FIG. 6B is a screenshot of an outline representation of the items in an alternative initial item collaborative innovation interface 600 in the system of FIG. 1, or other systems for managing a collaborative environment. The system 100 may display the alternative initial item collaborative innovation interface 600 to the user A 120A when the user A 120A clicks on the view vine button 540 in the initial item details screen 500, as discussed in FIG. 5. Alternatively, the outline representation in the alternative initial item collaborative innovation interface 600 may be displayed to the user A 120A when the user clicks on the list/graph toggle button 639 in FIG. 6A. The user A 120A may use the alternative initial item collaborative innovation interface 600 to view, add, and rate items that have been innovated from the initial item.

The alternative initial item collaborative innovation interface 600 may include an admin button 410, a home button 411, a dashboard button 412, a feedback link 415, a refresh link 417, a logout link 419, an item display section 610 and an item display subsection 640. The item display section 610 may include an item title 612, a search field 615, a grapes button 616, a wine button 618, and a collaborative list subsection 660. The collaborative list subsection 660 may include an outline representation 662 and a selected item 665. The item display subsection 640 may include an item title field 642, a like button 644, a don't like button 646, an item enhancement field 648, an enhance button 652, an item information display 650, an add tag button 658, an edit button 656, an add attachment button 659, an email button 657, and a delete button 654.

In operation the user A 120A may view an outline view of the items in the outline representation 662. The selected item 665 may represent an item the user A 120A selected from the outline representation 662. The selected item 665 may be enhanced or rated in the item modification subsection 640. The user A 120A may toggle to the graphical representation of the items using the list/graph toggle button 639. FIGS. 6 and 6A discuss the graphical representation of the items in more detail. The outline representation 662 may display the items in a thread view. The thread view may first display an initial item with the enhancements to the initial item listed below the initial item. Enhancements to the enhancements may be similarly situated below the item and/or enhancement they were derived from.

The user A 120A may use the item display subsection 640 to modify, enhance, or rate a selected item. The user A 120A may click on the like it button 644 if they like the item, or click on the don't like it button 646 if they don't like the item. The user A 120A may create an item innovated from the item represented by the selected shape by clicking on the enhance button 652 and entering the item in the item enhancement field 648. The user A 120A may view details of the selected item in the item information display 650. The user A 120A may add a tag to the item by clicking on the add tag button 658. The user A 120A may tag an item with any searchable keywords. The user A 120A may add an attachment to the selected item by clicking on the attachment button 659. The user A 120A may email the selected item by clicking on the email button 657. The user A 120A may edit the selected item by clicking on the edit button 656 and may delete the selected item by clicking on the delete button 654.

The user A 120A may search through the items by using the search field 615. The user A 120A may toggle whether the only the best items are searched or whether all the items are searched by using the grapes button 616 and the wine button 618. If the user A 120A clicks on the wine button 618 the search may be limited to the best items. If the user A 120A clicks on the grapes button 616, the search may be expanded to all the items. FIG. 6B may use the term "grape" to refer to each individual item innovated from the initial items, the term "vine" to refer to all of the items innovated from an initial item, and the term "wine" to refer to the best items innovated from the initial item.

Figure 6C:
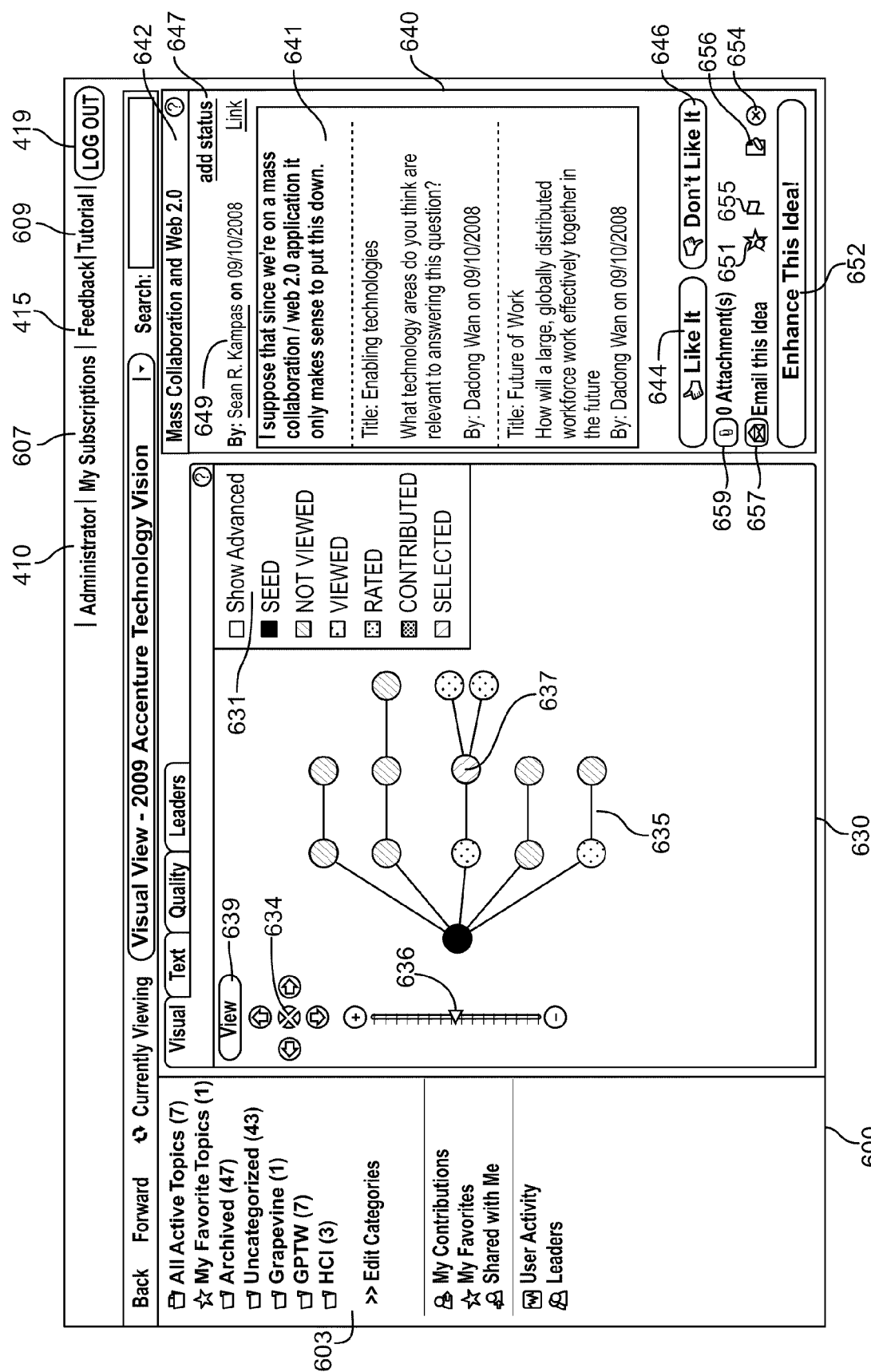
FIG. 6C is a screenshot of an alternative initial item collaborative innovation interface in the system of FIG. 1, or other systems for managing a collaborative environment.

FIG. 6C is a screenshot of an alternative initial item collaborative innovation interface 600 in the system of FIG. 1, or other systems for managing a collaborative environment. The system 100 may display the alternative initial item collaborative innovation interface 600 to the user A 120A when the user A 120A clicks on the view vine button 540 in the initial item details screen 500, as discussed in FIG. 5. The user A 120A may use the alternative initial item collaborative innovation interface 600 to view, add, flag, set the status of, and rate items that have been innovated from the initial item. The alternative initial item collaborative innovation interface 600 may display a graphical representation of the items, such as in the form of a hierarchical structure.

The alternative initial item collaborative innovation interface 600 may include an admin button 410, a my subscriptions link 607, a feedback link 415, a tutorial link 609, a logout link 419, a navigation section 603, a collaborative display subsection 630, and an item modification section 640. The collaborative display subsection 630 may include a legend display 631, a display modifier 634, a zoom bar 636, a graphical representation 635, a selected shape 637, and a list/graph toggle button 639. The item modification section 640 may include a selected item title 642, a like button 644, a don't like button 646, an item description field 641, an enhance button 652, a user identifier field 649, an add status link 647, a favorite button 651, a flag button 655, an edit button 656, a delete button 654, an email button 657 and an add attachment button 659.

In operation, the user A 120A may navigate the system 100 using the navigation section 603. The user A 120A may view the graphical representation 635 of the items innovated from the initial item identified in the graphical representation 635. The graphical representation 635 may provide a visual depiction of the collaborative innovation process by representing each item as a shape, such as a circle. The user A 120A may toggle between the graphical representation of the items and an outline representation of the items using the list/graph toggle button 639. FIG. 6B describes the outline representation of the items, also referred to as a list view of the items, in more detail.

The user A 120A may move around the graphical representation 635 using the display modifier 634. The user A 120A may zoom in and out of the graphical representation 635 using the zoom bar 636. The user A 120A may rotate the graphical representation 635 using the rotate button 633. The graphical representation 635 may include one or more shapes representing the items, such as circles. The user A 120A may click on one of the shapes to view detailed information regarding the item represented by the selected shape 637 in the item modification section 640. The legend display 631 may color code the shapes representing the items based on whether the user A 120A has contributed, viewed, selected, or rated the item.

The user A 120A may use the item modification section 640 to modify, enhance, flag, set the status of, or rate the item represented by the selected shape 637. The user A 120A may click on the like it button 644 if the user A 120A likes the item represented by the selected shape 637, or the user A 120A may click on the don't like it button 646 if the user A 120A doesn't like the item represented by the selected shape 637. The user A 120A may view the description of the item represented by the selected shape 637 in the item description field 641. The user A 120A may create an item innovated from the item represented by the selected shape 637 by clicking on the enhance button 652. The item added by the user A 120A may appear in the graphical representation 635 as a shape connected to the selected shape 637 via a line. The user A 120A may view an identifier of the user who submitted the item represented by the selected shape 637 in the user identifier field 649. The user A 120A may add the item represented by the selected shape 637 as a favorite by clicking on the favorite button 651. The user A 120A may flag the item represented by the selected shape 637 for review by clicking on the flag button 655. When the user A 120A clicks on the flag button 655, the user A 120A may be provided with a popup window containing the flag item interface 1100 of FIG. 11 below. Alternatively or in addition, the flag item interface 1100 may be displayed in the item modification section 640. The user A 120A may edit the item represented by the selected shape 637 by clicking on the edit button 656. The user A 120A may delete the item represented by the selected shape 637 by clicking on the delete button 654. The user A 120A may add an attachment to the item represented by the selected shape 637 by clicking on the attachment button 659. The user A 120A may email the item represented by the selected shape 637 by clicking on the email button 657.

Figure 6D:
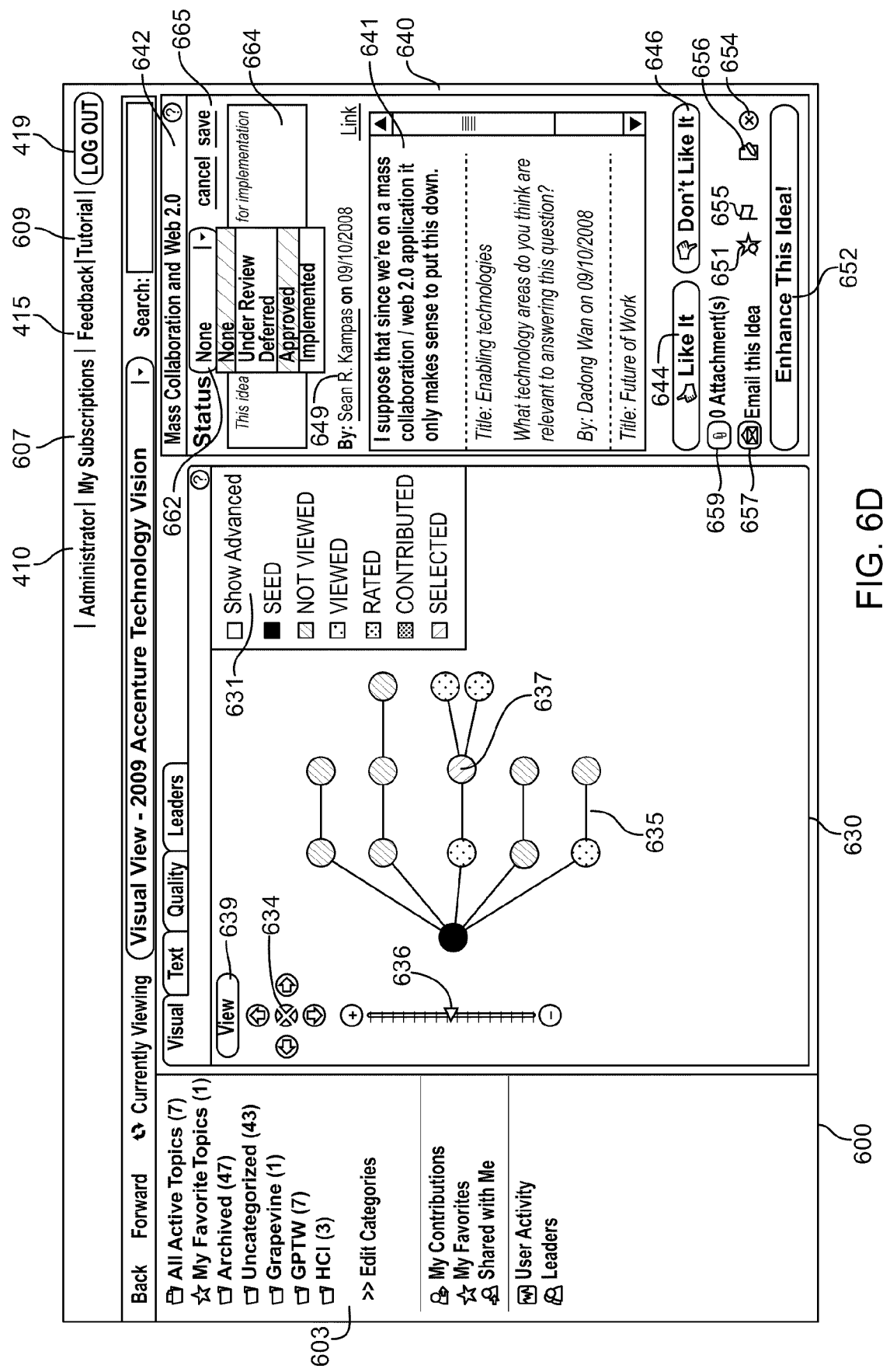
FIG. 6D is a screenshot of an alternative initial item collaborative innovation interface demonstrating the status of an item being set in the system of FIG. 1, or other systems for managing a collaborative environment.

The content providers 110A-N, or other authorized users, may set the status of the item represented by the selected shape 637 by clicking on the add status link 647. The add status link 647 may only appear on the alternative initial item collaborative innovation interface 600 if the user of the screen is one of the content providers 110A-N, an administrator, or another authorized user. When a content provider A 110A clicks on the add status link 647, the service provider server 240 may update the item modification section 640 to appear as shown in FIG. 6D. The content provider A 110A may use the item modification section 640 of FIG. 6D to set the status of the item.

FIG. 6D is a screenshot of an alternative initial item collaborative innovation interface demonstrating the status of an item being set in the system of FIG. 1, or other systems for managing a collaborative environment. The system 100 may display the alternative initial item collaborative innovation interface 600 to the user A 120A when a content provider A 110A, or other authorized user, clicks on the add status link 647 in the item modification section 640 of FIG. 6. The user A 120A may use the alternative initial item collaborative innovation interface 600 to view, add, flag, set the status of, and rate items that have been innovated from the initial item. The alternative initial item collaborative innovation interface 600 may display a graphical representation of the items, such as in the form of a hierarchical structure.

The alternative initial item collaborative innovation interface 600 may include an admin button 410, a my subscriptions link 607, a feedback link 415, a tutorial link 609, a logout link 419, a navigation section 603, a collaborative display subsection 630, and an item modification section 640. The collaborative display subsection 630 may include a legend display 631, a display modifier 634, a zoom bar 636, a graphical representation 635, a item represented by the selected shape 637, and a list/graph toggle button 639. The item modification section 640 may include a selected item title 642, a like button 644, a don't like button 646, an item description field 641, an enhance button 652, a user identifier field 649, a favorite button 651, a flag button 655, an edit button 656, a delete button 654, an email button 657, an add attachment button 659, a status selector 662, a status description field 664, and a save link 665.

In operation, the content provider A 110A may navigate the system 100 using the navigation section 603. The content provider A 110A may view the graphical representation 635 of the items innovated from the initial item identified in the graphical representation 635. The graphical representation 635 may provide a visual depiction of the collaborative innovation process by representing each item as a shape, such as a circle. The content provider A 110A may toggle between the graphical representation of the items and an outline representation of the items using the list/graph toggle button 639. FIG. 6B describes the outline representation of the items, also referred to as a list view of the items, in more detail.

The content provider A 110A may move around the graphical representation 635 using the display modifier 634. The content provider A 110A may zoom in and out of the graphical representation 635 using the zoom bar 636. The user A 120A may rotate the graphical representation 635 using the rotate button 633. The graphical representation 635 may include one or more shapes representing the items, such as circles. The content provider A 110A may click on one of the shapes to view detailed information regarding the item represented by the selected shape 637 in the item modification section 640. The legend display 631 may color code the shapes representing the items based on whether the content provider A 110A as contributed, viewed, selected, or rated the item.

The content provider A 110A may use the item modification section 640 to modify, enhance, flag, set the status of, or rate the item represented by the selected shape 637. The content provider A 110A may click on the like it button 644 if the user A 120A likes the item, or the user A 120A may click on the don't like it button 646 if the user A 120A doesn't like the item represented by the selected shape 637. The content provider A 110A may view the description of the item represented by the selected shape 637 in the item description field 641. The user A 120A may create an item innovated from the item represented by the selected shape 637 by clicking on the enhance button 652. The item added by the user A 120A may appear in the graphical representation 635 as a shape connected to the selected shape 637 via a line. The content provider A 110A may view an identifier of the user who submitted the item in the user identifier field 649. The content provider A 110A may set the item represented by the selected shape 637 as a favorite by clicking on the favorite button 651. The content provider A 110A may flag the item represented by the selected shape 637 for review by clicking on the flag button 655. When the content provider A 110A clicks on the flag button 655, the content provider A 110A may be provided with a popup window containing the flag item interface 1100 of FIG. 11 below. Alternatively or in addition, the flag item interface 1100 may be displayed in the item modification section 640. The content provider A 110A may edit the item represented by the selected shape 637 by clicking on the edit button 656. The content provider A 110A may delete the item represented by the selected shape 637 by clicking on the delete button 654. The content provider A 110A may add an attachment to the item represented by the selected shape 637 by clicking on the attachment button 659. The content provider A 110A may email the item represented by the selected shape 637 by clicking on the email button 657.

The content provider A 110A may set a status for the item represented by the selected shape 637 using the status selector 662. The status selector may list the available statuses in the system 100, such as a under review status, a deferred status, an approved status, an implemented status, and a none status. The under review status may indicate that the item is under review for implementation by the content provider A 110A. The deferred status may indicate that the item is currently deferred from implementation. The approved status may indicate that the item has been approved for implementation within the organization. The implemented status may indicate that the item represented by the selected shape 637 has been implemented. The none status may indicate that no status has been set for the item represented by the selected shape 637. The content provider A 110A may input a description in the status description field 664 relating to the status set for the item represented by the selected shape 637. The service provider server 240 may communicate the status set by the content provider A 110A in the status selector 662, and the description inputted by the content provider A 110A in the status description field 664, to the user A 120A identified by the user identifier field 649. The steps of setting the status and communicating the set status to the user are discussed in more detail in FIG. 14 below.

Alternatively or in addition, the content provider A 110A may click a checkbox to indicate that the status should be applied to all items enhanced from the item represented by the selected shape 637, or the content provider A 110A may click a checkbox to indicate that the status should be applied to all items from which the item represented by the selected shape 637 was enhanced from. For example, if the content provider A 110A sets the status to the deferred status for the selected item, the content provider A 110A may wish to set the status to deferred for all items which were enhanced from the item represented by the selected shape 637, and/or for all items from which the item represented by the selected shape 637 was enhanced from. In the graphical representation 635, the items enhanced from the item represented by the selected shape 637, may appear to the right of the selected shape 637. The items enhanced from the item represented by the selected shape 637 may be connected to the selected shape 637 by a line, or may be connected to the selected shape 637 through one or more other shapes representing items enhanced from the item represented by the selected shape 637. The items from which the item represented by the selected shape 637 was enhanced from may appear to the left of the selected shape 637 in the graphical representation 635. The items from which the item represented by the selected shape 637 was enhanced from may be connected to the selected shape 637 by a line, or may be connected to the selected shape 637 through one or more other shapes representing items from which the item represented by the selected shape 637 was enhanced from. In this case, each user who provided each other item may also receive a notification that the status for the item was set by the content provider A 110A.

Figure 6E:
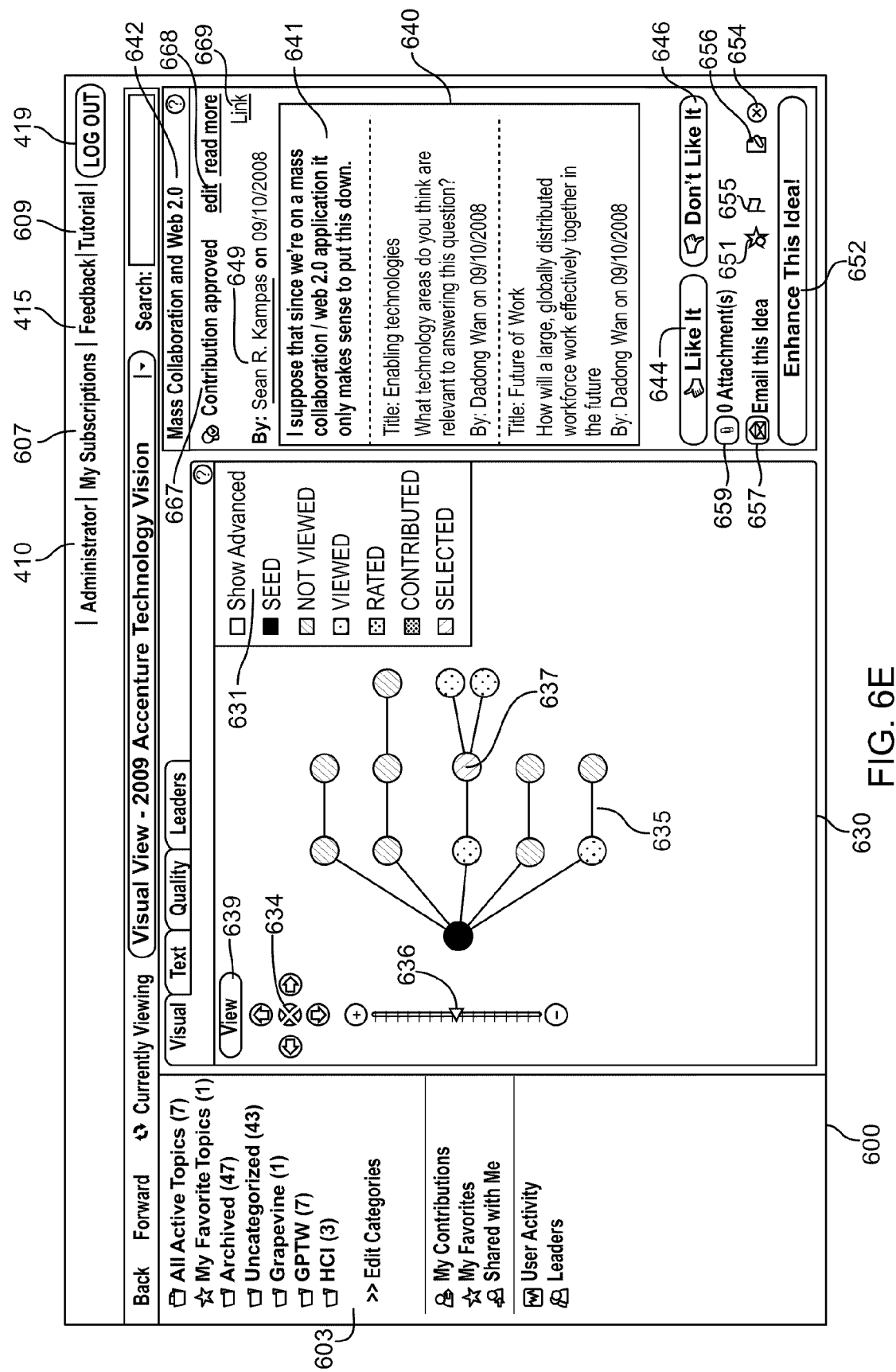
FIG. 6E is a screenshot of an alternative initial item collaborative innovation interface displaying an item with a set status in the system of FIG. 1, or other systems for managing a collaborative environment.

FIG. 6E is a screenshot of an alternative initial item collaborative innovation interface including an item with a set status in the system of FIG. 1, or other systems for managing a collaborative environment. The system 100 may display the alternative initial item collaborative innovation interface 600 to a user A 120A after a content provider A 110A, or other authorized user, sets the status of the item represented by the selected shape 637, such as through the item modification section 640 of FIG. 6D. The user A 120A may use the alternative initial item collaborative innovation interface 600 to view, add, flag, view the status of, and rate items that have been innovated from the initial item. The alternative initial item collaborative innovation interface 600 may display a graphical representation of the items, such as in the form of a hierarchical structure.

The alternative initial item collaborative innovation interface 600 may include an admin button 410, a my subscriptions link 607, a feedback link 415, a tutorial link 609, a logout link 419, a navigation section 603, a collaborative display subsection 630, and an item modification section 640. The collaborative display subsection 630 may include a legend display 631, a display modifier 634, a zoom bar 636, a graphical representation 635, a item represented by the selected shape 637, and a list/graph toggle button 639. The item modification section 640 may include a selected item title 642, a like button 644, a don't like button 646, an item description field 641, an enhance button 652, a user identifier field 649, an status field 667, an edit status link 668, a read more status link 669, a favorite button 651, a flag button 655, an edit button 656, a delete button 654, an email button 657 and an add attachment button 659.

In operation, the user A 120A may navigate the system 100 using the navigation section 603. The user A 120A may view the graphical representation 635 of the items innovated from the initial item identified in the graphical representation 635. The graphical representation 635 may provide a visual depiction of the collaborative innovation process by representing each item as a shape, such as a circle. The user A 120A may toggle between the graphical representation of the items and an outline representation of the items using the list/graph toggle button 639. FIG. 6B describes the outline representation of the items, also referred to as a list view of the items, in more detail.

The user A 120A may move around the graphical representation 635 using the display modifier 634. The user A 120A may zoom in and out of the graphical representation 635 using the zoom bar 636. The user A 120A may rotate the graphical representation 635 using the rotate button 633. The graphical representation 635 may include one or more shapes representing the items, such as circles. The user A 120A may click on one of the shapes to view detailed information regarding the item represented by the selected shape 637 in the item modification section 640. The legend display 631 may color code the shapes representing the items based on whether the user A 120A has contributed, viewed, selected, or rated the item.

The user A 120A may use the item modification section 640 to modify, enhance, flag, set the status of, or rate the item represented by the selected shape 637. The user A 120A may click on the like it button 644 if the user A 120A likes the item, or the user A 120A may click on the don't like it button 646 if the user A 120A doesn't like the item represented by the selected shape 637. The user A 120A may view the description of the item represented by the selected shape 637 in the item description field 641. The user A 120A may create an item innovated from the item represented by the selected shape 637 by clicking on the enhance button 652. The item added by the user A 120A may appear in the graphical representation 635 as a shape connected to the selected shape 637 via a line. The user A 120A may view an identifier of the user who submitted the item represented by the selected shape 637 in the user identifier field 649. The user A 120A may view the status of the item represented by the selected shape 637 in the status field 667. The user A 120A may view more information about the status of the item represented by the selected shape 637, such as a description relating to the status, by clicking on the read more link 669. The user A 120A may add the item represented by the selected shape 637 as a favorite by clicking on the favorite button 651. The user A 120A may flag the item represented by the selected shape 637 for review by clicking on the flag button 655. When the user A 120A clicks on the flag button 655, the user A 120A may be provided with a popup windows containing the flag item interface 1100 of FIG. 11 below. Alternatively or in addition, the flag item interface 1100 may be displayed in the item modification section 640. The user A 120A may edit the item represented by the selected shape 637 by clicking on the edit button 656. The user A 120A may delete the item represented by the selected shape 637 by clicking on the delete button 654. The user A 120A may add an attachment to the item represented by the selected shape 637 by clicking on the attachment button 659. The user A 120A may email the item represented by the selected shape 637 by clicking on the email button 657.

The content providers 110A-N, or other authorized users, may edit the status of the item represented by the selected shape 637 by clicking on the edit status link 668. The edit status link 668 may only appear on the alternative initial item collaborative innovation interface 600 if the user of the screen is one of the content providers 110A-N, an administrator, or other authorized user. When a content provider A 110A clicks on the edit status link 668, the service provider server 240 may update the item modification section 640 to appear as shown in FIG. 6D. The content provider A 110A may use the item modification section 640 of FIG. 6D to edit the status of the item.

Figure 7:
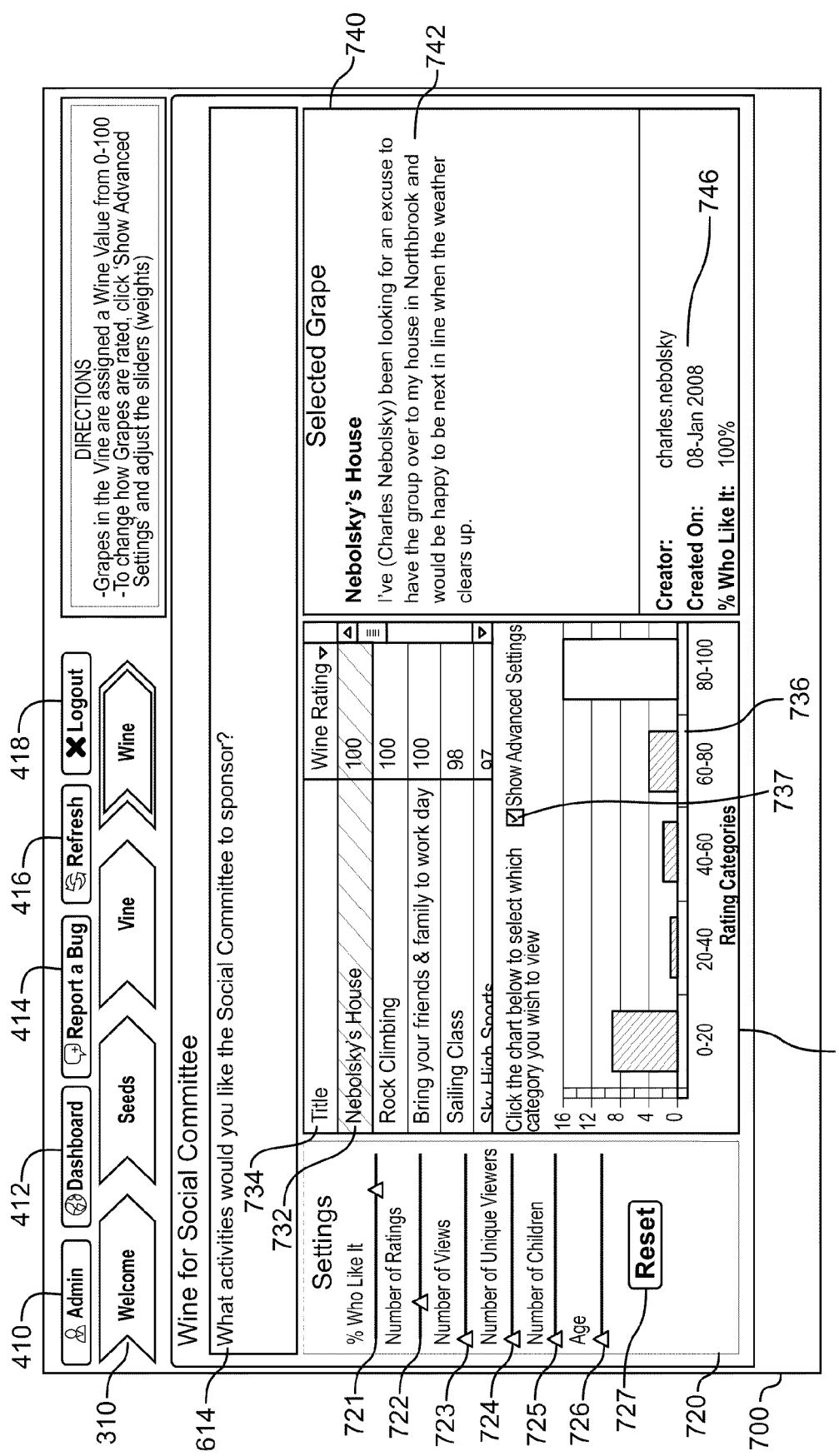
FIG. 7 is a screenshot of an initial item results screen in the system of FIG. 1, or other systems for managing a collaborative environment.

FIG. 7 is a screenshot of an initial item results screen 700 in the system of FIG. 1, or other systems for managing a collaborative environment. The system 100 may display the initial item results screen 700 to one of the content providers 110A-N, such as the content provider A 110A. The initial item results screen 700 may display a summary of the items that were innovated from the initial item. The items stemming from the initial item may be sorted based on the ratings received from the users 120A-N.

The initial item results screen 700 may include a navigation bar 310, an admin button 410, a dashboard button 412, a report a bug button 414, a refresh button 416, a logout button 418, an initial item 614, a settings subsection 720, a summary subsection 730, and a selected item subsection 740. The settings subsection 720 may include a like it selector 721, a number of ratings selector 722, a number of views selector 723, a number of unique viewers selector 724, a number of children selector 725, an age selector 726 and a reset button 727. The summary subsection 730 may include a rating category graph 736, an item list 734, an advanced settings checkbox 737, and a selected item 732. The selected item subsection 740 may include a selected item description display 742 and a selected item details display 746.

The settings subsection 720 may be used to modify the weight given to each factor in the overall rating calculation. The selectors 721, 722, 723, 724, 725, 726 may be adjusted to change the weight afforded to each factor in the overall ratings calculations. The selectors 721, 722, 723, 724, 725, 726 may be reset by clicking on the reset button 727. The summary subsection 730 may display the items most highly rated by the users 120A-N in accordance with the weight of the factors indicated in the settings subsection 720. The user A 120A may use the advanced settings checkbox 737 to toggle the display of the settings subsection 720. The ratings category graph 736 may display ranges of the ratings for the selected initial item. The user A 120A may click on a bar in the ratings category graph 736 to change the range of ratings of the items displayed in the item list 734.

The user A 120A may select an item from the item list 734 and view detailed information regarding the selected item in the selected item subsection 740. The user A 120A may view the description of the selected item 732 in the selected item description display 742. The user A 120A may view the details associated with the selected item in the selected item description display 746.

Figure 7A:
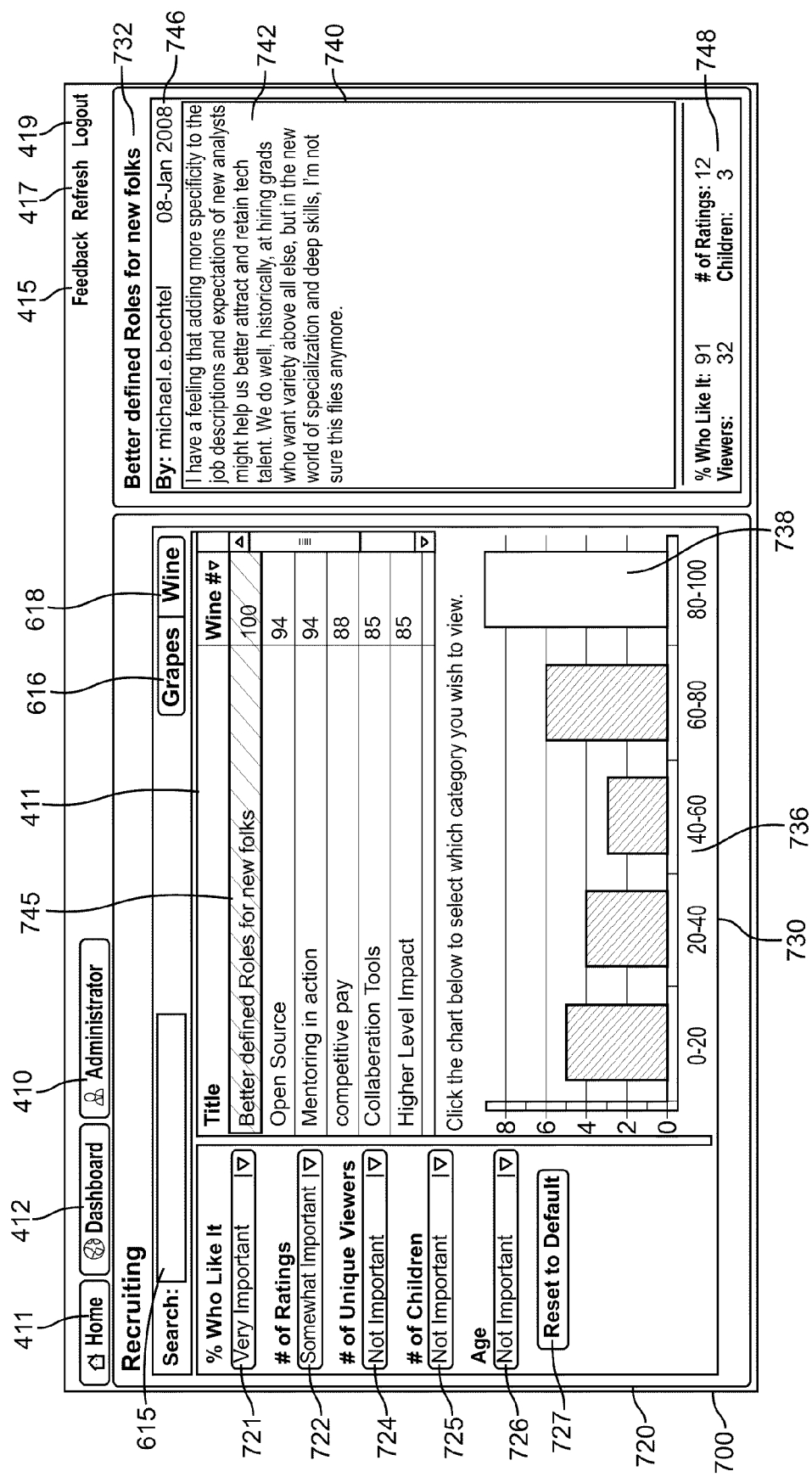
FIG. 7A is a screenshot of an alternative initial item results screen in the system of FIG. 1, or other systems for managing a collaborative environment.

FIG. 7A is a screenshot of an alternative initial item results screen 700 in the system of FIG. 1, or other systems for managing a collaborative environment. The system 100 may display the alternative initial item results screen 700 to one of the content providers 110A-N, such as the content provider A 110A. The alternative initial item results screen 700 may display a summary of the items that were innovated from the initial item. The items innovated from the initial item may be sorted based on the ratings received from the users 120A-N.

The initial item results screen 700 may include an admin button 410, a home button 411, a dashboard button 412, a feedback link 415, a refresh link 417, a logout link 419, a search field 615, a grapes button 616, a wine button 618, a settings subsection 720, a summary subsection 730, and a selected item subsection 740. The settings subsection 720 may include a like it selector 721, a number of ratings selector 722, a number of unique viewers selector 724, a number of children selector 725, an age selector 726 and a reset button 727. The summary subsection 730 may include a rating category graph 736, an item list 734, a selected rating bar 738, and a selected item 732. The selected item subsection 740 may include a selected item 732, a selected item description display 742, a selected item details display 746, and a selected item ratings display 748.

The settings subsection 720 may be used to modify the weight given to each factor in the overall rating calculation. The selectors 721, 722, 724, 725, 726 may be adjusted to change the weight afforded to each factor in the overall ratings calculations. The selectors 721, 722, 724, 725, 726 may be reset by clicking on the reset button 727. The summary subsection 730 may display the items most highly rated by the users 120A-N in accordance with the weight of the factors indicated in the settings subsection 720. The ratings category graph 736 may display ranges of the ratings for the selected initial item. The selected rating bar 738 in the ratings category graph 736 may be a bar selected by the user A 120A. The selected rating bar 738 in the ratings category graph 736 to change the range of ratings of the items displayed in the item list 734.

The user A 120A may select an item from the item list 734 and view detailed information regarding the selected item 732 in the selected item subsection 740. The user A 120A may view the description of the selected item 732 in the selected item description display 742. The user A 120A may view the details associated with the selected item 732, such as creation details, in the selected item description display 746. The user A 120A may view ratings information of the selected item 732 in the selected item ratings display 748.

Figure 8:
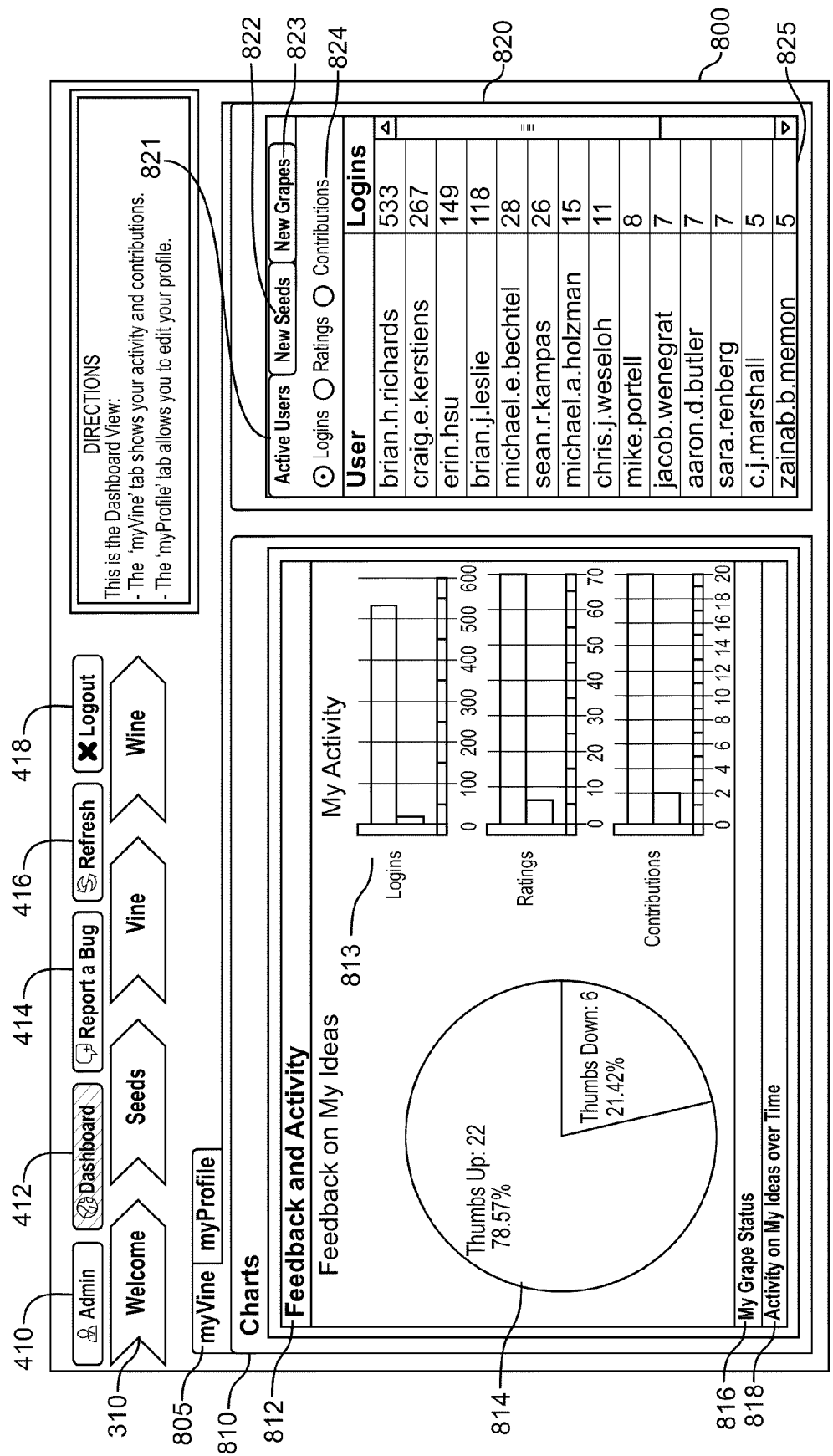
FIG. 8 is a screenshot of a user dashboard screen displaying the my vine tab in the system of FIG. 1, or other systems for managing a collaborative environment.

FIG. 8 is a screenshot of a user dashboard screen 800 in the system of FIG. 1, or other systems for managing a collaborative environment. The system 100 may display the user dashboard screen 800 to the user A 120A when the user A 120A clicks on the dashboard button 412. The user A 120A may use the user dashboard screen 800 to obtain a quick overview of recent changes that have occurred in the system 100. The user A 120A may also use the user dashboard screen 800 to view metrics regarding their use of the system 100 and the other users 120B-N use of the system 100.

The user dashboard screen 800 may include a navigation bar 310, an admin button 410, a dashboard button 412, a report a bug button 414, a refresh button 416, a logout button 418, a vine tab 805, a charts subsection 810 and a user subsection 820. The charts subsection 810 may include a feedback and activity header 812, a grape status header 816, an activity header 818, a feedback graph 814, and an activity display 813. The user subsection 820 may include an active users tab 821, a new initial items tab 822, a new grape items tab 823, a display selector 824 and a user list 825.

In operation, the user A 120A may view their activity in the charts subsection 810. The feedback graph 814 may display the number of items liked by the user A 120A and the number of items disliked by the user A 120A. The activity display 813 may display the activity of the user A 120A in the system 100. The activity display 813 may display the logins, ratings, and items contributed by the user A 120A. The user subsection 820 may display the activity of the other users 120B-N. The user A 120A may click on the new initial items tab 822 to view the new initial item activity or the user A 120A may click on the new grape items tab 823 to view the new grape item activity.

The user A 120A may click on the grape status header 816 to view data associated with the status of their items. The status of the items may be used to provide feedback to the other users 120B-N. The status of the items may be published to the users 120A-N via email, text messaging, social network messaging, or generally any messaging system capable of communicating the items. The user A 120A may click on the activity header 818 to view the activity on their items over a period of time. The user A 120A may click on the myProfile tab in the vine tab 805 to view the data associated with their user profile.

Figure 8A:
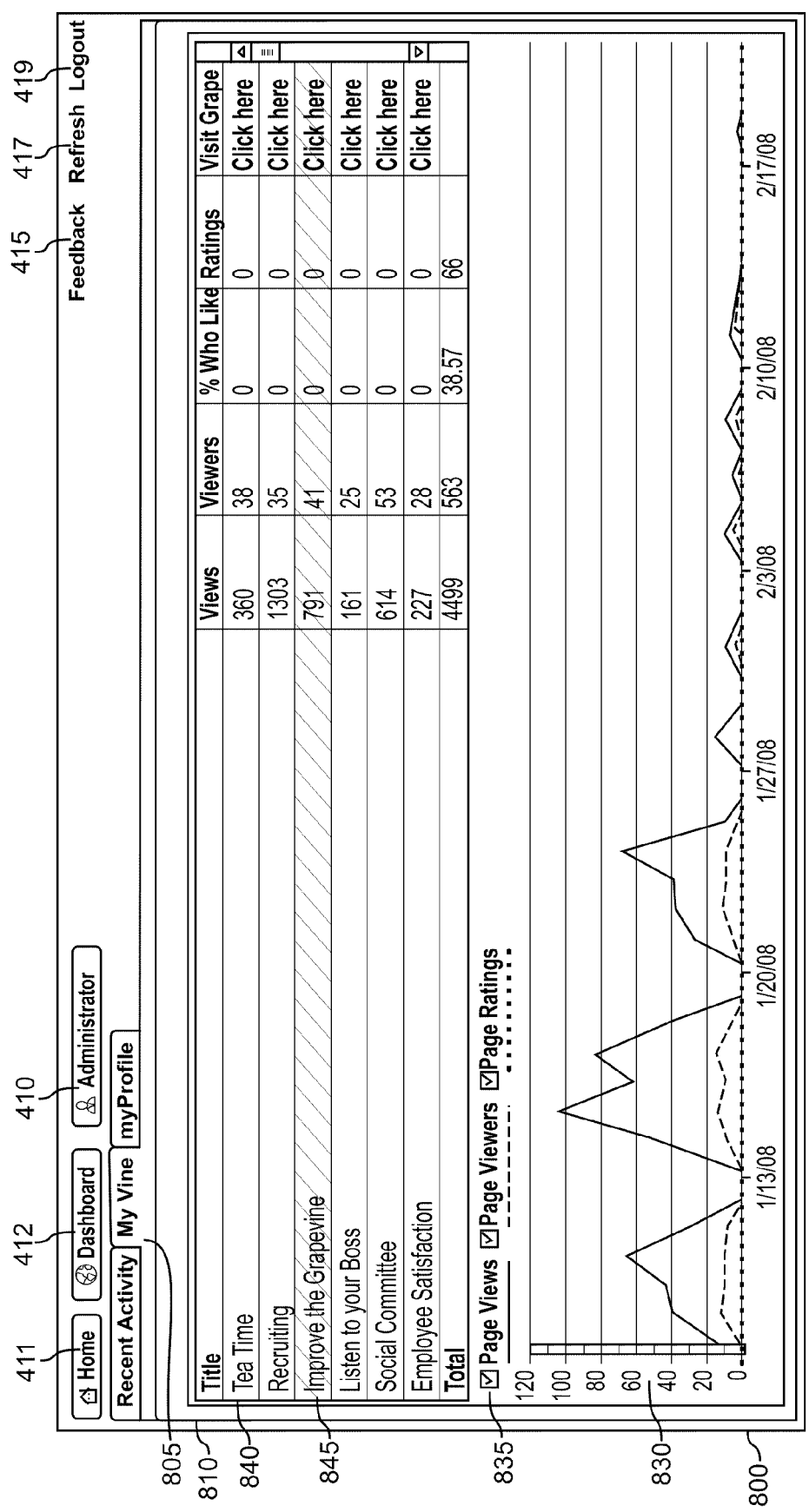
FIG. 8A is a screenshot of an alternative user dashboard screen displaying the my vine tab in the system of FIG. 1, or other systems for managing a collaborative environment.

FIG. 8A is a screenshot of an alternative user dashboard screen 800 displaying the my vine tab in the system of FIG. 1, or other systems for managing a collaborative environment. The system 100 may display the alternative user dashboard screen 800 to the user A 120A when the user A 120A clicks on the dashboard button 412. The user A 120A may use the alternative user dashboard screen 800 to obtain a quick overview of recent changes that have occurred in the system 100. The user A 120A may also use the alternative user dashboard screen 800 to view metrics regarding their use of the system 100 and the other users 120B-N use of the system 100.

The alternative user dashboard screen 800 may include an admin button 410, a home button 411, a dashboard button 412, feedback link 415, a refresh link 417, a logout link 419, a vine tab 805, and charts subsection 810. The charts subsection 810 may include an initial item table 840, a selected initial item 845, a view graph 830 and view filters 835.

In operation the user A 120A may view their activity in the charts subsection 810. The initial item table 840 may display all of the initial items in the system 100 the user A 120A has provided items or ratings for. Alternatively or in addition the initial item table 840 may display all of the initial items in the system 100. The selected initial item 845 may be an initial item the user A 120A would like to view additional information for. The view graph 830, may display detailed information regarding the selected initial item 845. The user A 120A may use the view filters 835 to select one or more metrics for the selected item 845. For example, the user A 120A may view a graph of the page views for the selected item 845, the page viewers for the selected item 845, and/or the page ratings for the selected item 845. The user A 120A may click on the "click here" field in the "Visit Grape" column to view the associated initial item or item.

Figure 9:
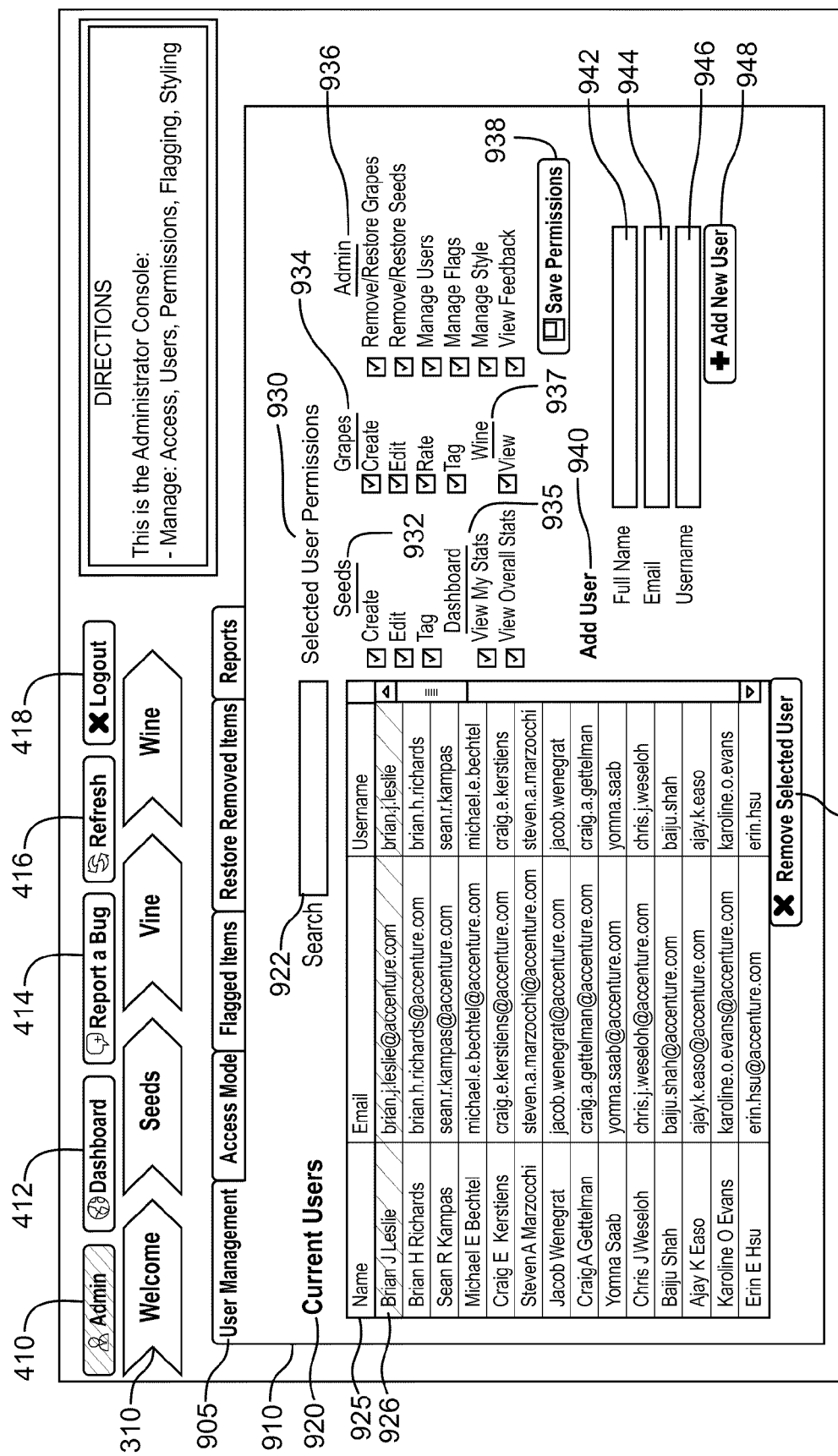
FIG. 9 is a screenshot of an administrator interface in the system of FIG. 1, or other systems for managing a collaborative environment.

FIG. 9 is a screenshot of an administrator interface 900 in the system of FIG. 1, or other systems for managing a collaborative environment. The system 100 may display the administrator interface 900 to the user A 120A when the user A 120A clicks on the admin button 410. The user A 120A may use the administrator interface 900 to view and modify the administrative data associated with the system 100. A user A 120A with administrator privileges may be taken directly to the administrator interface 900 upon logging into the system 100.

The administrator interface 900 may include a navigation bar 310, an admin button 410, a dashboard button 412, a report a bug button 414, a refresh button 416, a logout button 418, an administrator tabset 905, a user management section 910, a current users subsection 920, a selected user permissions subsection 930, and a add user subsection 940. The current users subsection 920 may include a search field 922, a current users table 925, a selected user 926, and a remove selected user button 928. The selected users subsection 930 may include an initial items permissions 932, a grape items permissions 934, admin items permissions 936, and a save permissions button 938. The add user subsection 940 may include a full name field 942, an email field 944, a username field 946, and a add new user button 948. The administrator interface may be designed using ADOBE FLEX ACCORDION. Each accordion may contain controls similar in nature.

In operation one of the users 120A-N with administrator privileges, such as the user A 120A, may use the administrator interface 900 to modify or view the permissions of the users 120A-N. The user A 120A may search the current users table 925 by entering a name of a user in the search field 922. The user A 120A may remove the selected user 926 by clicking on the remove selected user button 928. The user A 120A may modify the permissions associated with the selected user 926 in the selected user permissions subsection 930. The user A 120A may select or deselect one or more of the initial item permissions 932, the grape item permissions 934, the dashboard permissions 935, the admin permissions 936, and the wine permissions 937. The initial item permissions 932 may include create, edit, and tag permissions. The grape item permissions 934 may include create, edit, rate, and tag permissions. The admin permissions 936 may include remove/restore grape items, remove/restore initial items, manage users, manage flags, manage style and view feedback permissions. The dashboard permissions 935 may include view my stats and view overall stats permissions. The wine permissions 937 may include view permissions. The user A 120A may affect the changes in permissions by clicking on the save permissions button 938.

The user A 120A may add a new user using the add user subsection 940. The user A 120A may enter the name of the new user in the name field 942, the email of the new user in the email field 944 and the username of the new user in the username field 946. The user A 120A may add the new user by clicking on the add new user button 948.

Alternatively or in addition the user A 120A may use the administrator interface 900 to change the color scheme or font size of the interface. The administrator interface 900 may also be used to generate reports. The administrator interface 900 may be used to add, change or remove branding, or generally add, change or remove any features of the system 100. The administrator interface 900 may be used to manage the access mode. The access mode may be open access, domain restricted access, admin added access, or admin approved access. If the system 100 is operating in open access any person may create an account and login. If the system 100 is operating in domain restricted access, only persons with email accounts in a certain domain may create an account and login. If the system 100 is operating in admin added mode, an administrator must add a user to a user list in order to grant access. If the system 100 is operating in admin approved mode an administrator must approve of a user's request for access to the system 100.

Figure 9A:
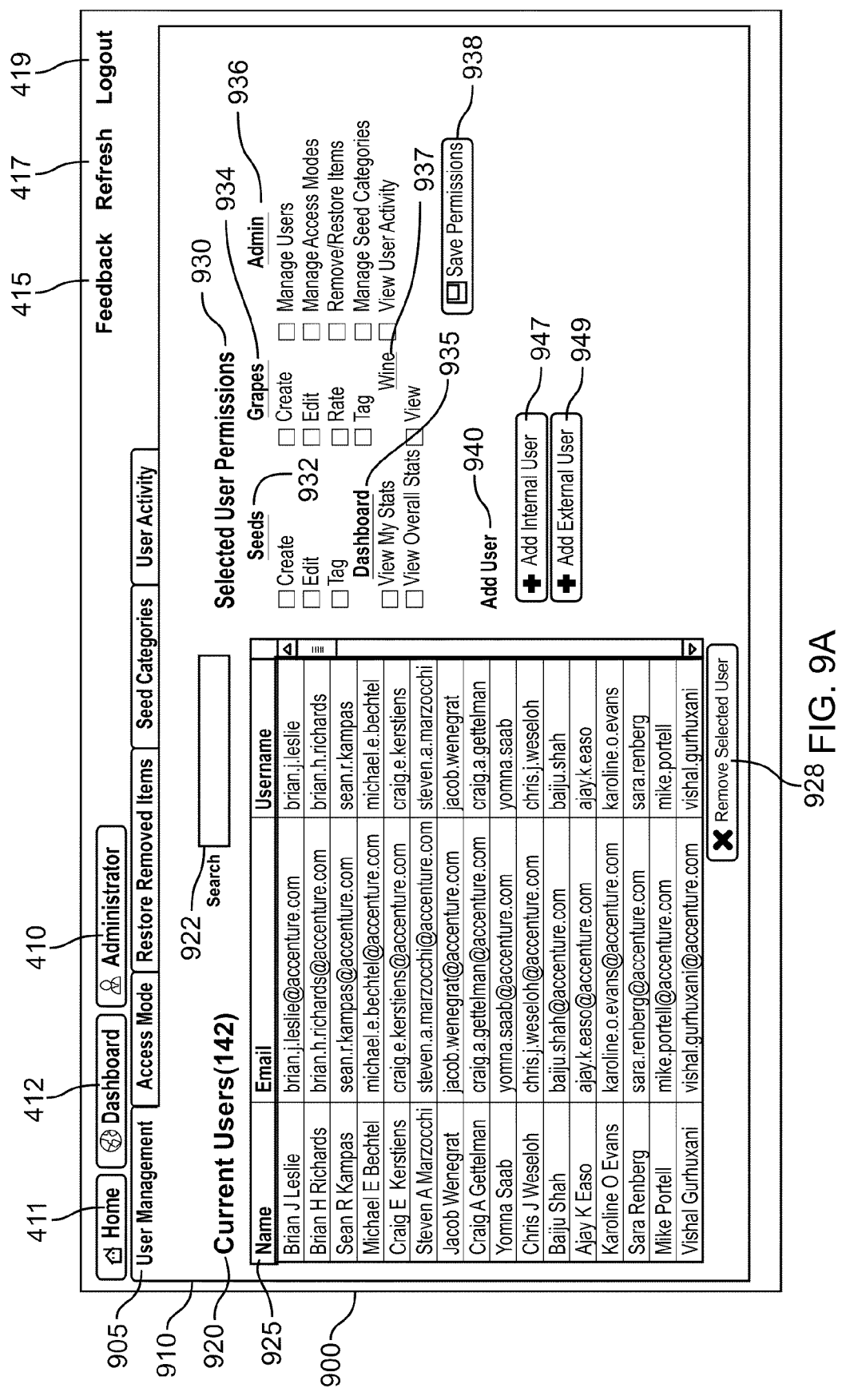

FIG. 9A is a screenshot of an alternative administrator interface 900 in the system of FIG. 1, or other systems for managing a collaborative environment. The system 100 may display the alternative administrator interface 900 to the user A 120A when the user A 120A clicks on the admin button 410. The user A 120A may use the alternative administrator interface 900 to view and modify the administrative data associated with the system 100. A user A 120A with administrator privileges may be taken directly to the alternative administrator interface 900 upon logging into the system 100.

The alternative administrator interface 900 may include an admin button 410, a home button 411, a dashboard button 412, a feedback link 415, a feedback link 417, a logout link 419, an administrator tabset 905, a user management section 910, a current users subsection 920, a selected user permissions subsection 930, and a add user subsection 940. The current users subsection 920 may include a search field 922, a current users table 925, a selected user 926, and a remove selected user button 928. The selected users subsection 930 may include an initial items permissions 932, a grape items permissions 934, admin items permissions 936, and a save permissions button 938. The add user subsection 940 may include an add internal user button 947 and an add external user button 949. The administrator interface may be designed using ADOBE FLEX ACCORDION. Each accordion may contain controls similar in nature.

In operation one of the users 120A-N with administrator privileges, such as the user A 120A, may use the administrator interface 900 to modify or view the permissions of the users 120A-N. The user A 120A may search the current users table 925 by entering a name of a user in the search field 922. The user A 120A may remove the selected user 926 by clicking on the remove selected user button 928. The user A 120A may modify the permissions associated with the selected user 926 in the selected user permissions subsection 930. The user A 120A may select or deselect one or more of the initial item permissions 932, the grape item permissions 934, the dashboard permissions 935, the admin permissions 936, and the wine permissions 937. The initial item permissions 932 may include create, edit, and tag permissions. The grape item permissions 934 may include create, edit, rate, and tag permissions. The admin permissions 936 may include remove/restore grape items, remove/restore initial items, manage users, manage flags, manage style and view feedback permissions. The dashboard permissions 935 may include view my stats and view overall stats permissions. The wine permissions 937 may include view permissions. The user A 120A may affect the changes in permissions by clicking on the save permissions button 938.

The user A 120A may add a new user using the add user subsection 940. The user A 120A may click on the add internal user button 947 to add a new internal user and the add external user button 949 at add a new external user. An internal user may be a member of the organization or the collaborative environment while an external user may be a person external to the organization. The external users may, by default, be given more restrictive user permissions.

Alternatively or in addition the user A 120A may use the administrator interface 900 to change the color scheme or font size of the interface. The administrator interface 900 may also be used to generate reports. The administrator interface 900 may be used to add, change or remove branding, or generally add, change or remove any features of the system 100. The administrator interface 900 may be used to manage the access mode. The access mode may be open access, domain restricted access, admin added access, or admin approved access. If the system 100 is operating in open access any person may create an account and login. If the system 100 is operating in domain restricted access, only persons with email accounts in a certain domain may create an account and login. If the system 100 is operating in admin added mode, an administrator must add a user to a user list in order to grant access. If the system 100 is operating in admin approved mode an administrator must approve of a user's request for access to the system 100.

Figure 9B:
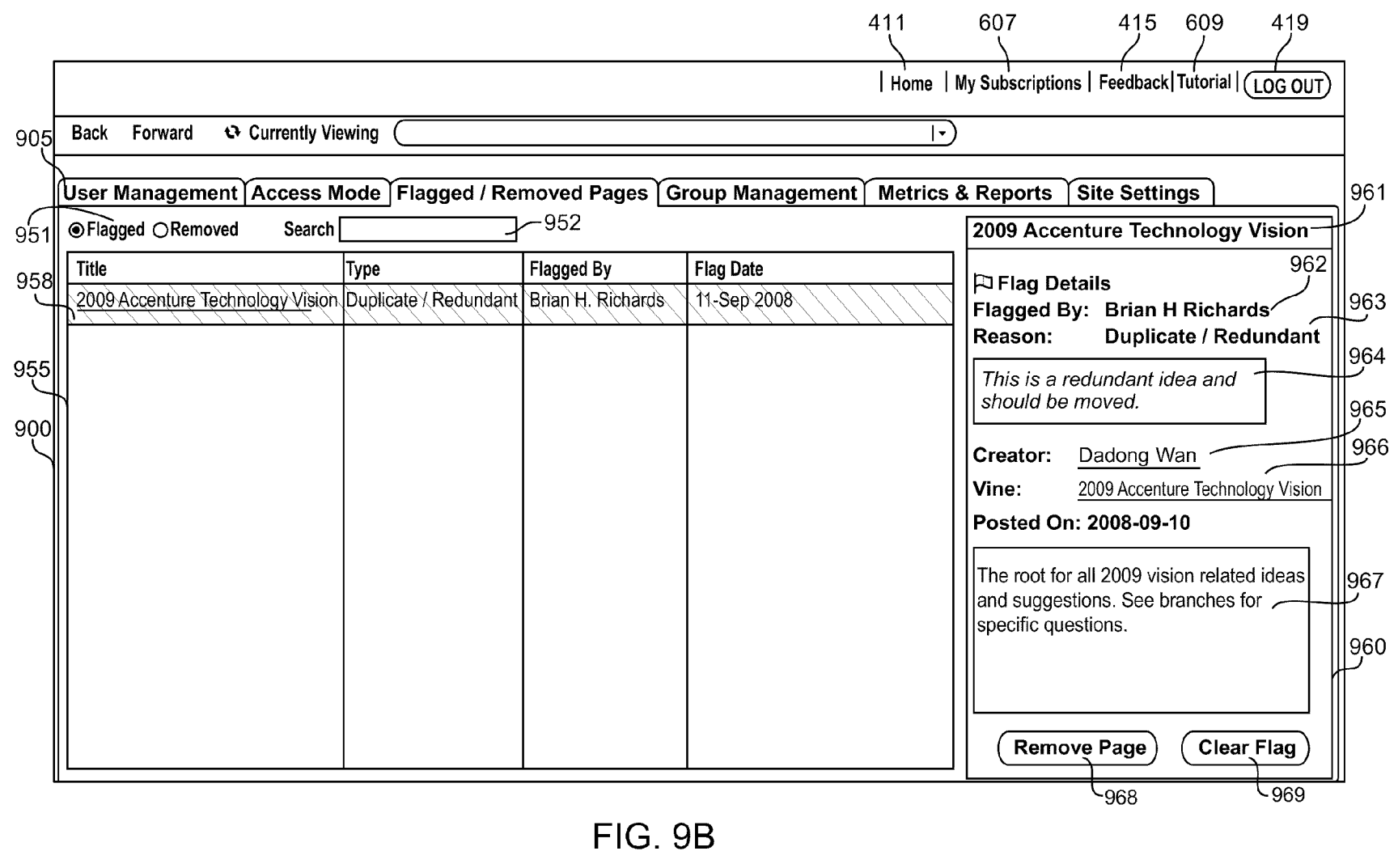

FIG. 9B is a screenshot of an alternative administrator interface 900 showing the flagged items tab in the system of FIG. 1, or other systems for managing a collaborative environment. The alternative administrator interface 900 showing the flagged items may be displayed to an administrator, or other authorized user, when the administrator clicks on the flagged/removed tab in the administrator tabset 905. The administrator may use the alternative administrator interface 900 to view flagged items and clear the flags or remove the items from the system 100.

The alternative administrator interface 900 may include a home button 411, a my subscriptions link 607, a feedback link 415, a tutorial link 609, a logout link 419, an administrator tabset 905, a flagged items section 950, and a flag details section 960. The flagged items section 950 may include a flagged/removed selector 951, a search field 952, a flagged items table 955, and a selected flagged item 958. The flag details section 960 may include a flagged item title field 961, a flagged user field 962, a reason field 963, a flag description field 964, a creator field 965, a vine field 966, an item description field 967, a remove page button 968, and a clear flag button 969.

In operation, an administrator or other authorized user may view the flagged or removed items in the flagged items table 955. The administrator may toggle between viewing flagged items and removed items in the flagged items table 955 by using the flagged/removed selector 951. The administrator may use the search field 952 to search the flagged items table 955. The administrator may select a flagged item in the flagged items table 955 by clicking on the selected item 958. The administrator may view the flagged item and clear the flag or remove the item in the flag details section 960.

The administrator may view the title of the item in the flagged item title field 961. The administrator may view the user who flagged the item in the flagged user field 962. The administrator may view the reason selected by the user for flagging the item in the reason field 963 and may view the description inputted by the user in the flag description field 964. The administrator may view the user who created the item in the creator field 965, the vine the item belongs to in the vine field 966, and a description of the item in the item description field 967.

The administrator may evaluate the information displayed in the flag details section 960 and determine whether the flag should be cleared from the item or whether the flagged item should be removed from the system 100. If the administrator determines that the item should be removed from the system 100, the administrator may click on the remove page button 968. The remove page button 968 may cause the item to be removed from the view of the users 120A-N. If the administrator determines the item should not be flagged, the administrator may click on the clear flag button 969. The clear flag button may clear the flag from the item. If the flag caused the item to be removed from the view of the users 120A-N, the item may reappear to the users 120A-N. The steps associated with reviewing flagged items and clearing the flag or removing the item are discussed in more detail in FIG. 13 below.

Figure 10:
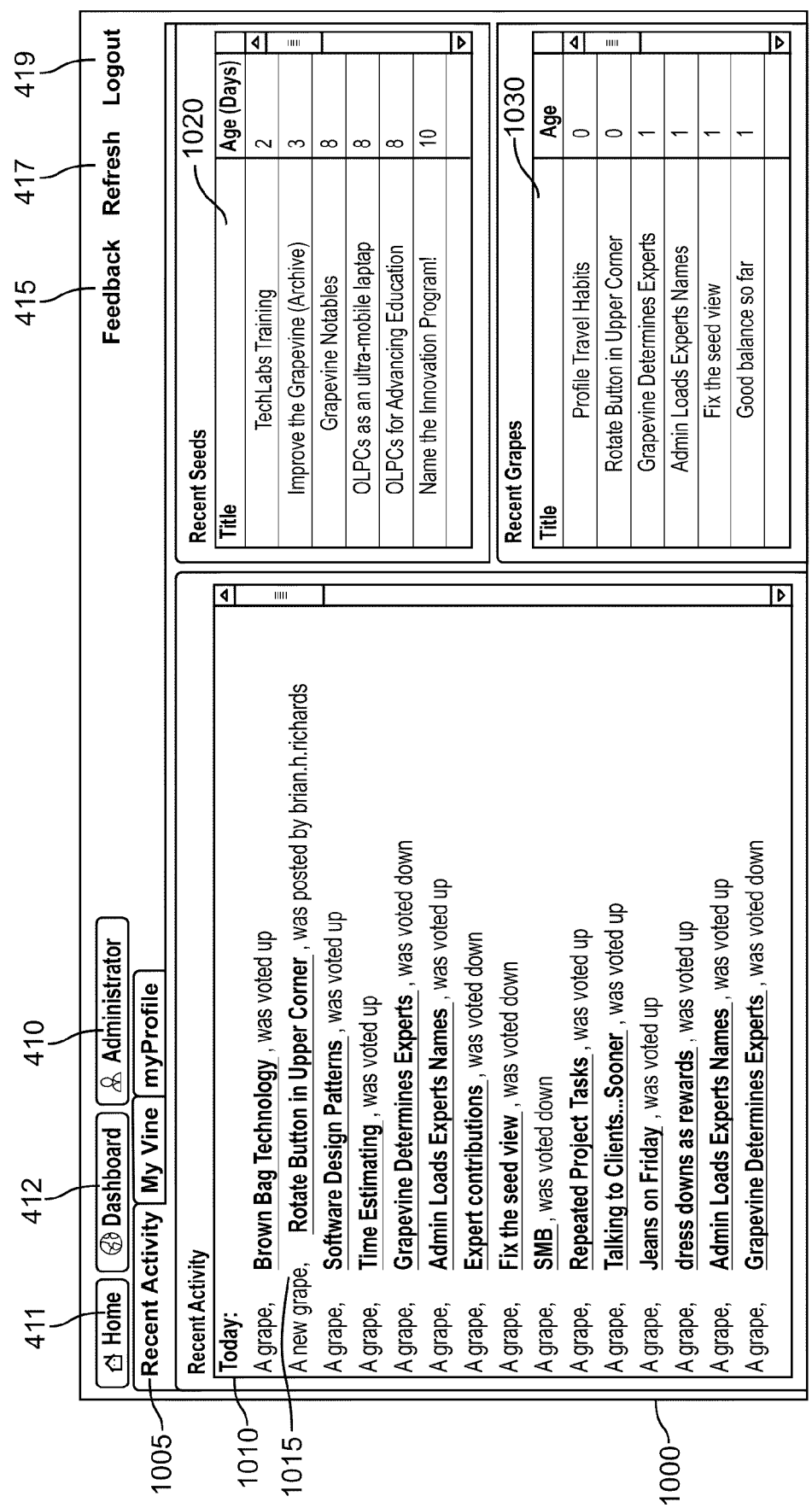
FIG. 10 is a screenshot of a recent activity screen in the system of FIG. 1, or other systems for managing a collaborative environment.

FIG. 10 is a screenshot of a recent activity screen 1000 in the system of FIG. 1, or other systems for managing a collaborative environment. The system 100 may display the recent activity screen 1000 to the user A 120A when the user A 120A clicks on the dashboard button 412 and the clicks on the recent activity tab 1005. Alternatively or in addition the system 100 may display the recent activity screen 1000 to the user A 120A when the user A 120A clicks on the dashboard button 412. The user A 120A may use the recent activity screen 1000 to view the recent activity in the system 100.

The recent activity screen 1000 may include an admin button 410, a home button 411, a dashboard button 412, feedback link 415, a refresh link 417, a logout link 419, a recent activity display 1010, a recent initial item table 1020 and a recent grape table 1030. The recent activity display 1010 may include a list of items or items.

In operation, the user A 120A may view the activity of the item in the system in the recent activity display 1010. The recent activity display 1010 may indicate when a particular item has received many positive ratings, or when a particular item has received many negative ratings. The recent activity display 1010 may display the items, the activity on the items, and any associated information, such as the person who posted the item. The user A 120A may click on one of the items to view the item.

The recent initial items table 1020 may display the recent initial items added to the system 100. The user A 120A may click on one of the initial items to view the initial item. The recent initial items table 1020 may also display the age of the initial item. The recent grapes table 1030 may display the recent items added to the system. The recent grapes table 1030 may display the age of the items, such as in days. The user A 120A may click on one of the items to view, enhance, or rate the item.

Figure 11:
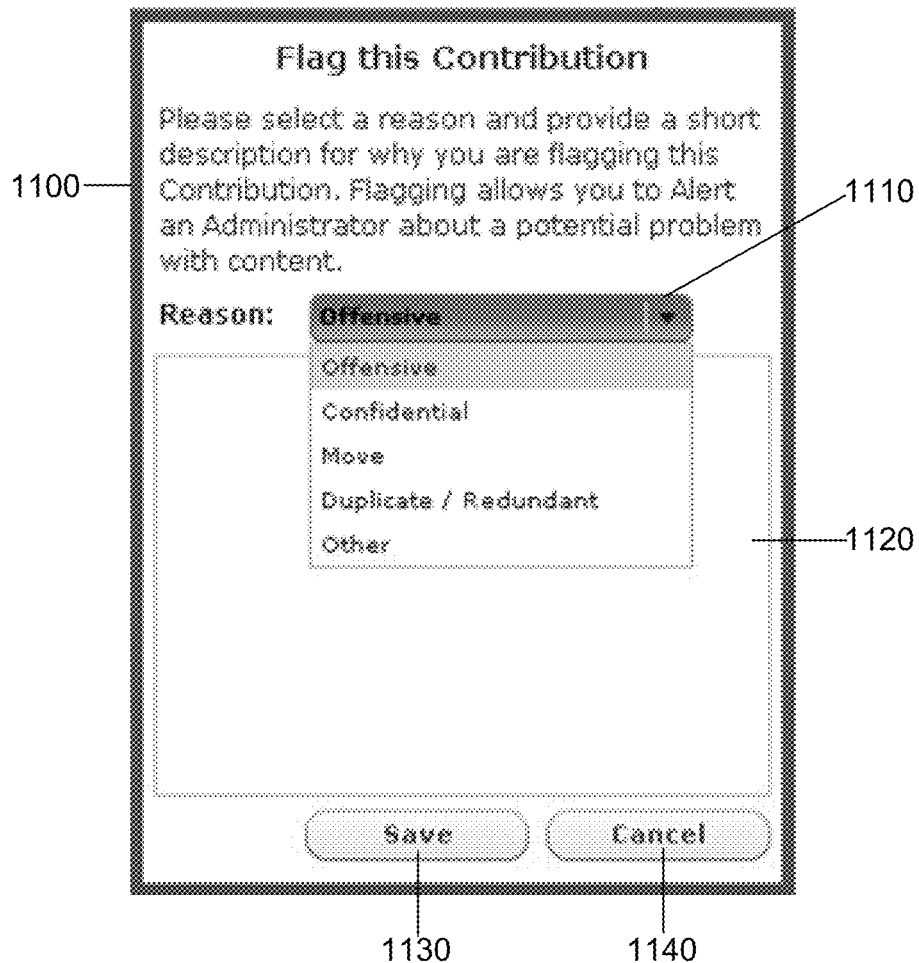
FIG. 11 is a screenshot of a flag item interface in the system of FIG. 1, or other systems for managing a collaborative environment.

FIG. 11 is a screenshot of a flag item interface 1100 in the system of FIG. 1, or other systems for managing a collaborative environment. The system 100 may provide the flag item interface 1100 to a user A 120A when the user A 120A clicks on the flag button 655 of FIGS. 6C-E. The flag item interface 1100 may be displayed to the user A 120A in a popup window, or the flag item interface 1100 may be displayed to the user A 120A in the item modification subsection 640 of FIGS. 6C-E. The flag item interface 1100 may be used by the user A 120A to flag the item represented by the selected shape 637 of FIGS. 6C-E for administrator review.

The flag item interface 1100 includes a reason selector 1110, a description field 1120, a save button 1130, and a cancel button 1140. In operation, the user A 120A may select a reason for flagging the item in the reason selector 1110. The service provider server 240 may provide a list of reasons to the user A 120A through the reason selector 1110. For example, reasons for flagging the item may include an offensive reason, a confidential reason, a move reason indicating the item should be moved, a duplicate and/or redundant reason, or an other reason, which may encompass any other reason which is not listed in the reason selector 1110. The user A 120A may input a description relating to the reason for flagging the item in the description field 1120. Alternatively, the user A 120A may only select a reason from the reason selector 1110, and may not input a description. The user A 120A may click on the save button 1130 to save the reason and description for flagging the item, or may click on the cancel button 1140 to cancel the flag of the item. When the user A 120A clicks on the save button 1130, the service provider server 240 may process the request to flag the selected item and may perform an action to handle the request to flag the item. The steps of receiving a request to flag the selected item and handling the request are discussed in more detail in FIG. 12 below.

Figure 12:
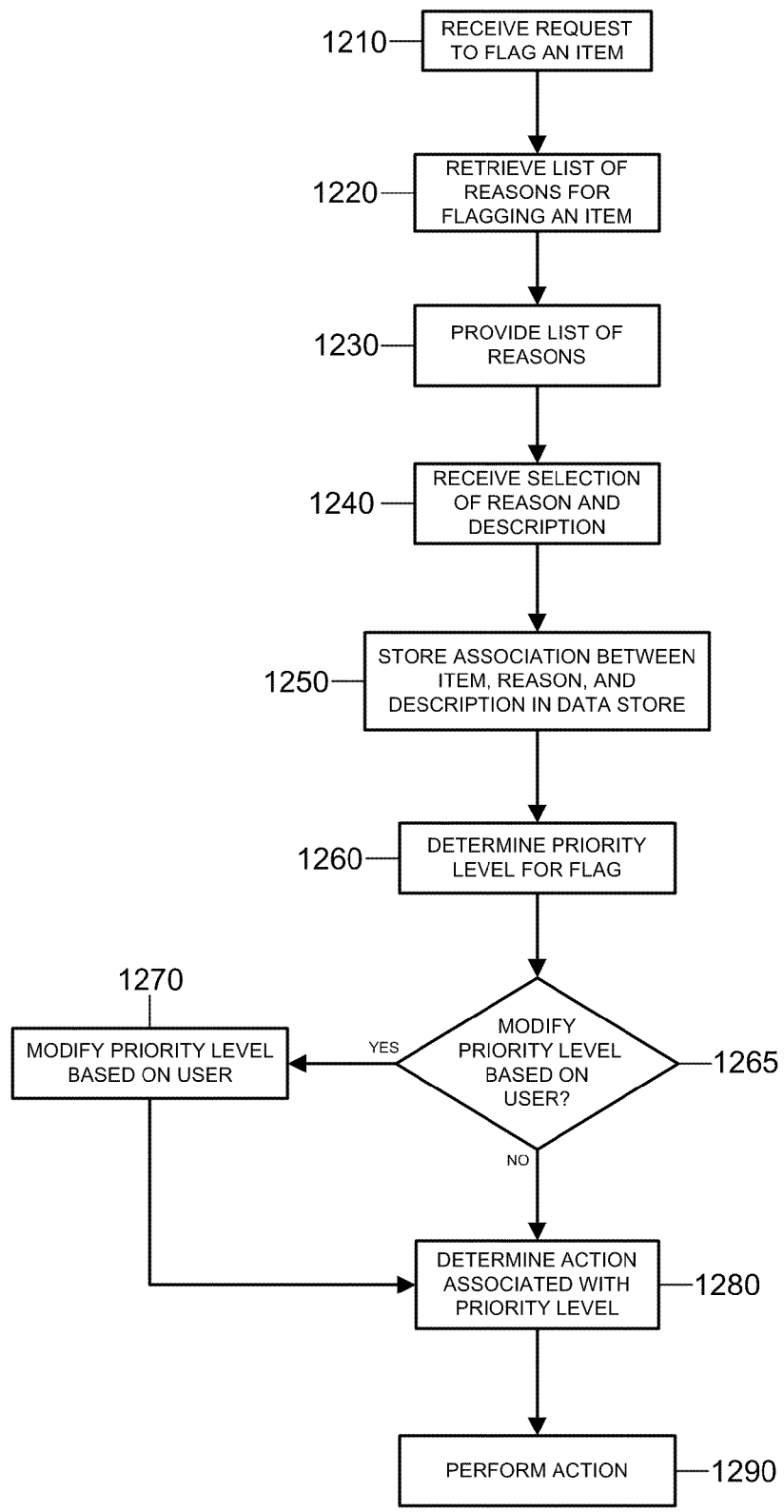
FIG. 12 is a flowchart illustrating the operations of flagging items in the system of FIG. 1, or other systems for managing a collaborative environment.

FIG. 12 is a flowchart illustrating the operations of flagging items in the system of FIG. 1, or other systems for managing a collaborative environment. The steps of FIG. 12 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1210, the service provider server 240 may receive a request to flag an item. For example, one of the users 120A-N, such as the user A 120A may click on the flag button 655 in FIGS. 6C-E. At step 1220, the service provider server 240 may retrieve the list of reasons for flagging an item in the system 100 from the data store 245. An administrator may maintain the list of reasons for flagging an item in the system 100. The list of reasons may include reasons such as an offensive reason, a confidential reason, a move reason, a duplicate/redundant reason, or an other reason. The reasons for flagging an item may vary from implementation to implementation.

At step 1230, the service provider server 240 provides the list of reasons to the user A 120A. For example, the service provider server 240 may provide the flag item interface 1100 to the user A 120A with the list of reasons displayed in the reason selector 1110. At step 1240, the service provider server 240 may receive a selection of a reason and a description from the user A 120A. For example, the user A 120A may select a reason from the reason selector 1110, may input a description into the description field 1120, and may click on the save button 1130. When the user A 120A clicks on the save button 1130, the reason and description may be communicated to the service provider server 240.

At step 1250, the service provider server 240 may store the reason and the description in the data store 245 and may store an association between the item, the reason, and the description in the data store 245. The service provider server 240 may also store an association between an identifier of user A 120A who flagged the item and the date/time the item was flagged in the data store 245. At step 1260, the service provider server 240 may determine the priority level for handling the flagged item. An administrator may maintain one or more priority levels for handling items flagged for review. The priority levels may indicate how urgent the review of the flagged item should be. For example, an item which needs to be urgently reviewed, such as an item which is flagged as offensive, may be associated with the highest priority level, while an item which does not need to be urgently reviewed, such as an item which is flagged to be moved, may be associated with the lowest priority level. Each priority level may be associated with one or more actions to be performed by the service provider server 240 for handling the item flagged for review. For example, the highest priority level may be associated with an action of removing the item from the view of the users 120A-N and immediately notifying all administrators of the system that the item needs to be urgently reviewed. For example, the administrators may be notified via an automated voice message dialed to their mobile phone numbers. The lowest priority level may be associated with adding the flagged item to the flagged item table 955 of FIG. 9B for later review by an administrator.

The service provider server 240 may incorporate a multitude of factors into determining which priority level to associate with the review of the flagged item, such as the reason for flagging the item for review, the content of the item, the number of items which have been innovated from the item, the outcomes of previous reviews of other items created by the user who created the flagged item, and/or the outcomes of previous reviews initiated by the user A 120A who flagged the item. In one example, the service provider server 240 may associate a priority level with each reason for flagging the item. Each priority level may be associated with one or more actions for handling the review of the item. The actions for handling the review of an item may include notifying one or more administrators that the item should be reviewed, such as through a text message, a voice message, a instant message, an email, or a social network message, temporarily banning the user A 120A who submitted the item from the system 100, temporarily removing the item from the view of the users 120A-N, and/or adding the item to a list of items to be reviewed.

At step 1265, the service provider server 240 may determine whether to modify the priority level associated with the item based on the user A 120A who flagged the item for review. The service provider server 240 may determine a reliability value for the user A 120A based on the outcomes of the previous items submitted for administrator review by the user A 120A. For example, if the user A 120A previously submitted four items for administrator review, and the administrator determined that three of the items should be removed from the system 100, then the reliability value of the user A 120A may be 0.75. The reliability value may be multiplied by one hundred to convert the value into a percentage. Alternatively or in addition, the reliability value of the user A 120A may incorporate the number of items the user A 120A has flagged for review. For example, there may be a minimum number of items the user A 120A must flag for review, such as ten, before a reliability value is determined for the user A 120A.

The service provider server 240 may utilize a reliable user threshold to determine whether the priority level associated with the review of an item should be increased based on the reliability value of the user A 120A. For example, an administrator may set the reliable user threshold such that a user with a reliability value greater than a threshold value, such as 0.6, satisfies the reliable user threshold. Thus in the current example, the user A 120A would satisfy the reliable user threshold because the reliability value of the user is 0.75, which is greater than 0.6. If the user A 120A satisfies the reliable user threshold, then the priority level associated with reviewing the item may be increased by one. Alternatively or in addition, the amount by which the priority level is increased may be based on the amount by which the reliability value of the user A 120A exceeds the reliable user threshold.

The service provider server 240 may also utilize an unreliable user threshold to determine whether the priority level associated with the review of an item should be decreased based on the reliability value of the user A 120A. For example, an administrator may set the unreliable user threshold such that a user with a reliability value less than a threshold value, such as 0.2, satisfies the unreliable user threshold. Thus in the current example, the user A 120A would not satisfy the unreliable user threshold because the reliability value of the user is 0.75, which is greater than 0.2. If the user A 120A satisfies the unreliable user threshold, then the priority level associated with reviewing the item may be decreased by one. Alternatively or in addition, the amount by which the priority level is decreased may be based on the amount by which the reliability value of the user A 120A is below the unreliable user threshold. The reliable user threshold and unreliable user threshold may allow the service provider server 240 to prioritize requests for administrator reviews from users 120A-N who have been shown to be reliable, while de-prioritizing requests for administrator reviews from users 120A-N who have been shown to be unreliable.

If, at step 1265, the service provider server 240 determines the reliability value of the user A 120A satisfies the reliable user threshold or the unreliable user threshold, the service provider server 240 moves to step 1270. At step 1270, the service provider server 240 modifies the priority level associated with the review of the item based on the reliability value of the user A 120A. If, at step 1265, the service provider server 240 determines the reliability value of the user A 120A does not satisfies either the reliable user threshold or the unreliable user threshold, or the user A 120A does not qualify for a reliability value, the service provider server 240 moves to step 1280.

At step 1280, the service provider server 240 determines the one or more actions associated with the determined priority level for reviewing the item. The actions may include notifying one or more administrators that the item should be reviewed, such as through a text message, a voice message, a instant message, an email, or a social network message, temporarily banning the user A 120A who submitted the item to the collaborative environment, temporarily removing the item from the view of the users 120A-N, and/or adding the item to a list of items to be reviewed by an administrator. An administrator may maintain a table in the data store 245 which lists the actions associated with each priority level.

At step 1290, the service provider server 240 performs the one or more actions associated with the determined priority level for the review of the item. For example, in the case of the highest priority level, the service provider server 240 may temporarily remove the item from the view of the users 120A-N, may temporarily ban the user who provided the item, and may send an email to all of the administrators indicating that the item should be immediately reviewed.

Figure 13:
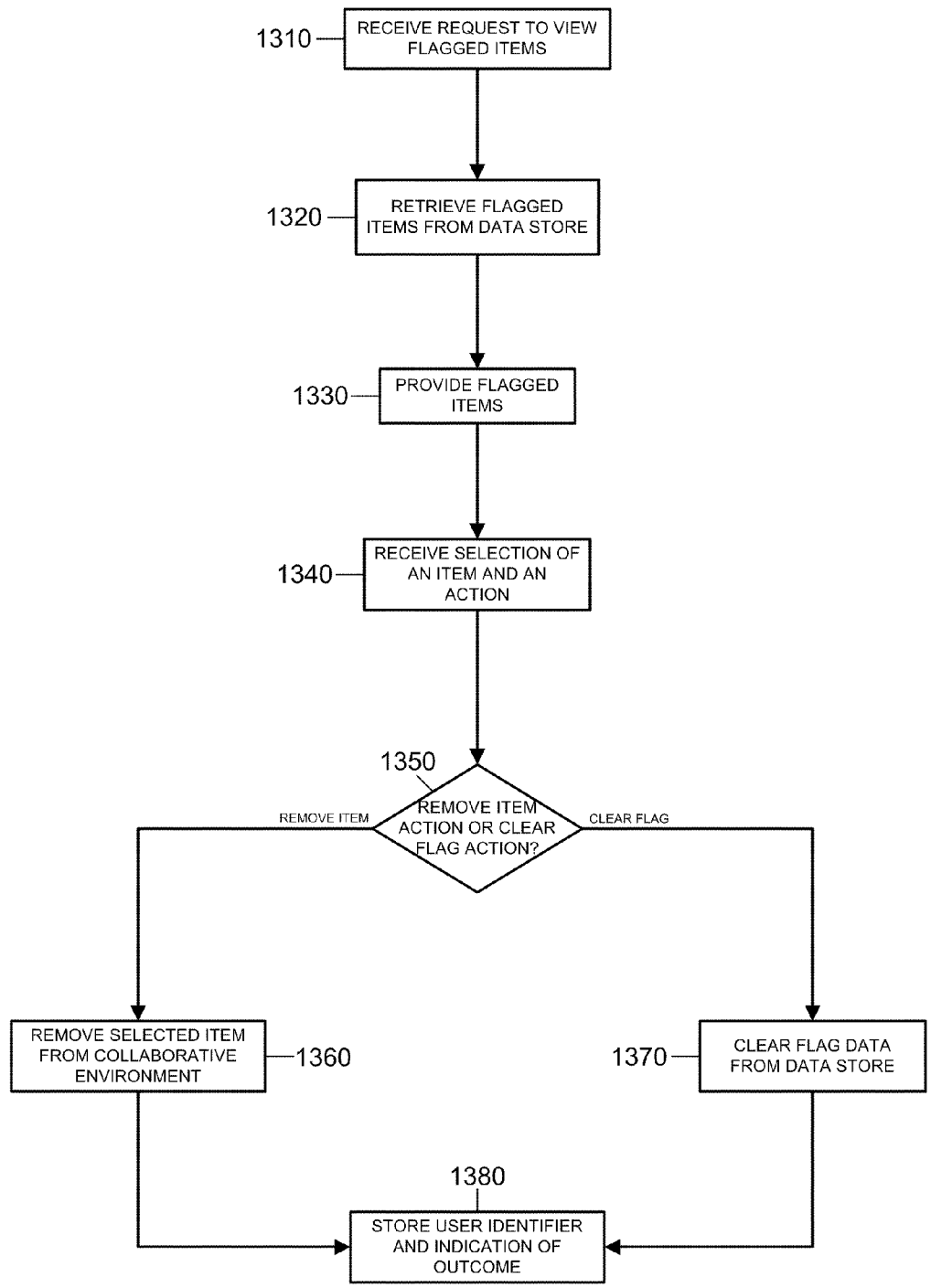
FIG. 13 is a flowchart illustrating the operations of managing flagged items in the system of FIG. 1, or other systems for managing a collaborative environment.

FIG. 13 is a flowchart illustrating the operations of managing flagged items in the system of FIG. 1, or other systems for managing a collaborative environment. The steps of FIG. 13 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1310, the service provider server 240 may receive a request to view flagged items, such as from a device of an administrator. For example, an administrator or other authorized user may click on the "Flagged/Removed Pages" tab of the administrator tabset 905 of FIG. 9B. At step 1320, the service provider server 240 may retrieve the flagged items from the data store 245. At step 1330, the service provider server 240 may provide the flagged items to the administrator, such as through the flagged items table 955 of FIG. 9B. At step 1340, the service provider server 240 may receive a selection of an item and a selection of an action from the administrator. For example, the administrator may select an item from the flagged items table 955 of FIG. 9B to view the details of the selected item in the flag details section 960 of FIG. 9B. The administrator may then select an action by clicking on the remove page button 968 or the clear flag button 969.

At step 1350, the service provider server 240 determines whether the action selected by the administrator is the remove item action or clear flag action. If, at step 1350, the service provider server 240 determines that the action selected by the administrator is the remove item action, the service provider server 240 moves to step 1360. At step 1360, the service provider server 240 removes the item from the view of the users 120A-N in the collaborative environment. Although the item may be removed from the view of the users 120A-N in the collaborative environment, the item may not be permanently removed from the data store 245. Thus, the item may be included in reports or later re-added to the collaborative environment. Alternatively or in addition, the service provider server 240 may remove the item from the data store 245.

If, at step 1350, the service provider server 240 determines that the administrator selected the clear flag action, the service provider server 240 moves to step 1370. At step 1370, the service provider server 240 may clear the flag from the item, such as by removing the association between the item, the reason, and the description from the data store 245. At step 1380, the service provider server 240 stores an identifier of the user A 120A who flagged the item for review and an indication of the outcome of the review. For example, if the item was removed from the collaborative environment, the service provider server 240 may store an identifier of the user who requested the review and an indication that the item was removed from the collaborative environment. Alternatively, if the flag was cleared from the item, the service provider server 240 may store an identifier of the user who requested the review and an indication that the flag was cleared from the item. The service provider server 240 may use the outcome data associated with a user identifier to determine the reliability of the users 120A-N, as discussed in FIG. 12 above.

Figure 14:
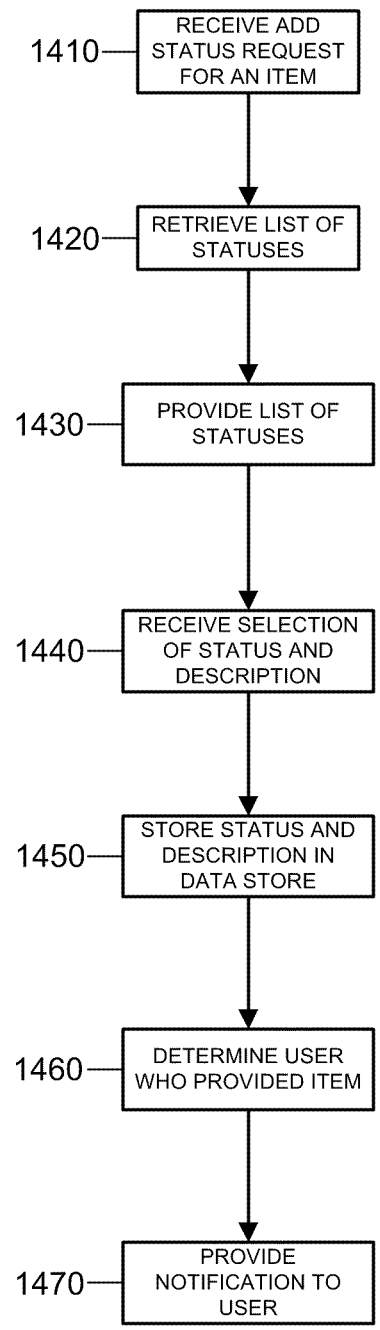
FIG. 14 is a flowchart illustrating the operations of setting the status of an item in the system of FIG. 1, or other systems for managing a collaborative environment.

FIG. 14 is a flowchart illustrating the operations of setting the status of an item in the system of FIG. 1, or other systems for managing a collaborative environment. The steps of FIG. 14 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1410, the service provider server 240 may receive a request to add a status to an item, such as from a content provider A 110A. For example, the service provider server 240 may receive the request when a content provider A 110A clicks on the add status link 647 of FIG. 6C. At step 1420, the service provider server 240 may retrieve the list of statuses for the system 100 from the data store 245. An administrator may maintain a list of statuses in the system 100. The statuses may include an under review status, a deferred status, an approved status, an implemented status, and a none status. The statuses may vary from implementation to implementation.

At step 1430, the service provider server 240 may provide the list of statuses and a status user interface to the content provider A 110A. For example, the service provider server 240 may provide the list of statuses to the content provider A 110A through the status selector 662 in FIG. 6D. At step 1440, the service provider server 240 may receive a selection of a status and a description, such as from a device of the content provider A 110A. For example, the content provider A 110A may select a status from the status selector 662 of FIG. 6D, may input a description in the status description field 664 of FIG. 6D, and may click the save link 665 of FIG. 6D. The selected status and inputted description may be communicated to the server provider server 240 when the content provider A 110A clicks on the save link 665.

At step 1450, the service provider server 240 may store the status and description in the data store 245. The service provider server 240 may also store an association between the status, the description, and the selected item in the data store 245. At step 1460, the service provider server 240 may determine the user A 120A who provided the item, such as by retrieving an identifier of the user A 120A from the data store 245. At step 1470, the service provider server 240 may provide a notification to the user A 120A that the status of their item has been changed. The notification may include the status of the item and the description provided by the content provider A 110A. The notification may be provided to the user A 120A through various modes of communication, such as a text message, an instant message, an email, an automated telephone call, a social network message, or generally any mode of communicating the notification to the user A 120A.

Alternatively or in addition, the content provider A 110A may identify that the status should apply to any items from which the selected item was enhanced from, or to any items which were enhanced from the selected item. In this case, the service provider server 240 may store an association between the status and description with each item to which the status applies. The service provider server 240 may also communicate a notification to each of the users 120A-N who provided the items to which the status applies.

Figure 15:
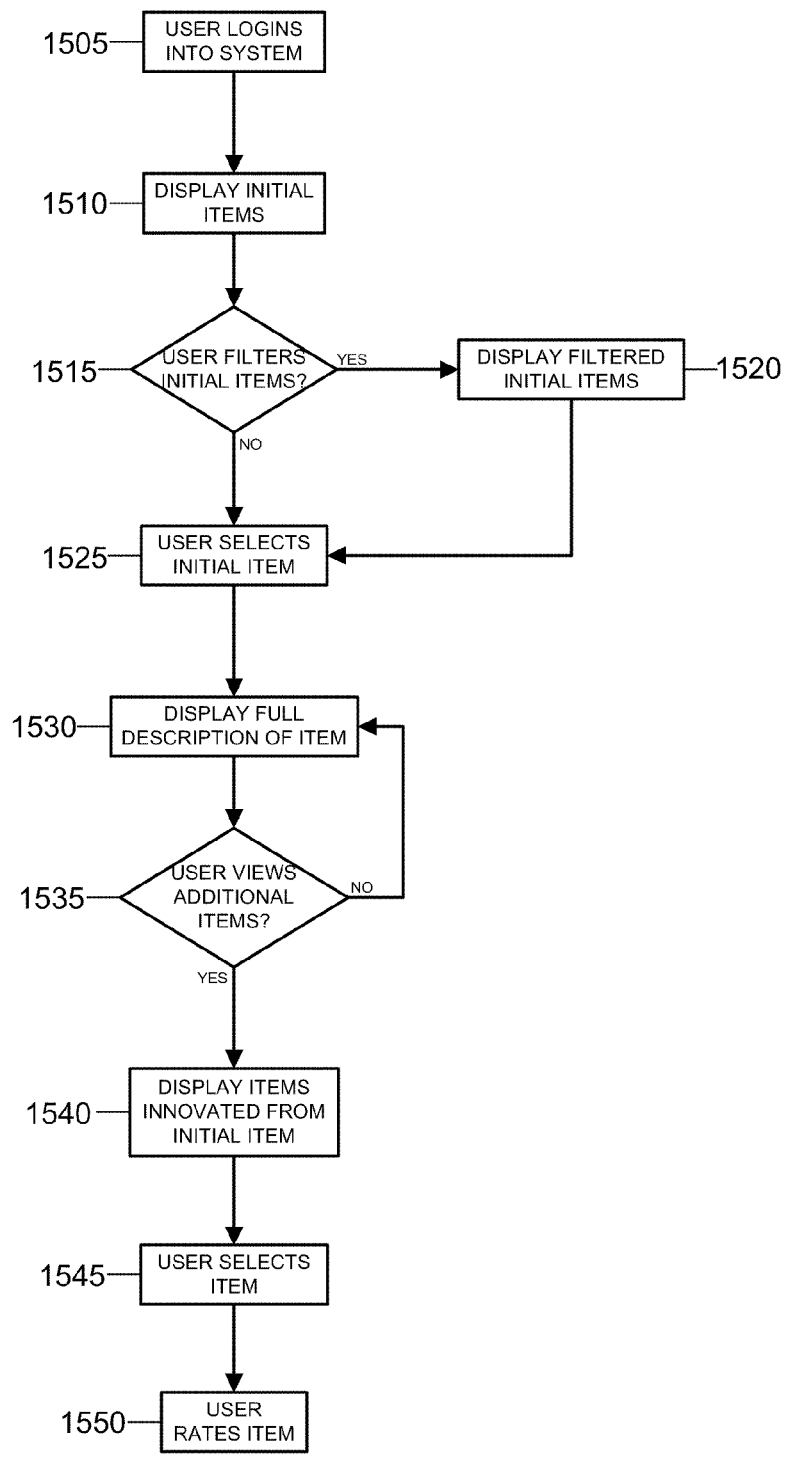
FIG. 15 is a flowchart illustrating the operations of rating an item in the system of FIG. 1, or other systems for managing a collaborative environment.

FIG. 15 is a flowchart illustrating the operations of rating an item in the system of FIG. 1, or other systems for managing a collaborative environment. The steps of FIG. 15 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1505, one of the users 120A-N, such as the user A 120A, may log into the service provider server 240, such as by using the user login interface 300. At step 1510, the service provider server 240 may display the existing initial items to the user A 120A, such as in the initial item selection interface 400. At step 1515, the user A 120A may use the initial item selection interface 400 to filter the one or more displayed initial items. If the user A 120A chooses to filter the initial items then the service provider server 240 moves to step 1520. At step 1520, the service provider server 240 displays the filtered initial items to the user A 120A.

If the user A 120A does not filter the initial items at step 1515, the service provider server 240 moves to step 1525. At step 1525, the user A 120A may use the initial item selection interface 400 to select an initial item. At step 1530, the service provider server 240 may display the full description of the item selected by the user A 120A, such as through the initial item details screen 500. At step 1535, the user A 120A may view the items innovated from the selected initial item. If, at step 1535, the user A 120A does not choose to view the items innovated from the selected initial item, the service provider server 240 may return to step 1530. If, at step 1535, the user A 120A chooses to view the items innovated from the selected initial item, the service provider server 240 may move to step 1540.

At step 1540, the service provider server 240 may display the items innovated from the initial item, such as via the initial item collaborative innovation interface 600. The items may be displayed as a tree-like structure in the graphical representation 635. Each item on the graphical collaborative display may be represented by a shape, such as a circle, and each shape may be connected via a line to the shape representing the item it was innovated from. At step 1545, the user A 120A may select an item in the graphical representation 635 of the initial item collaborative innovation interface 600. At step 1550, the user A 120A may indicate whether they like or dislike the item, such as by clicking on he like it button 644 or the don't like it button 646. The service provider server 240 may store whether the user A 120A likes or dislikes the selected item in the data store 245. The data describing whether the user A 120A likes or dislikes the item may be used to determine the rating of the item.

Figure 16:
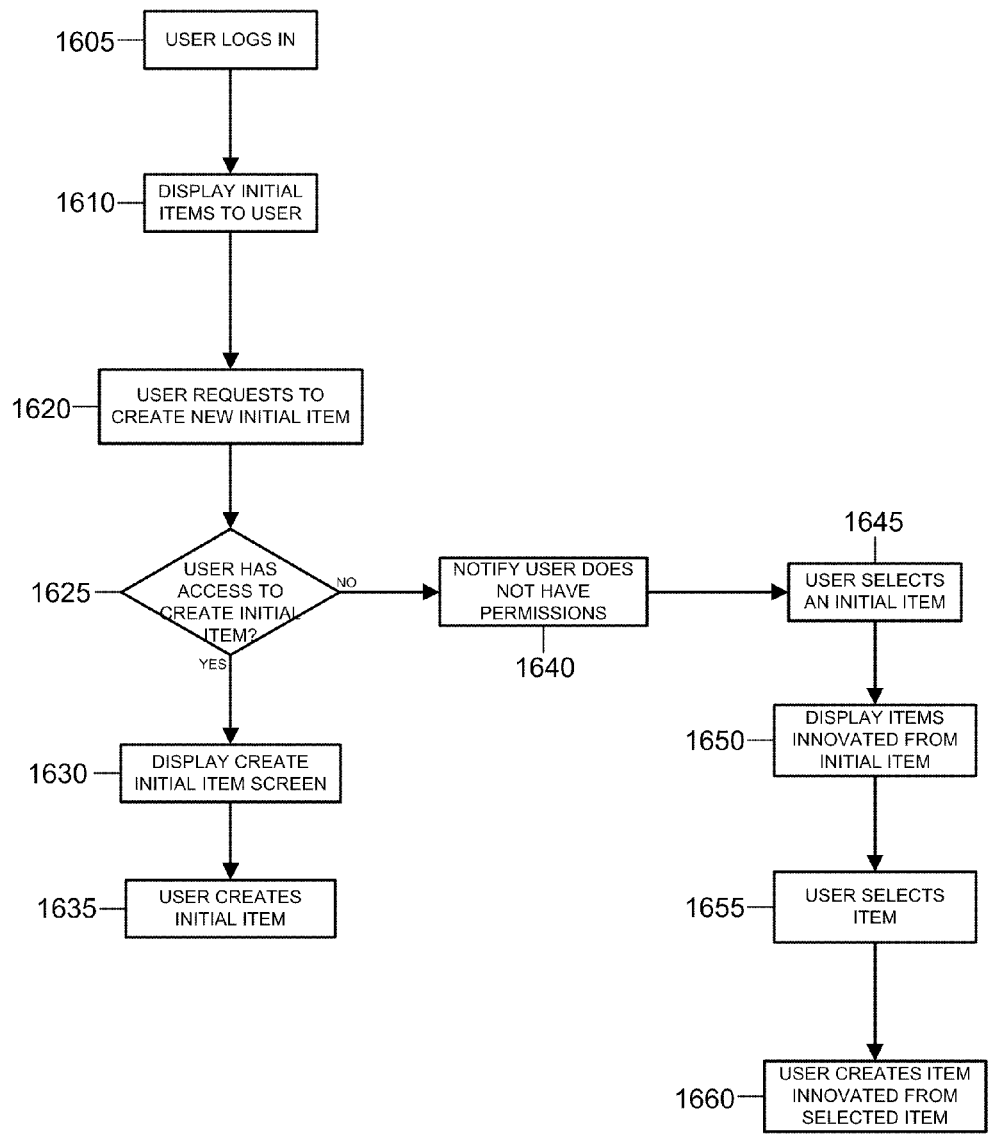
FIG. 16 is a flowchart illustrating the operations of creating an item in the system of FIG. 1, or other systems for managing a collaborative environment.

FIG. 16 is a flowchart illustrating the operations of creating an item in the system of FIG. 1, or other systems for managing a collaborative environment. The steps of FIG. 16 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1605, one of the content providers 110A-N or one of the users 120A-N, such as the user A 120A, may log into the service provider server 240, such as via the user login interface 300. At step 1610, the service provider server 240 may display the existing initial items to the user A 120A, such as via the initial item selection interface 400. At step 1620, the user A 120A may request to create a new initial item, such as via the initial item selection interface 400. At step 1625, the service provider server 240 may determine whether the user A 120A has sufficient permissions to create a new initial item. If the service provider server 240 determines the user A 120A has sufficient permissions to create a new initial item, the service provider server 240 may move to step 1630. At step 1630, the service provider server 240 may display a create initial item interface to the user A 120A. The create initial item interface may allow the user A 120A to create one or more initial items. At step 1635, the user A 120A may use the create new initial item interface to create a new initial item.

If, at step 1625, the service provider server 240 determines that the user A 120A does not have sufficient permissions to create a new initial item, the service provider server 240 may move to step 1640. At step 1640, the service provider server 240 may notify the user A 120A that the user A 120A does not have the necessary permissions to create an initial item. The service provider server 240 may then display the initial item selection interface 400, where the user may create an item innovated from an existing item or initial item. At step 1645, the user A 120A may select an initial item, such as from the initial item selection interface 400. At step 1650, the service provider server 240 may display items innovated from the selected initial item, such as via the graphical representation 635 of the initial item collaborative innovation interface 600. At step 1655, the user A 120A may select a shape representing an item in the initial item collaborative innovation interface 600. The selected shape may represent the initial item, or any item innovated from the initial item. At step 1660, the user A 120A may create an item innovated from the selected item, such as by entering the item into the item enhancement field 648 and clicking the enhance button 652. Alternatively or in addition, an item innovated from another item may also be referred to as an enhancement of the initial item.

Figure 17:
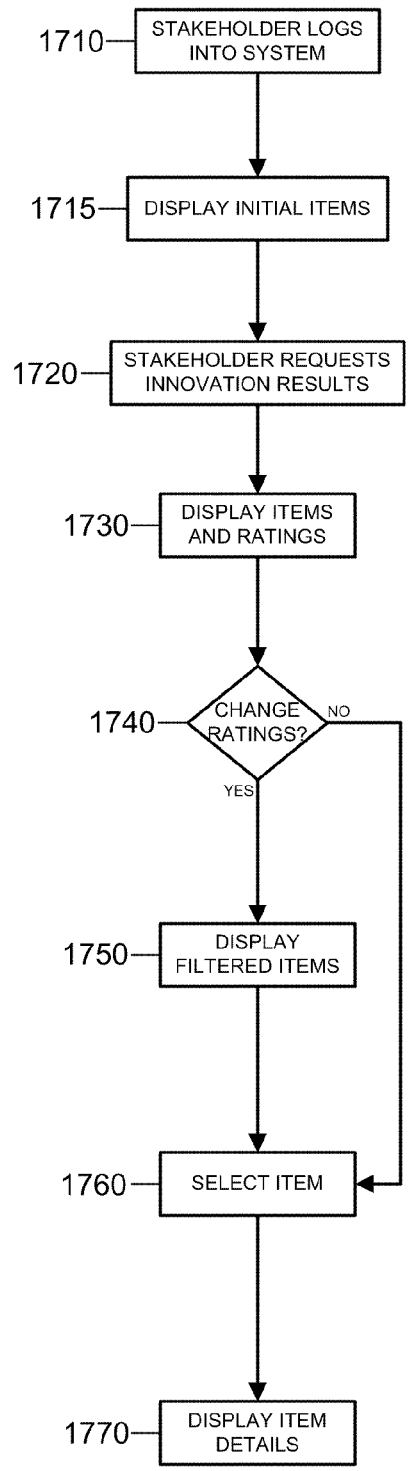
FIG. 17 is a flowchart illustrating the operations of viewing an initial item summary in the system of FIG. 1, or other systems for managing a collaborative environment.

FIG. 17 is a flowchart illustrating the operations of viewing an initial item summary in the system of FIG. 1, or other systems for managing a collaborative environment. The steps of FIG. 17 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1710 one of the content providers 110A-N, such as the content provider A 110A, may log into the service provider server 240, such as via the user login interface 300. Alternatively or in addition, one of the users 120A-N with proper permissions may log into the service provider server 240. At step 1715, the service provider server 240 may display the initial items to the content provider A 110A, such as via the initial item selection interface 400. At step 1720, the content provider A 110A may select an initial item and request to view the collaborative innovation results associated with the initial item.

At step 1730, the service provider server 240 may display the results of the collaborative innovation process for the selected initial item. The results may be displayed as an ordered list of innovated items ordered based on the ratings received from the users 120A-N. Alternatively or in addition the ratings received from the users 120A-N may be used as one factor in an overall ratings calculation for each item. Additional factors used in the ratings calculation may include the number of ratings the item received, the number of views the item received, the number of unique viewers of the item, or generally any factor that may indicate the value of the item. At step 1740, the content provider A 110A may change the weight applied to each factor incorporated in such a ratings calculation. If, at step 1740, the content provider A 110A selects to change the weight applied to each factor in the ratings calculation, the service provider server 240 may move to step 1750. At step 1750, the service provider server 240 may re-calculate the rating of the items displayed in the results list in accordance with the weight for each factor identified by the content provider A 110A. If, at step 1740, the content provider A 110A does not choose to re-weight the factors used in the rating calculation, the service provider server 240 may move to step 1760.

At step 1760, the content provider A 110A may select an item displayed in the results list. At step 1770, the service provider server 240 may display the details associated with the item to the content provider A 110A. The details may include a description of the item, the rating of the item, the date the item was created, the creator of the item, or generally any information that may be of value to the content provider A 110A.

Figure 18:
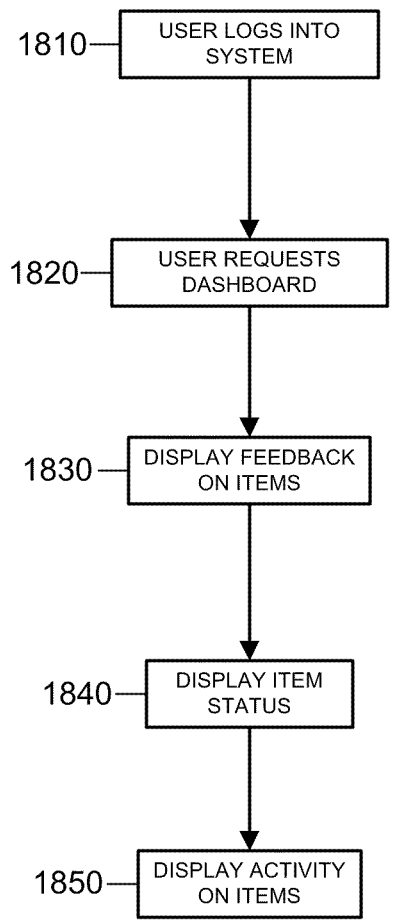
FIG. 18 is a flowchart illustrating the operations of displaying user dashboard information in the system of FIG. 1, or other systems for managing a collaborative environment.

FIG. 18 is a flowchart illustrating the operations of displaying user dashboard information in the system of FIG. 1, or other systems for managing a collaborative environment. The steps of FIG. 18 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1810, the user A 120A may log into the service provider server 240, such as via the user login interface 300. At step 1820, the user A 120A may request to view the user dashboard screen 800, such as by clicking on the dashboard button 412. At step 1830, the service provider server 240 may display the feedback on items given by the user A 120A, such as via the user dashboard screen 800. The feedback on items given by the user A 120A may be displayed in one or more graphs, such as the feedback graph 814. At step 1840, the service provider server 240 may display the item status of the user A 120A, such as the current items of the user A 120A and/or the historical items of the user A 120A. At step 1850, the service provider server 240 may display the activity on the items of the user A 120A. The activity on the items of the user A 120A may be displayed as one or more graphs. The activity on the items of the user A 120A may include data describing the feedback given by the other users 120B-N on the items of the user A 120A. The user A 120A may use the data displayed by the user dashboard screen 800 to manage their interactions with the service provider server 240.

FIG. 19 illustrates a computer system 1900, which may represent a service provider server 240, a third party server 250, the client applications 210A-N, 220A-N, or any of the other computing devices referenced herein. The computer system 1900 may include a set of instructions 1924 that may be executed to cause the computer system 1900 to perform any one or more of the methods or computer based functions disclosed herein. The computer system 1900 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1900 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1924 (sequential or otherwise) that specify actions to be taken by that machine. In a particular embodiment, the computer system 1900 may be implemented using electronic devices that provide voice, video or data communication. Further, while a single computer system 1900 may be illustrated, the term "system" shall also be taken to include any collection of systems or subsystems that individually or jointly execute a set, or multiple sets, of instructions to perform one or more computer functions.

As illustrated in FIG. 19, the computer system 1900 may include a processor 1902, such as, a central processing unit (CPU), a graphics processing unit (GPU), or both. The processor 1902 may be a component in a variety of systems. For example, the processor 1902 may be part of a standard personal computer or a workstation. The processor 1902 may be one or more processors, digital signal processors, application specific integrated circuits, field programmable gate arrays, servers, networks, digital circuits, analog circuits, combinations thereof, or other now known or later developed devices for analyzing and processing data. The processor 1902 may implement a software program, such as code generated manually (i.e., programmed).

The computer system 1900 may include a memory 1904 that can communicate via a bus 1908. The memory 1904 may be a main memory, a static memory, or a dynamic memory. The memory 1904 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1904 may include a cache or random access memory for the processor 1902. Alternatively or in addition, the memory 1904 may be separate from the processor 1902, such as a cache memory of a processor, the system memory, or other memory. The memory 1904 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1904 may be operable to store instructions 1924 executable by the processor 1902. The functions, acts or tasks illustrated in the figures or described herein may be performed by the programmed processor 1902 executing the instructions 1924 stored in the memory 1904. The functions, acts or tasks may be independent of the particular type of instructions set, storage media, processor or processing strategy and may be performed by software, hardware, integrated circuits, firmware, micro-code and the like, operating alone or in combination.

Likewise, processing strategies may include multiprocessing, multitasking, parallel processing and the like.

The computer system 1900 may further include a display 1914, such as a liquid crystal display (LCD), an organic light emitting diode (OLED), a flat panel display, a solid state display, a cathode ray tube (CRT), a projector, a printer or other now known or later developed display device for outputting determined information. The display 1914 may act as an interface for the user to see the functioning of the processor 1902, or specifically as an interface with the software stored in the memory 1904 or in the drive unit 1906.

Additionally, the computer system 1900 may include an input device 1912 configured to allow a user to interact with any of the components of system 1900. The input device 1912 may be a number pad, a keyboard, or a cursor control device, such as a mouse, or a joystick, touch screen display, remote control or any other device operative to interact with the system 1900.

The computer system 1900 may also include a disk or optical drive unit 1906. The disk drive unit 1906 may include a computer-readable medium 1922 in which one or more sets of instructions 1924, e.g. software, can be embedded. Further, the instructions 1924 may perform one or more of the methods or logic as described herein. The instructions 1924 may reside completely, or at least partially, within the memory 1904 and/or within the processor 1902 during execution by the computer system 1900. The memory 1904 and the processor 1902 also may include computer-readable media as discussed above.

The present disclosure contemplates a computer-readable medium 1922 that includes instructions 1924 or receives and executes instructions 1924 responsive to a propagated signal; so that a device connected to a network 235 may communicate voice, video, audio, images or any other data over the network 235. Further, the instructions 1924 may be transmitted or received over the network 235 via a communication interface 1918. The communication interface 1918 may be a part of the processor 1902 or may be a separate component. The communication interface 1918 may be created in software or may be a physical connection in hardware. The communication interface 1918 may be configured to connect with a network 235, external media, the display 1914, or any other components in system 1900, or combinations thereof. The connection with the network 235 may be a physical connection, such as a wired Ethernet connection or may be established wirelessly as discussed below. Likewise, the additional connections with other components of the system 1900 may be physical connections or may be established wirelessly. In the case of a service provider server 240 or the content provider servers 110A-N, the servers may communicate with users 120A-N through the communication interface 1918.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1922 may be a single medium, or the computer-readable medium 1922 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1922 may include a solid-state memory such as a memory card or other package that houses one or more non-volatile read-only memories. The computer-readable medium 1922 also may be a random access memory or other volatile re-writable memory. Additionally, the computer-readable medium 1922 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for managing a collaborative environment, the method comprising:
   identifying, by a processor, a collaborative environment wherein a plurality of users of the collaborative environment provide a plurality of items, each item of the plurality of items being related to at least one other item of the plurality of items, wherein the plurality of users of the collaborative environment are not an administrator of the collaborative environment;
   receiving, by the processor, from a device of a user of the collaborative environment, a request to flag for review by an administrator an item of the plurality of items, the request further comprising a reason for flagging the item and a description associated with the reason, wherein the reason for flagging the flagged item comprises at least one of an offensive item reason, a confidential item reason, a move item reason, a duplicate item reason, or an administrator generated reason;
   determining, by the processor, a priority level of a plurality of priority levels for handling the review of the item flagged for review by the administrator based on, at least, the reason for flagging the item for review by the administrator and a number of items that have been innovated from the flagged item, wherein each priority level of the plurality of priority levels is associated with one or more actions to be performed by the processor depending on the priority level determined for handling the review of the flagged item by the administrator said one or more actions including one or more of:
      temporarily banning a user who submitted the flagged item;
      temporarily removing the flagged item from view in the collaborative environment; and
      notifying the administrator that the flagged item should be immediately reviewed;
   determining, by the processor, the number of items previously flagged by the user and at least one of:
      determining the percentage of the number of items previously flagged by the user which resulted in an item being removed and adjusting the priority level by increasing the priority level if the percentage satisfies a threshold; or
      determining the percentage of the number of items previously flagged by the user which resulted in an item not being removed and adjusting the priority level by decreasing the priority level if the percentage satisfies a threshold; and
   performing, by the processor, the action associated with the adjusted priority level for handling the review of the flagged item.

2. The computer-implemented method of claim 1 wherein performing, by the processor, the action associated with the determined priority level for handling the flagged item comprises:
   storing, by the processor in a data store, an association between the flagged item, the reason for flagging the item, and the description associated with the reason for flagging the flagged item;
   providing, by the processor to a device of an administrator, the flagged item, the reason for flagging the item, and the description associated with the reason for flagging the flagged item;
   receiving, by the processor from the device of the administrator, a response related to the flagged item, the reason for flagging the flagged item, and the description associated with the reason for flagging the flagged item; and
   removing, by the processor, the association between the flagged item, the reason for flagging the item, and the description associated with the reason for flagging the flagged item from the data store.

3. The computer-implemented method of claim 1 wherein the determined priority level is based at least on the reason for flagging the flagged item and a number of other items of the plurality of items related to the flagged item.

4. The computer-implemented method of claim 1 wherein performing, by the processor, the action associated with the determined priority level for handling the flagged item further comprises notifying the administrator of the flagged item, the reason and the description.

5. The computer-implemented method of claim 4 wherein the administrator is notified of the flagged item, the reason and the description through at least one of a telephone call, an email, a text message, an instant message, or a social network message.

6. The computer-implemented method of claim 1 wherein a highest priority level is determined for handling the flagged item if the reason comprises the offensive item reason.

7. The computer-implemented method of claim 1 wherein the action comprises temporarily removing the flagged item from the collaborative environment.

8. The computer-implemented method of claim 1 further comprising:
   determining, by the processor, the number of items previously flagged which were created by a user who created the flagged item;
   determining, by the processor, the percentage of the number of items previously flagged which were created by the user who created the flagged item which resulted in the item not being removed; and
   decreasing, by the processor, the priority level if the percentage satisfies the threshold.

9. The computer-implemented method of claim 1 further comprising:
   providing, by the processor to a device of an administrator, a collaborative interface, wherein the collaborative interface displays the plurality of items provided by the plurality of users, each item being related to at least one other item of the plurality of items;
   receiving, by the processor from the device of the administrator, a selection of an item in the collaborative interface, a status of the selected item, and a status description;
   determining, by the processor, a user data for a user of the plurality of users who contributed the selected item, wherein the user data comprises an identifier for communicating with the user; and
   providing, by the processor, to a device of the user via the identifier, a notification comprising the selected item, the status of the selected item, and the status description.

10. The computer-implemented method of claim 9 wherein the identifier comprises at least one of a phone number, an email address, a social network identifier, or an instant messenger identifier.

11. The computer-implemented method of claim 9 wherein the status comprises at least one of an under review status, a deferred status, a rejected status, an approved status, an implemented status, or an administrator generated status.

12. The computer-implemented method of claim 9 wherein the plurality of items are displayed in the collaborative interface in a tree-like structure.

13. The computer-implemented method of claim 9 wherein the notification further comprises a link to access the collaborative interface.

14. The computer-implemented of claim 13 further comprising:
   receiving, by the processor from the device of the user, a request to view the selected item in the collaborative interface, wherein the request is generated by the user clicking on the link in the notification; and
   providing, by the processor to the device of the user, the collaborative interface displaying the item.

15. The computer-implemented of claim 9 further comprising:
   receiving, by the processor from the device of the administrator, an indication to apply the status to any item related to the selected item;
   determining, by the processor, a user data for each user of the plurality of users who contributed each item, wherein the user data comprises an identifier for communicating with the user; and
   providing, by the processor, to each device of each user via the identifier, a notification comprising the selected item, the status of the selected item, and the status description.

16. A system for managing a collaborative environment, the system comprising:
   a memory to store a plurality of items provided by a plurality of users of a collaborative environment, wherein each item is related to at least one other item of the plurality of items, wherein the plurality of users of the collaborative environment are not an administrator of the collaborative environment;
   an interface operatively connected to the memory, the interface operative to communicate with a device of a user of the plurality of users; and
   a processor operatively connected to the memory and the interface, the processor operative to:
      identify the collaborative environment,
      receive from the device of the user of the collaborative environment a request to flag for review by an administrator, an item of the plurality of items, the request further comprising a reason for flagging the item and a description associated with the reason, wherein the reason for flagging the flagged item comprises at least one of an offensive item reason, a confidential item reason, a move item reason, a duplicate item reason, or an administrator generated reason,
      determine a priority level of a plurality of priority levels for handling the review of the item flagged for review by the administrator, based on, at least, the reason for flagging the item for review by the administrator and a number of items that have been innovated from the flagged item, wherein each priority level of the plurality of priority levels is associated with one or more actions to be performed by the processor depending on the priority level determined for handling the review of the flagged item by the administrator, said one or more actions including one or more of:
         temporarily banning a user who submitted the flagged item;
         temporarily removing the flagged item from view in the collaborative environment; and
         notifying the administrator that the flagged item should be immediately reviewed;
      determine the number of items previously flagged by the user and at least one of:
         determine the percentage of the number of items previously flagged by the user which resulted in an item being removed and adjust the priority level by increasing the priority level if the percentage satisfies a threshold; or
         determine the percentage of the number of items previously flagged by the user which resulted in an item not being removed and adjust the priority level by decreasing the priority level if the percentage satisfies a threshold;
      perform, by the processor, the action associated with the adjusted priority level for handling the review of the flagged item.

17. The system of claim 16 wherein the processor is further operative to:
   store in the memory an association between the flagged item, the reason for flagging the flagged item, and the description associated with the reason for flagging the flagged item, provide to a device of an administrator the flagged item, the reason for flagging the flagged item, and the description associated with the reason for flagging the flagged item,
   receive from the device of the administrator a response related to the flagged item, the reason for flagging the flagged item and the description associated with the reason for flagging the flagged item, and
   remove the association between the flagged item, the reason for flagging the flagged item, and the description associated with the reason for flagging the flagged item from the data store.

18. The system of claim 16 wherein the processor is further operative to determine the priority level based on at least the reason and a number of other items of the plurality of items related to the flagged item.

19. The system of claim 16 wherein the processor is further operative to notify the administrator of the flagged item, the reason for flagging the flagged item, and the description.

20. The system of claim 19 wherein the processor is further operative to notify the administrator of the item through a telephone call, an email, a text message, an instant message, or a social network message.

21. The system of claim 16 wherein the processor is further operative to temporarily remove the flagged item from the collaborative environment.

22. The system of claim 16 wherein the processor is further operative to determine a highest priority level for handling the flagged item if the reason comprises the offensive item reason.

* * * * *

UNITED STATES PATENT AND TRADEMARK OFFICE
CERTIFICATE OF CORRECTION

PATENT NO. : 9,009,601 B2
APPLICATION NO. : 12/491321
DATED : April 14, 2015
INVENTOR(S) : Michael E. Bechtel et al.

Page 1 of 2

It is certified that error appears in the above-identified patent and that said Letters Patent is hereby corrected as shown below:

On the Title Page, item (56)

Under "U.S. PATENT DOCUMENTS", please insert the following.

| | | |
|---|---|---|
| --7,370,285 | 05/06/2008 | Nickerson et al. |
| 7,756,797 | 07/13/2010 | Icenoggle |
| 2003/0036947 | 02/20/2003 | Smith, III et al. |
| 2004/0186738 | 09/23/2004 | Reisman |
| 2004/0205065 | 10/14/2004 | Petras et al. |
| 2005/0267875 | 12/01/2005 | Bentley III |
| 2006/0095443 | 05/04/2006 | Kumar et al. |
| 2006/0106627 | 05/18/2006 | Al-Nujaidi |
| 2008/0281610 | 11/13/2008 | Yoshida et al. |
| 2008/0301091 | 12/04/2008 | Hibbets et al. |
| 2009/0292727 | 11/26/2009 | Powell--. |

Under "OTHER PUBLICATIONS", please insert the following.

--Schematic View, 3D Max-Tutorials.com, https://web.archive.org/web/20070731032921/http://www.3dmax-tutorials.com/Schematic_View.html, dated July 31, 2007, 10 pages.

Notification of Third Office Action, The State Intellectual Property Office of The People's Republic of China, Application No. 200910007397.6, 12.08.2013, 9 pp.

English Translation of the Abstract and portions of "Research on and Implementation of QA Technique based on Forum Data Source," Chinese Master Thesis, LUO Bin, Beijing Jiaotong University, December 31, 2007, 4 pp., http://www.doc88.com/p-643858895701.html.--.

Signed and Sealed this
Third Day of November, 2015

Michelle K. Lee
*Director of the United States Patent and Trademark Office*

CERTIFICATE OF CORRECTION (continued)
U.S. Pat. No. 9,009,601 B2

On the Title Page (cont'd)

Under "OTHER PUBLICATIONS", please insert the following.

--"Research on and Implementation of QA Technique based on Forum Data Source," Chinese Master Thesis, LUO Bin, Beijing Jiaotong University, December 31, 2007, 7 pp., http://www.doc88.com/p-643858895701.html.

United States Patent and Trademark Final Office Action dated October 21, 2013 for co-pending U.S. Application Serial No. 12/035,988.

Non-Final Rejection dated April 4, 2014 issued in U.S. Application No. 12/035,988.--.

--Marwan Abi-Antoun et al., "Differencing and Merging of Architectural Views", pp. 1-40, December 22, 2007, Springer Science + Business Media.

Frank G. Halasz et al., "Notecards in a Nutshell", pp. 45-52, 1987, Intelligent Systems Laboratory, Xerox Palo Alto Research Center.

Cliff Lampe et al., "Follow the Reader: Filtering Comments on Slashdot", pp. 1253-1262, April 28-May 3, 2007, CHI 2007 proceedings.--.